United States Patent
Shigenaga et al.

(10) Patent No.: US 9,961,438 B2
(45) Date of Patent: May 1, 2018

(54) DIRECTIVITY CONTROL APPARATUS, DIRECTIVITY CONTROL METHOD, STORAGE MEDIUM AND DIRECTIVITY CONTROL SYSTEM

(71) Applicant: PANASONIC INTELLECTUAL PROPERTY MANAGEMENT CO., LTD., Osaka (JP)

(72) Inventors: Shinichi Shigenaga, Fukuoka (JP); Akitoshi Izumi, Fukuoka (JP); Kazunori Hayashi, Fukuoka (JP); Toshimichi Tokuda, Fukuoka (JP); Hirotaka Sawa, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/658,829

(22) Filed: Jul. 25, 2017

(65) Prior Publication Data
US 2017/0325021 A1 Nov. 9, 2017

Related U.S. Application Data

(63) Continuation of application No. 15/439,990, filed on Feb. 23, 2017, now Pat. No. 9,763,001, which is a
(Continued)

(51) Int. Cl.
*H04R 1/40* (2006.01)
*H04N 5/232* (2006.01)
(Continued)

(52) U.S. Cl.
CPC .............. *H04R 1/406* (2013.01); *G06T 7/20* (2013.01); *G06T 7/70* (2017.01); *G11B 27/005* (2013.01);
(Continued)

(58) Field of Classification Search
CPC ........ H04R 3/005; H04R 1/406; H04R 1/326; H04R 2201/401; H04R 1/08;
(Continued)

(56) References Cited

U.S. PATENT DOCUMENTS 4,559,642 A 12/1985 Miyaji et al.
5,523,783 A 6/1996 Cho
(Continued)

FOREIGN PATENT DOCUMENTS

JP 6-133189 5/1994
JP 09-018849 1/1997
(Continued)

OTHER PUBLICATIONS

International Search report in PCT/JP2014/002473, dated Aug. 19, 2014.
(Continued)

*Primary Examiner* — Mark Blouin
(74) *Attorney, Agent, or Firm* — Greenblum & Bernstein, P.L.C.

(57) ABSTRACT

A directivity control method is provided for controlling a directivity of a sound collected by a first sound collector including a plurality of microphones. The directivity control method includes: forming a directivity of the sound in a direction toward a monitoring target corresponding to a first designated position in an image displayed on a display; obtaining information on a second designated position in the image displayed on the display, designated in accordance with a movement of the monitoring target, and changing the directivity of the sound toward the monitoring target corresponding to the second designated position by referring to the information on the second designated position.

21 Claims, 37 Drawing Sheets

Related U.S. Application Data continuation of application No. 15/197,884, filed on Jun. 30, 2016, now Pat. No. 9,621,982, which is a continuation of application No. 14/272,695, filed on May 8, 2014, now Pat. No. 9,414,153.

(51) Int. Cl.

| | | |
|---|---|---|
| *G11B 27/00* | (2006.01) | |
| *G06T 7/70* | (2017.01) | |
| *G06T 7/20* | (2017.01) | |
| *H04N 5/262* | (2006.01) | |
| *G06K 9/00* | (2006.01) | |
| *G06F 3/16* | (2006.01) | |

(52) U.S. Cl.
CPC ....... *H04N 5/23293* (2013.01); *H04N 5/2628* (2013.01); *G06F 3/16* (2013.01); *G06K 9/00228* (2013.01); *G06T 2207/30204* (2013.01); *H04R 2430/21* (2013.01)

(58) Field of Classification Search
CPC .......... H04R 2201/405; H04R 2499/11; H04R 2430/21; H04R 2430/20
USPC .......................................................... 381/92
See application file for complete search history.

(56) References Cited

U.S. PATENT DOCUMENTS

| | | |
|---|---|---|
| 2002/0177963 A1 | 11/2002 | Hirabe |
| 2008/0247567 A1 | 10/2008 | Kjolerbakken et al. |
| 2010/0254543 A1 | 10/2010 | Kjolerbakken |
| 2012/0076304 A1* | 3/2012 | Suzuki .................. H04S 7/30 381/1 |
| 2013/0208113 A1 | 8/2013 | Yoneji et al. |
| 2015/0281832 A1 | 10/2015 | Kishimoto et al. |
| 2015/0281833 A1 | 10/2015 | Shigenaga et al. |

FOREIGN PATENT DOCUMENTS

| | | |
|---|---|---|
| JP | 4153208 | 9/2008 |
| JP | 2009-130767 | 6/2009 |
| JP | 2009-182437 | 8/2009 |
| JP | 2013-168757 | 8/2013 |
| WO | 2013/179335 | 12/2013 |

OTHER PUBLICATIONS

Partial European Search Report in European Patent Application No. 14167571.0, dated Nov. 10, 2014.

* cited by examiner

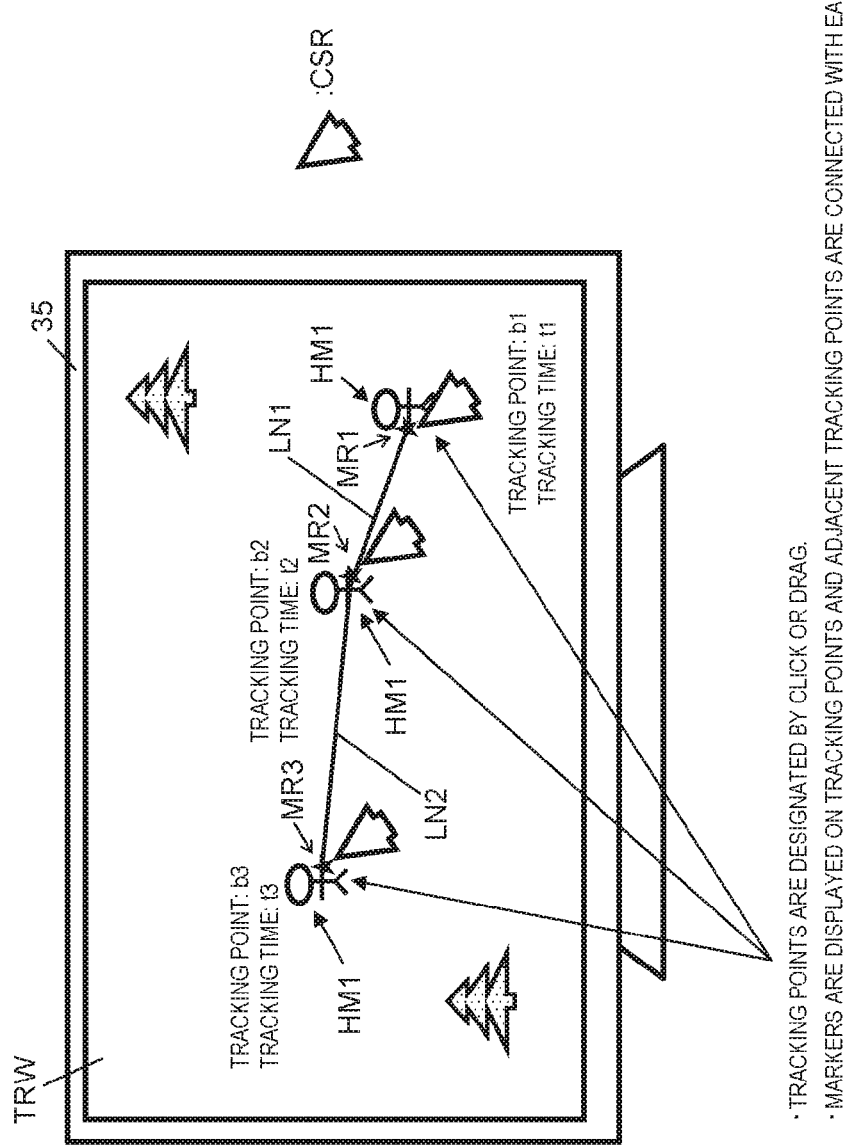

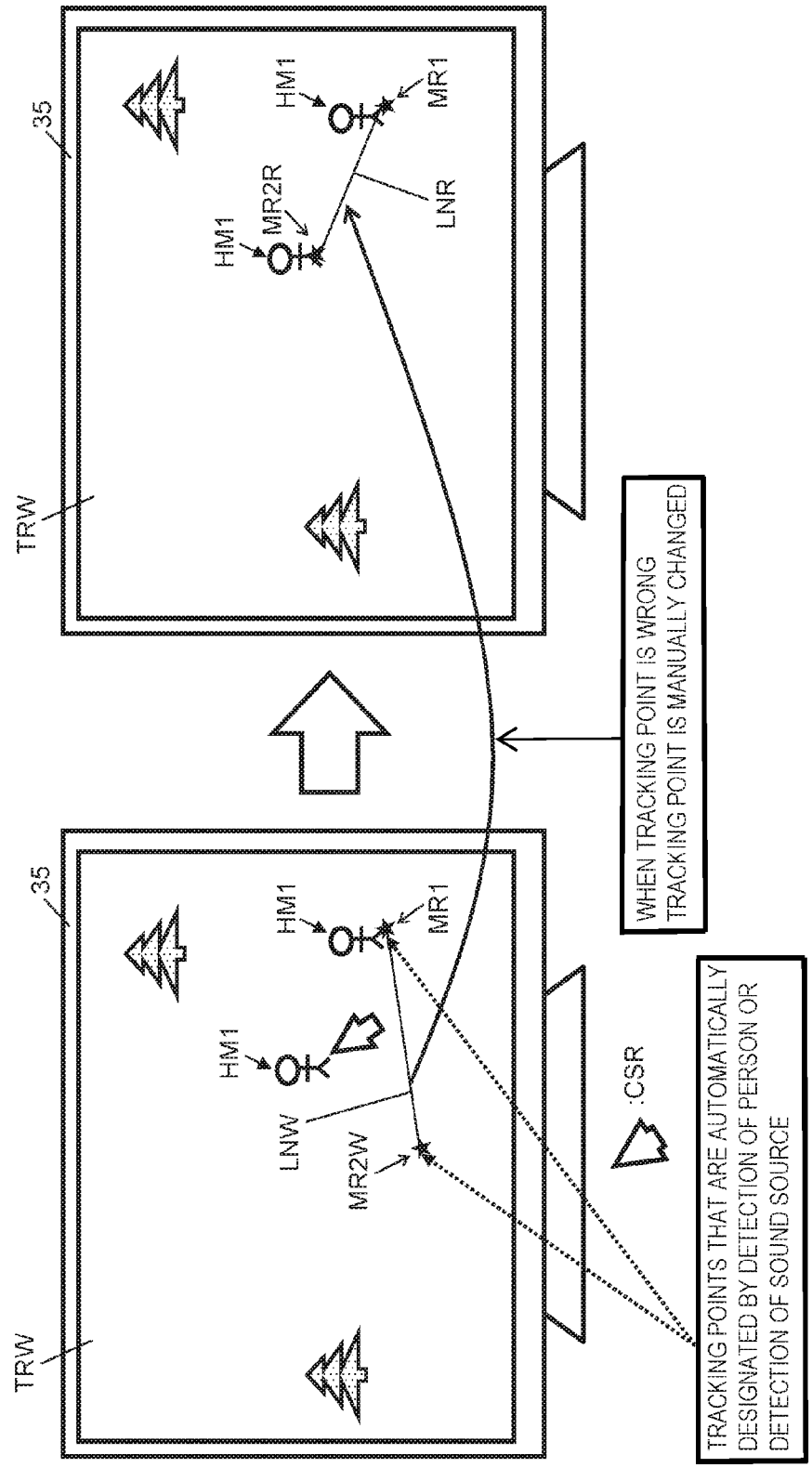

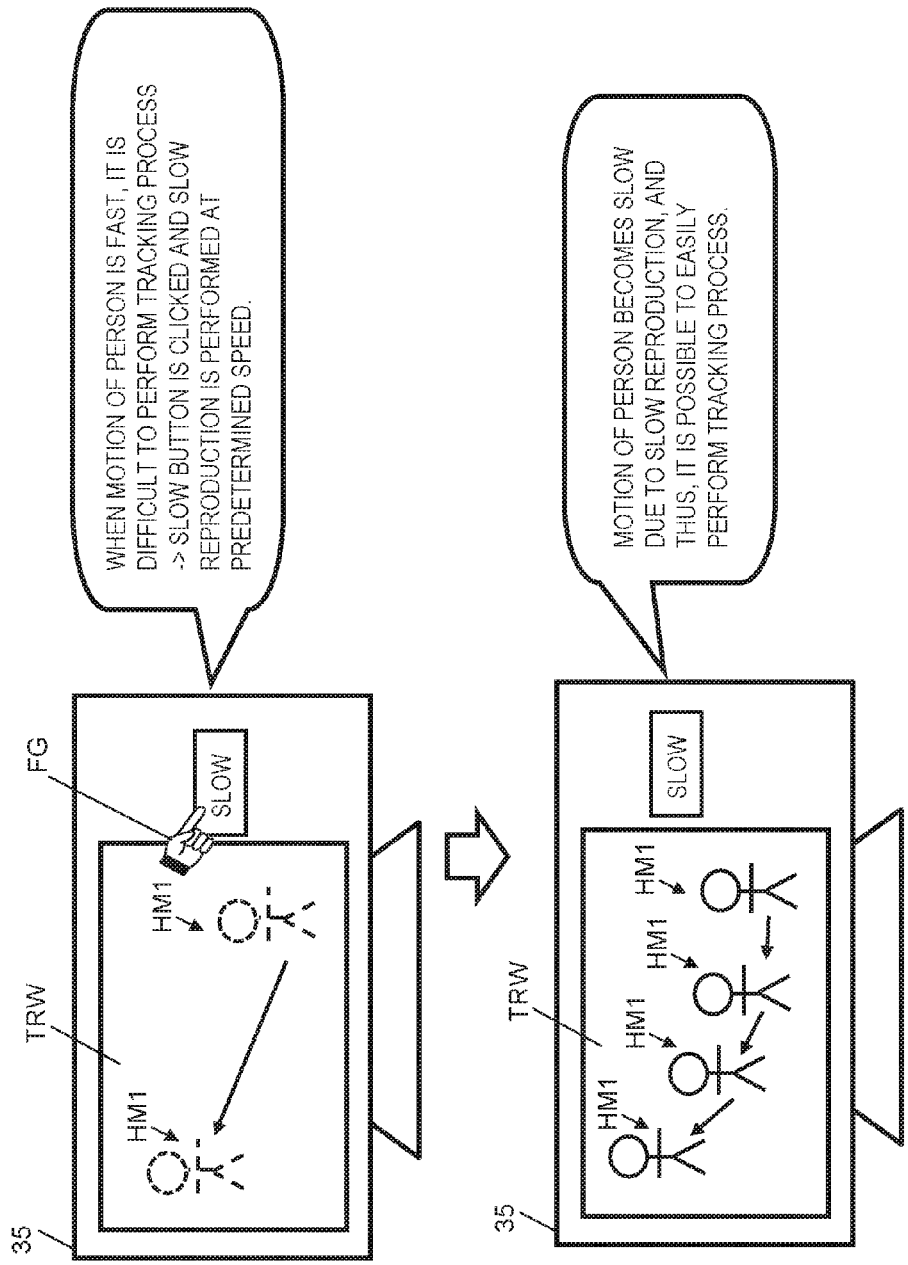

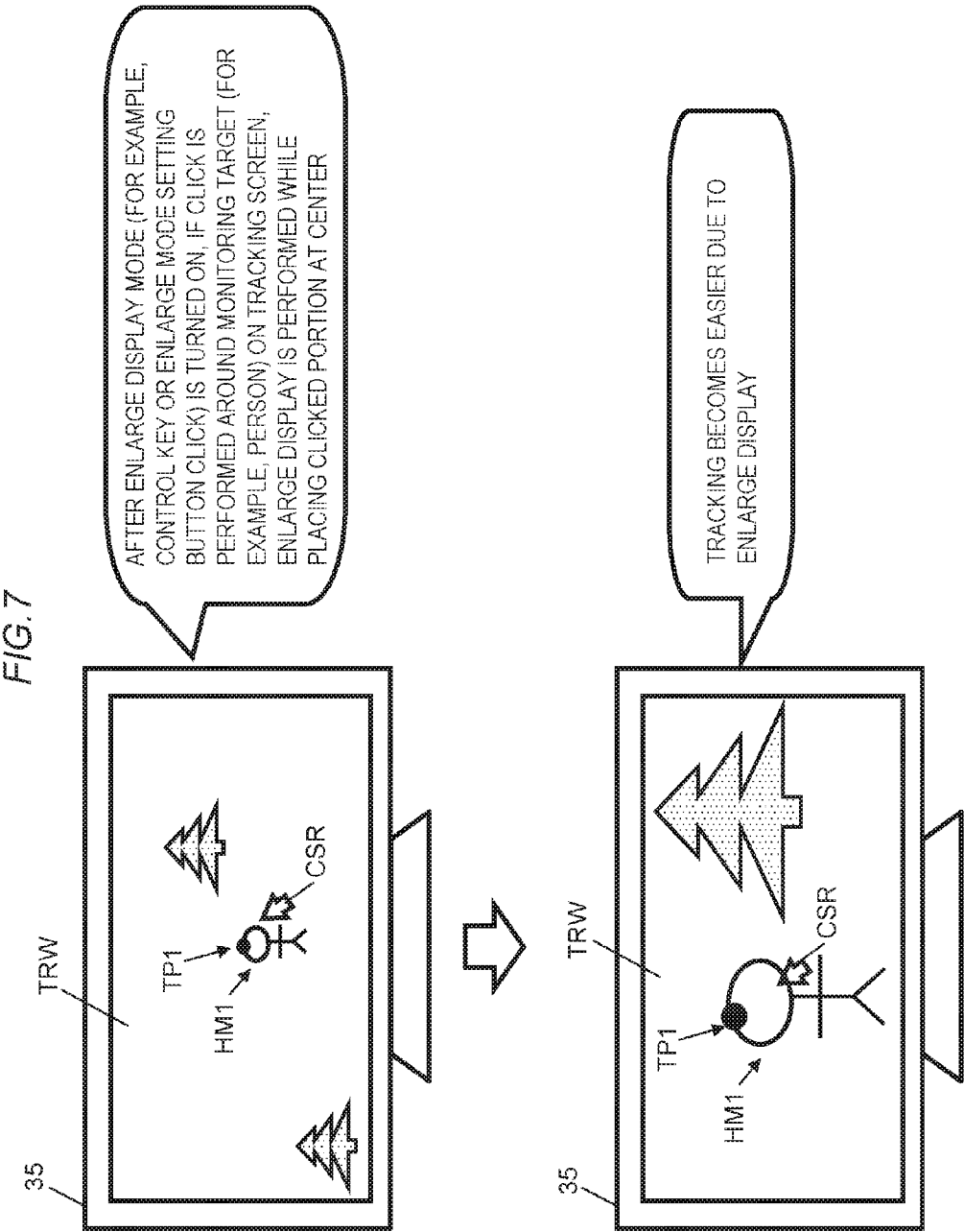

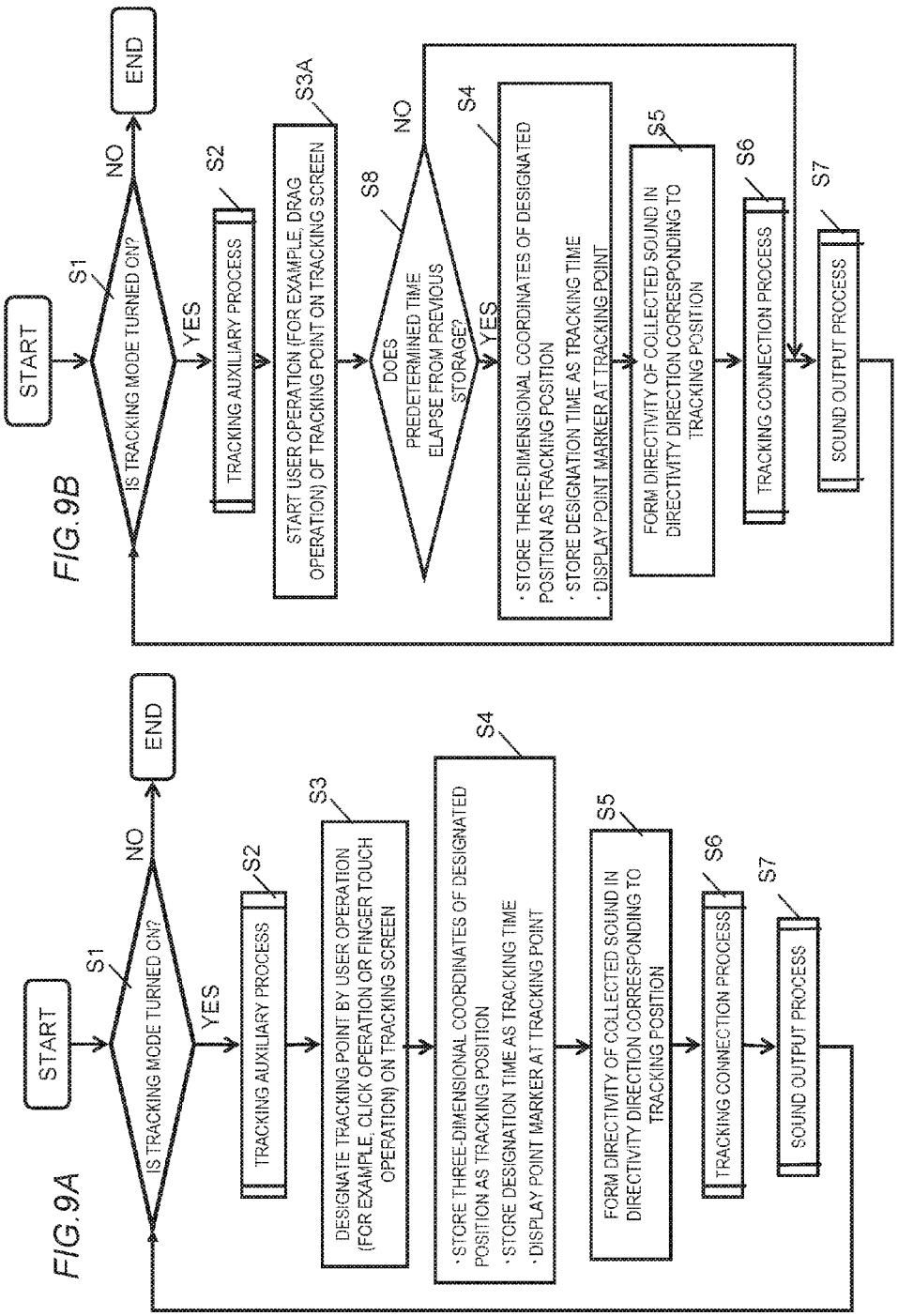

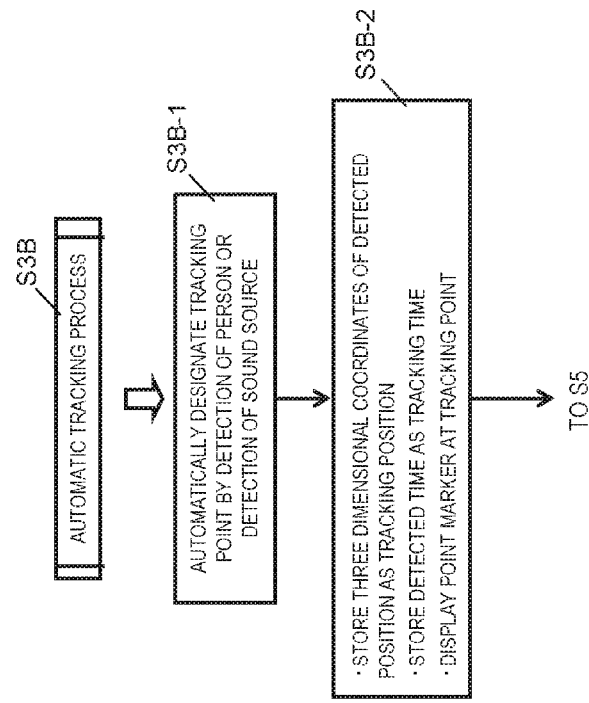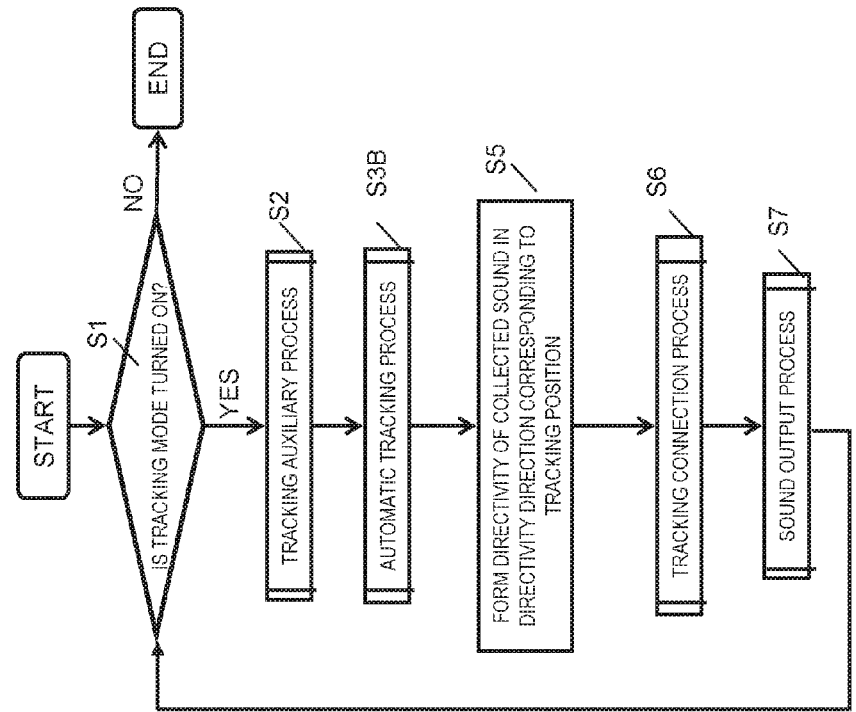

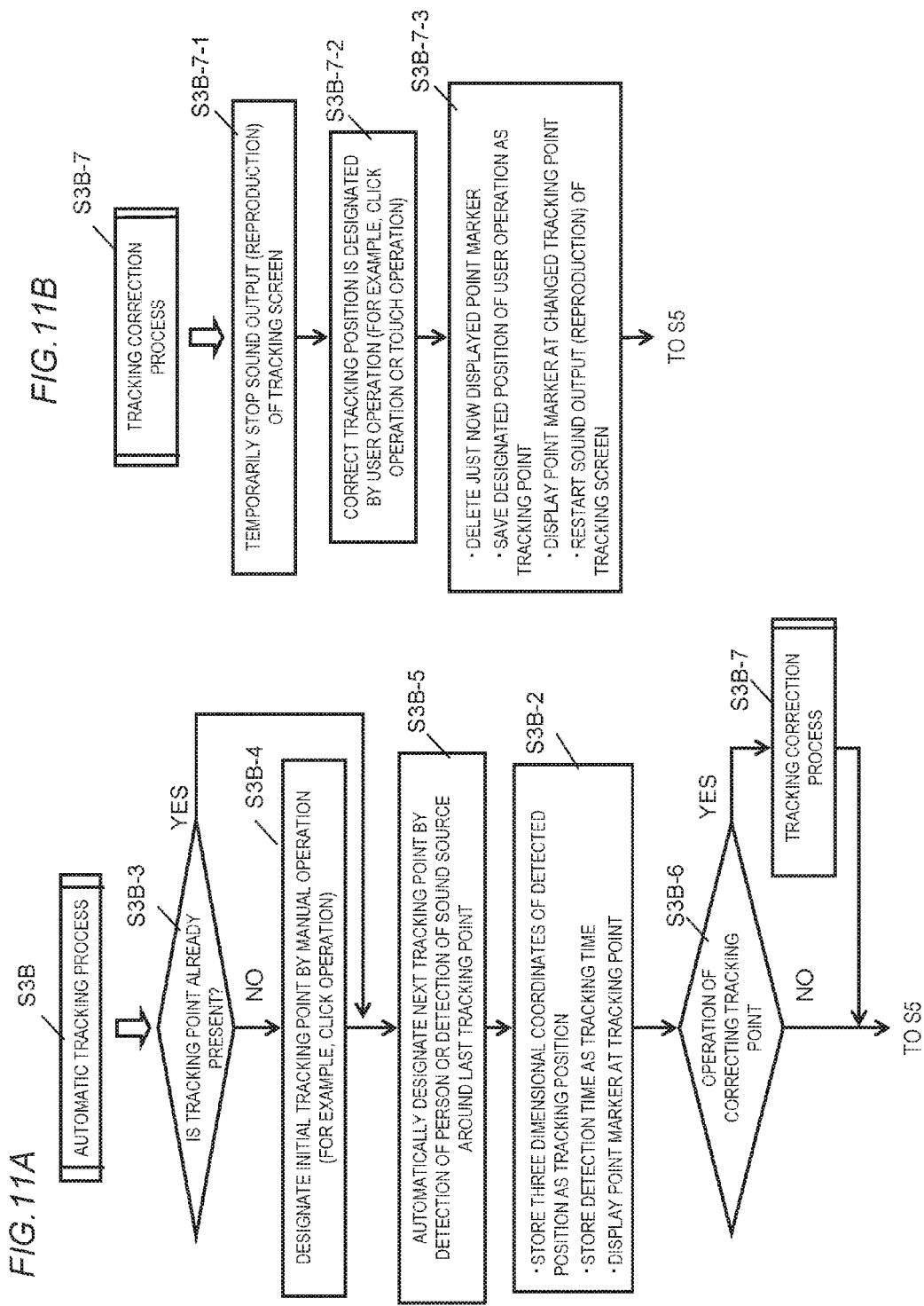

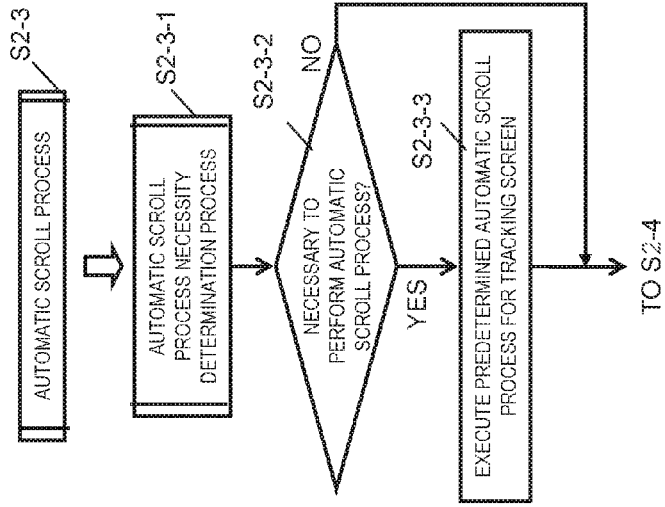
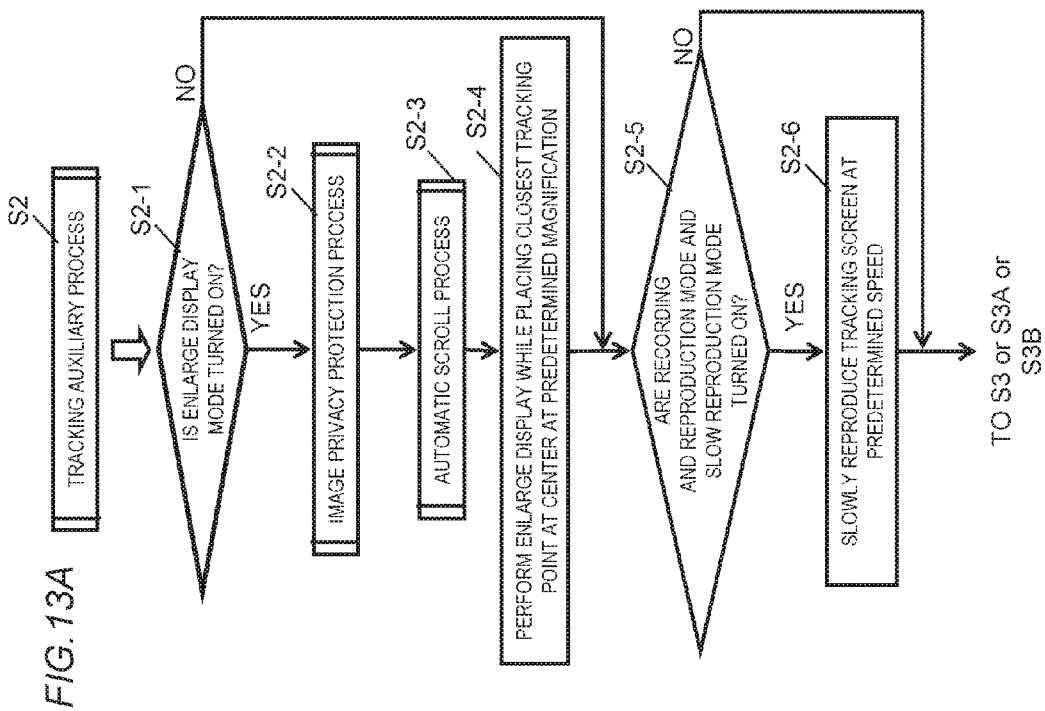

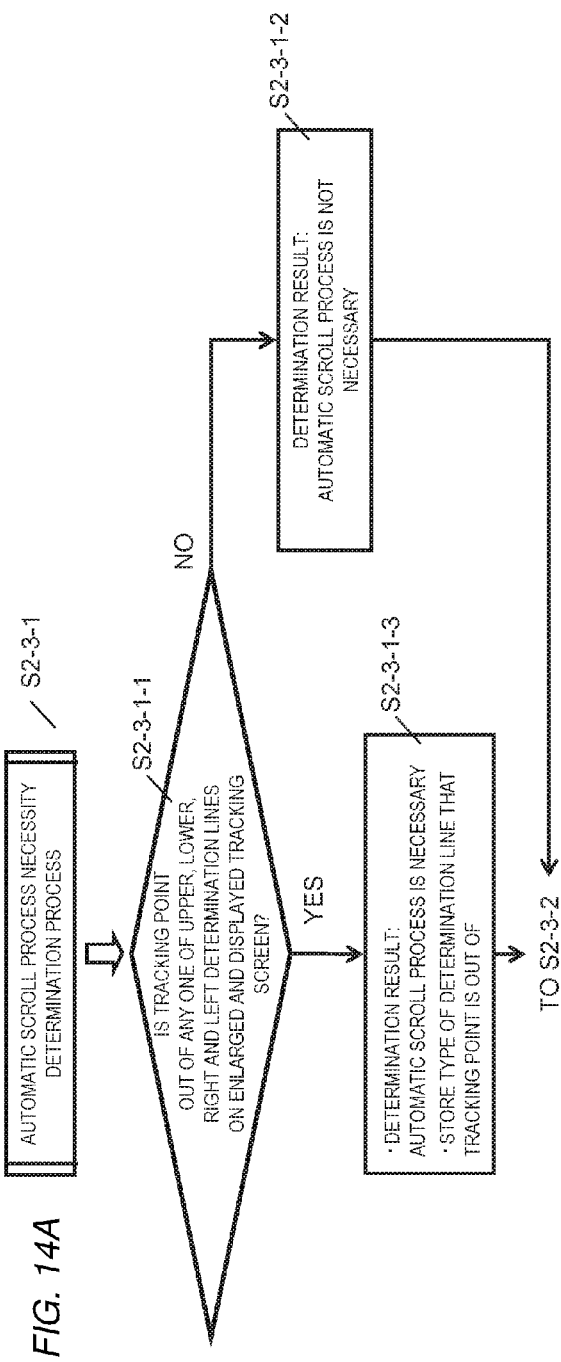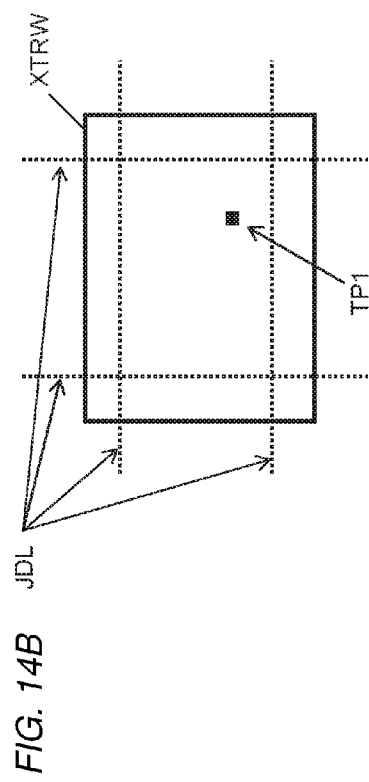

$PT = T1 + \{(T2 - T1) \times \sqrt{\{(x0-x1)^2 + (y0-y1)^2\}}/\sqrt{\{(x2-x1)^2 + (y2-y1)^2\}}\}$

| TRACKING POINT | TRACKING POSITION (x, y, z) | TRACKING TIME |
|---|---|---|
| TP1 (START POINT) | (x1, y1, z0) | T1 |
| TP2 | (x2, y2, z0) | T2 |
| TP3 | (x3, y3, z0) | T3 |
| TP4 (END POINT) | (x4, y4, z0) | T4 |

LST $$PT = T1 + (T2 - T1) \times \sqrt{\{(x0 - x11)^2 + (y0-y11)^2\}} / \sqrt{\{(x12-x11)^2 + (y12 - y11)^2\}}$$

| TRACKING POINT | TRACKING POSITION (x, y, z) | TRACKING TIME |
|---|---|---|
| (TP11, TP21) (START POINT) | {(x11, y11, z0), (x21, y21, z0)} | T1 |
| (TP12, TP22) | {(x12, y12, z0), (x22, y22, z0)} | T2 |
| (TP13, TP23) | {(x13, y13, z0), (x23, y23, z0)} | T3 |
| (TP14, TP24) (END POINT) | {(x14, y14, z0), (x24, y24, z0)} | T4 |

LST

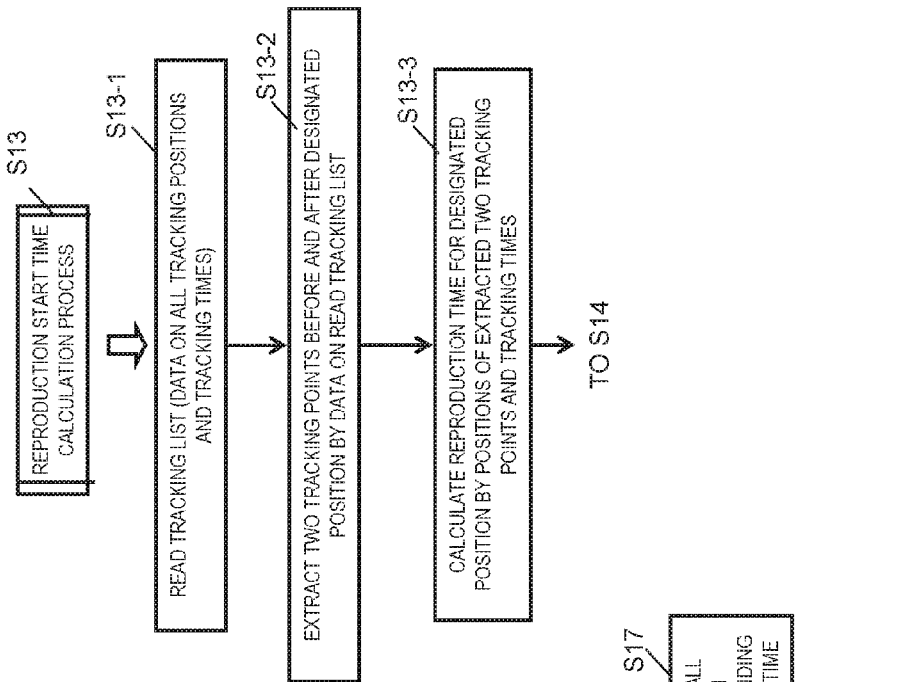
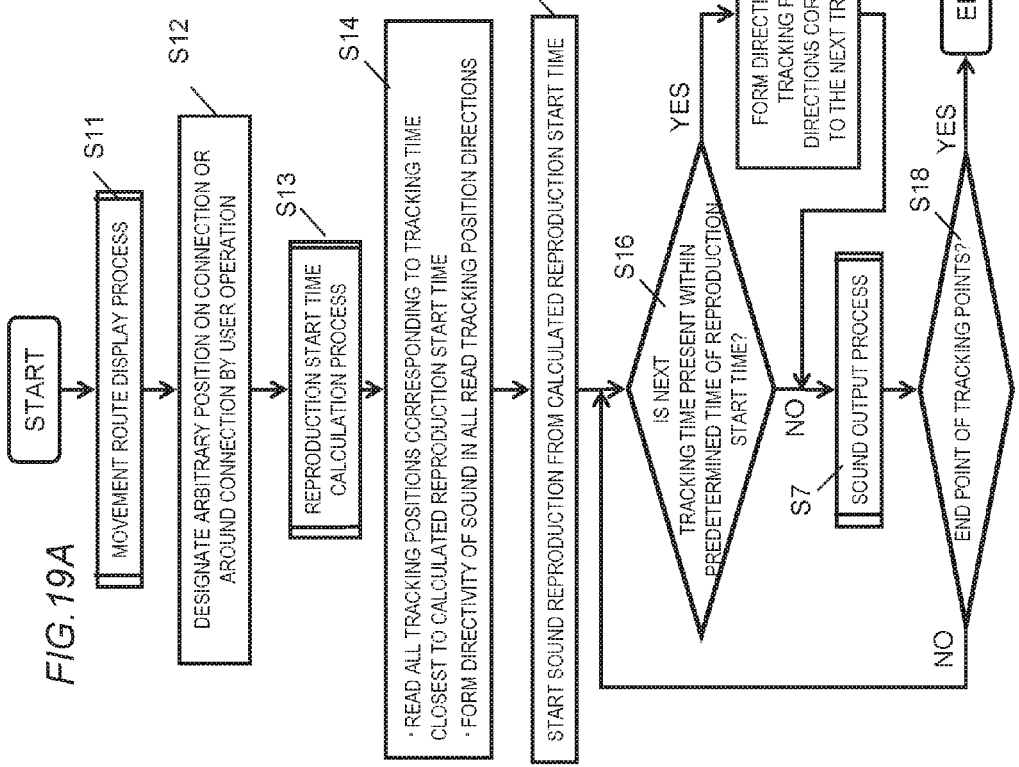

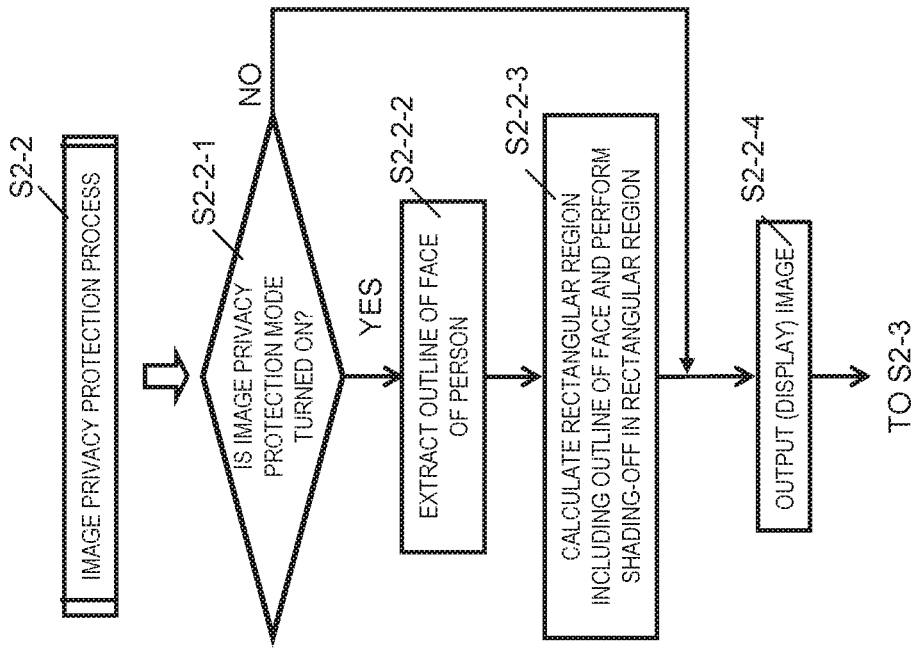
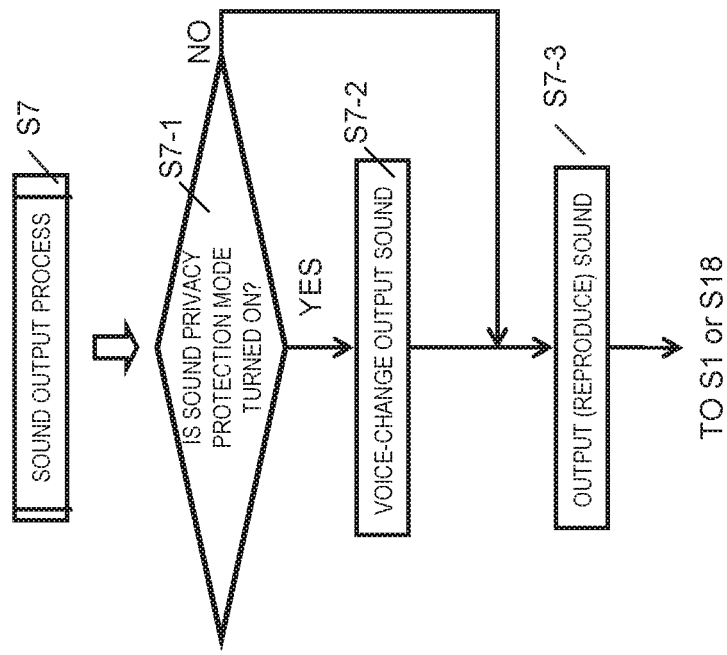

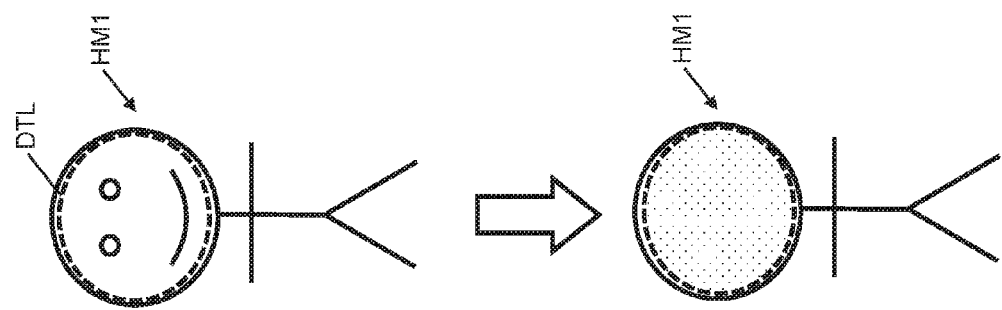
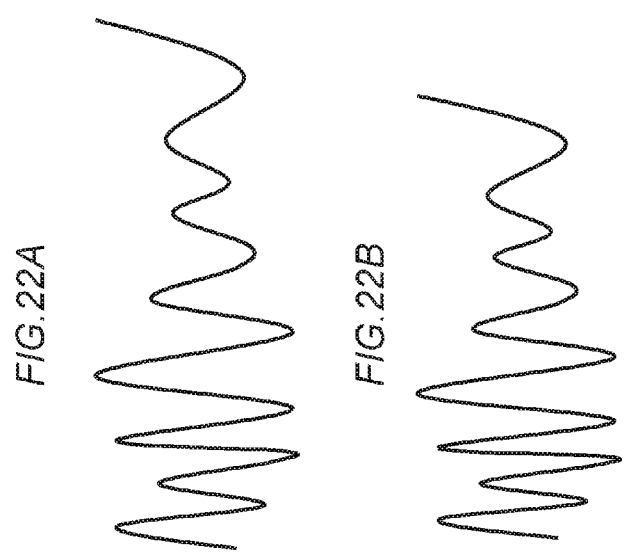
FIG. 22A
FIG. 22B
FIG. 22C

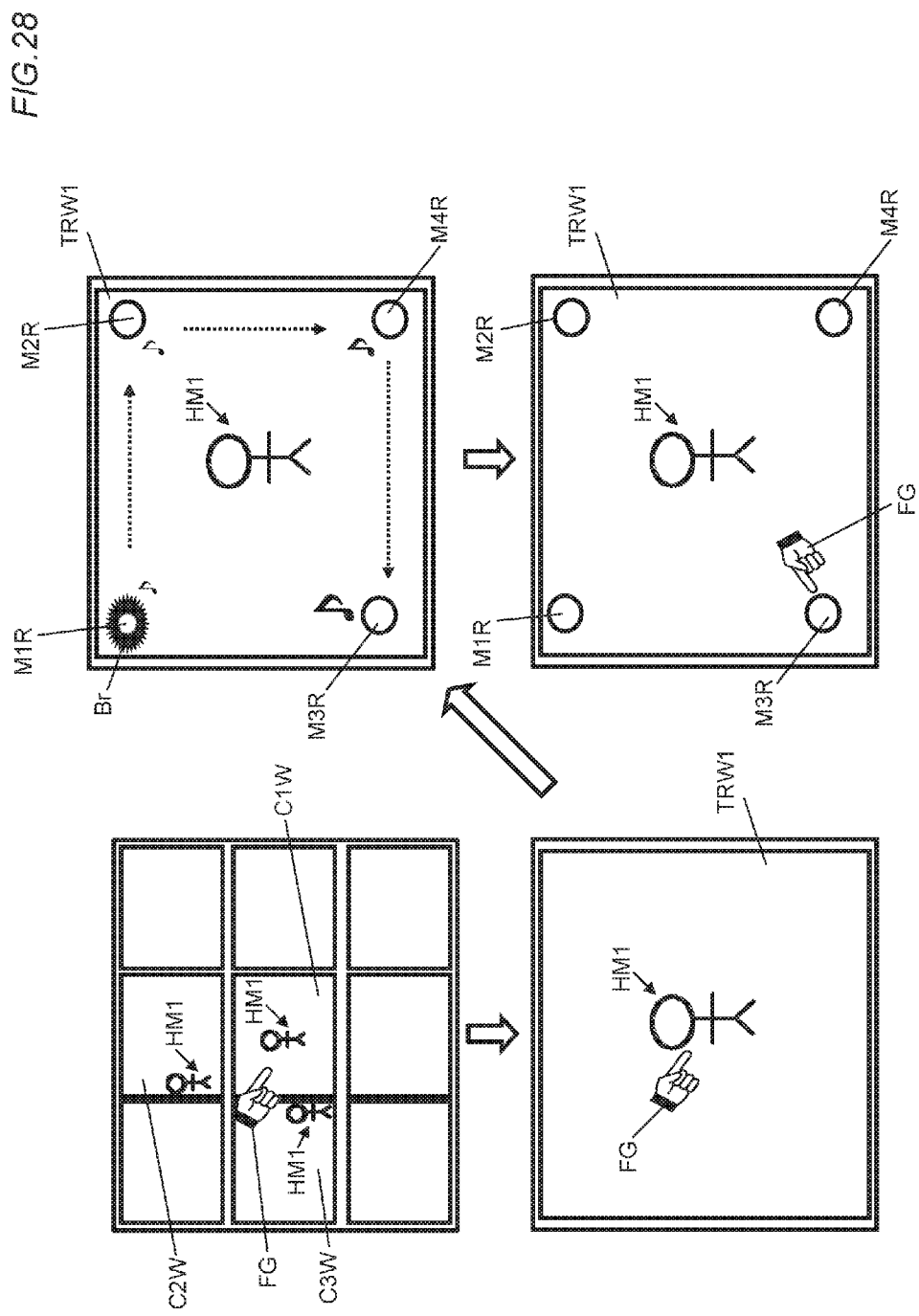

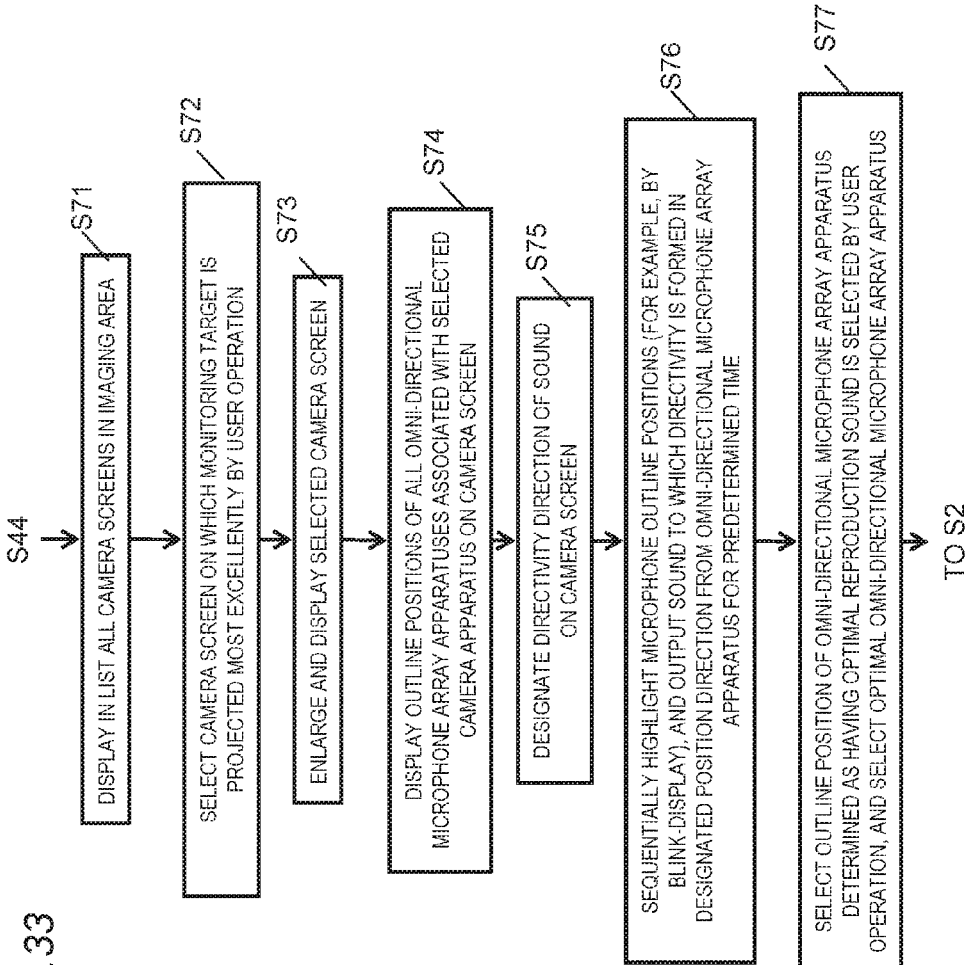

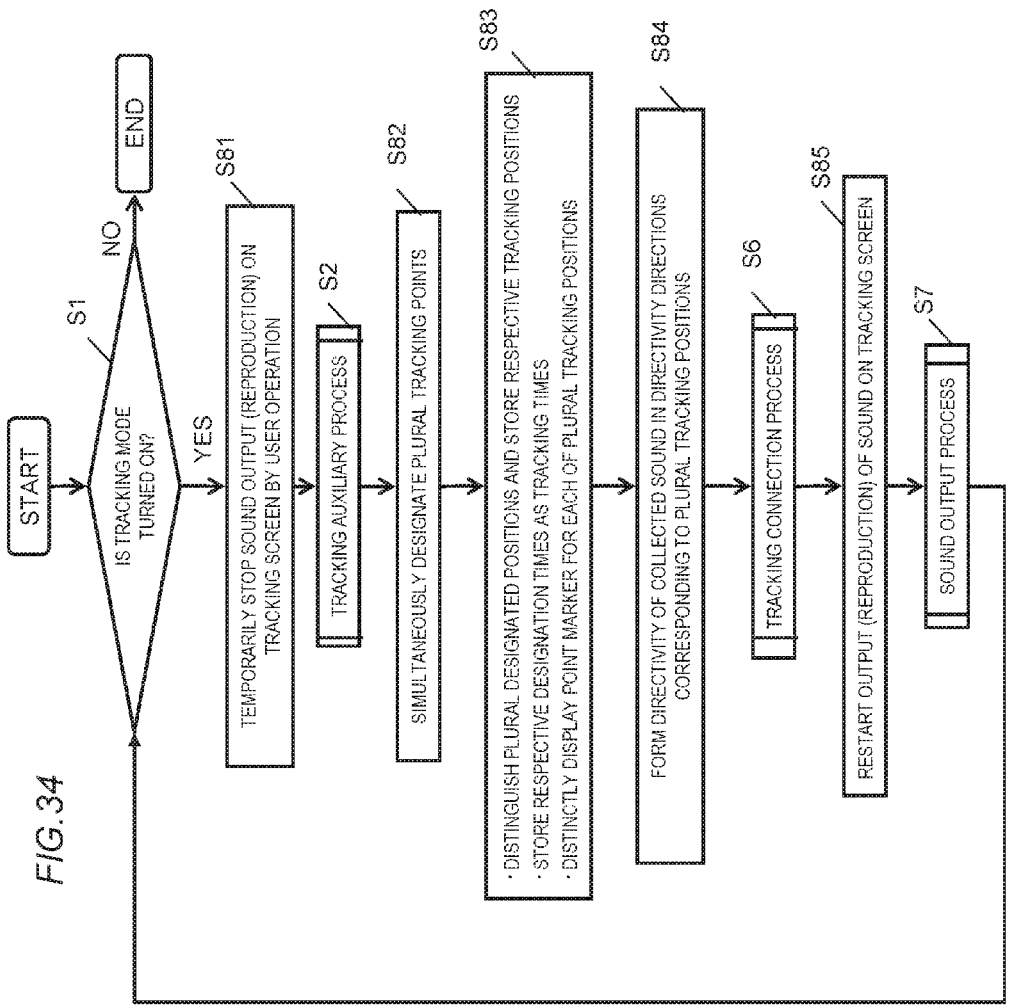

DIRECTIVITY CONTROL APPARATUS, DIRECTIVITY CONTROL METHOD, STORAGE MEDIUM AND DIRECTIVITY CONTROL SYSTEM

The present application is a continuation of U.S. application Ser. No. 15/439,990 filed on Feb. 23, 2017 which is a continuation of U.S. application Ser. No. 15/197,884 filed on Jun. 30, 2016, now U.S. Pat. No. 9,621,982, issued Apr. 11, 2017, which is a continuation of U.S. patent application Ser. No. 14/272,695 filed on May 8, 2014, now U.S. Pat. No. 9,414,153, issued Aug. 9, 2016. The entire disclosures of the above-identified applications, including the specifications, drawings and claims are incorporated herein by reference in their entireties.

BACKGROUND

1. Field of the Invention

The present invention relates to a directivity control apparatus, a directivity control method, a storage medium and a directivity control system for controlling directivity of a sound.

2. Description of the Related Art

In the related art, in a monitoring system installed at a predetermined position (for example, a ceiling surface) of a factory, a shop (for example, a retail store or a bank) or a public place (for example, a library), one or more camera apparatuses (for example, pan tilt zoom (PTZ) camera apparatuses or omni-directional camera apparatuses) are connected to the monitoring system through a network to achieve a wide field angle of image data on video within a monitoring target range. The image data may include a still image or a moving image.

Since the amount of information obtained in video monitoring is limited, a monitoring system capable of obtaining sound data emitted by a specific monitoring target (for example, a person) that is present within a field angle of a camera apparatus using a microphone array apparatus in which plural microphones are accommodated in addition to one or more camera apparatuses is highly demanded. Further, in the monitoring system, it is necessary to consider a movement of a person when the microphone array apparatus collects a sound.

Here, as a related art technique that draws tracking points by designating the tracking points from a start point to an end point of movement on a TV monitor screen on which an image captured by a TV camera is projected to make an input operation of a user simple, for example, a camera platform control apparatus of a TV camera disclosed in JP-A-6-133189 has been proposed.

In camera platform control apparatus of a TV camera disclosed in JP-A-6-133189, an image captured by a TV camera mounted on a camera platform provided with pan tilt driver is projected onto a TV monitor, tracking points from a start point to an end point of movement during automatic photographing are input on a screen of the TV monitor, and the sequentially input tracking points are sequentially connected to each other to form a tracking line, tracking data from the start point to the end point of the movement of the tracking line is sequentially read, and automatic photographing is executed so that the tracking point relating to the read data is positioned at the center of the photographing screen. Thus, in the camera platform control apparatus of the TV camera, as the tracking points are input on the screen of the TV monitor, it is possible to obtain tracking data on pan tilt driving by a simple input operation, and to accurately perform a driving control.

SUMMARY

However, since JP-A-6-133189 does not disclose a configuration in which the sound emitted by the person projected onto the TV monitor is collected, for example, even when the configuration disclosed in JP-A-6-133189 is applied to the above-described monitoring system, the sound from the person is not easily collected on the tracking points from the start point to the end point of the movement and is not collected with high accuracy.

In order to solve the above-mentioned problems, a non-limited object of the present invention is to provide a directivity control apparatus, a directivity control method, a storage medium and a directivity control system capable of appropriately forming, even when a monitoring target on an image moves, directivity of a sound with respect to the monitoring target in a tracking manner to prevent deterioration monitoring work efficiency of an observer.

A first aspect of the present invention provides a directivity control apparatus for controlling a directivity of a sound collected by a first sound collecting unit including a plurality of microphones, the directivity control apparatus including: a directivity forming unit, configured to form a directivity of the sound in a direction toward a monitoring target corresponding to a first designated position in an image displayed on a display unit; and an information obtaining unit, configured to obtain information on a second designated position in the image displayed on the display unit, designated in accordance with a movement of the monitoring target, wherein the directivity forming unit changes the directivity of the sound toward the monitoring target corresponding to the second designated position by referring to the information on the second designated position obtained by the information obtaining unit.

A second aspect of the present invention provides a directivity control method in a directivity control apparatus for controlling a directivity of a sound collected by a first sound collecting unit including a plurality of microphones, the directivity control method including: forming a directivity of the sound in a direction toward a monitoring target corresponding to a first designated position in an image displayed on a display unit; obtaining information on a second designated position in the image displayed on the display unit, designated in accordance with a movement of the monitoring target; and changing the directivity of the sound toward the monitoring target corresponding to the second designated position by referring to the information on the second designated position.

A third aspect of the present invention provides a storage medium in which a program is stored, the program causing a computer in a directivity control apparatus for controlling a directivity of a sound collected by a first sound collecting unit including a plurality of microphones, to execute: forming a directivity of the sound in a direction toward a monitoring target corresponding to a first designated position in an image displayed on a display unit; obtaining information on a second designated position in the image displayed on the display unit, designated in accordance with a movement of the monitoring target; and changing the directivity of the sound toward the monitoring target corresponding to the second designated position by referring to the information on the second designated position.

A fourth aspect of the present invention provides a directivity control system including: an imaging unit, configured to capture an image in a sound collecting area; a first sound collecting unit including a plurality of microphones, configured to collect a sound in the sound collecting area; and a directivity control apparatus, configured to control a directivity of the sound collected by the first sound collecting unit, wherein the directivity control apparatus includes: a directivity forming unit, configured to form a directivity of the sound in a direction toward a monitoring target corresponding to a first designated position in an image displayed on a display unit; and an information obtaining unit, configured to obtain information on a second designated position in the image displayed on the display unit, designated in accordance with a movement of the monitoring target, wherein the directivity forming unit changes the directivity of the sound toward the monitoring target corresponding to the second designated position by referring to the information on the second designated position obtained by the information obtaining unit.

According to any one of the aspects of the present invention, it is possible to appropriately form, even when a monitoring target in an image moves, directivity of a sound with respect to the monitoring target in a tracking manner to prevent deterioration of monitoring work efficiency of an observer.

BRIEF DESCRIPTION OF THE DRAWINGS

FIG. 4 is a diagram illustrating an operation example of a manual tracking process.

FIG. 5 is a diagram illustrating an operation example in which when a tracking point that is automatically designated in an automatic tracking process is wrong, the tracking point is changed by the manual tracking process.

FIG. 6 is a diagram illustrating a slow reproduction process in a recording and reproduction mode and a slow reproduction mode.

FIG. 7 is a diagram illustrating an enlarge display process in an enlarge display mode.

FIG. 9A is a flowchart illustrating a first example of an overall flow of the manual tracking process in the directivity control system according to the first embodiment, and FIG. 9B is a flowchart illustrating a second example of the overall flow of the manual tracking process in the directivity control system according to the first embodiment.

FIG. 10A is a flowchart illustrating a first example of an overall flow of the automatic tracking process in the directivity control system according to the first embodiment, and FIG. 10B is a flowchart illustrating the first example of the automatic tracking process shown in FIG. 10A.

FIG. 11A is a flowchart illustrating a second example of the automatic tracking process shown in FIG. 10A, and FIG. 11B is a flowchart illustrating an example of a tracking correction process shown in FIG. 11A.

FIG. 13A is a flowchart illustrating an example of a tracking auxiliary process shown in FIG. 9A, and FIG. 13B is a flowchart illustrating an example of an automatic scroll process shown in FIG. 13A.

FIG. 14A is a flowchart illustrating an example of an automatic scroll process necessity determination process shown in FIG. 13B, and FIG. 14B is a diagram illustrating a scroll necessity determination line in the automatic scroll process necessity determination process.

FIG. 19A is a flowchart illustrating an example of an overall flow of a movement route display reproduction process using the tracking list in the directivity control system according to the first embodiment, FIG. 19B is a flowchart illustrating an example of a reproduction start time calculation process shown in FIG. 19A.

FIG. 21A is a flowchart illustrating an example of a sound output process shown in FIG. 9A, and FIG. 21B is a flowchart illustrating an example of an image privacy protection process shown in FIG. 13A.

FIG. 22A is a diagram illustrating an example of a waveform of a sound signal corresponding to a pitch before a voice change process, FIG. 22B is a diagram illustrating an example of a waveform of a sound signal corresponding to a pitch after the voice change process, and FIG. 22C is a diagram illustrating a shading-off process of an outline of the face of a detected person.

FIG. 28 is a diagram illustrating a selection process of the omni-directional microphone array apparatus optimal for the sound collection of the monitoring target.

FIG. 33 is a flowchart illustrating a third example of the selection process of the omni-directional microphone array apparatus optimal in the directivity control system according to the second embodiment.

FIG. 34 is a flowchart illustrating an example of an overall flow of a manual tracking process based on plural simultaneous designations in a directivity control system according to a modification example of the first embodiment.

DETAILED DESCRIPTION

Hereinafter, respective embodiments of a directivity control apparatus, a directivity control method, a recording medium and a directivity control system according to the present invention will be described with reference to the accompanying drawings. The directivity control system in each embodiment is used as a monitoring system (including a manned monitoring system and an unmanned monitoring system) installed at a factory, a public facility (for example, a library or an event venue) or a shop (for example, a retail store or a bank).

The present invention may be expressed as a computer-readable recording medium on which a program that allows a directivity control apparatus that is provided as a computer to execute an operation regulated by a directivity control method or a program that allows a computer to execute the operation regulated by the directivity control method is recorded.

First Embodiment

Figure 1:
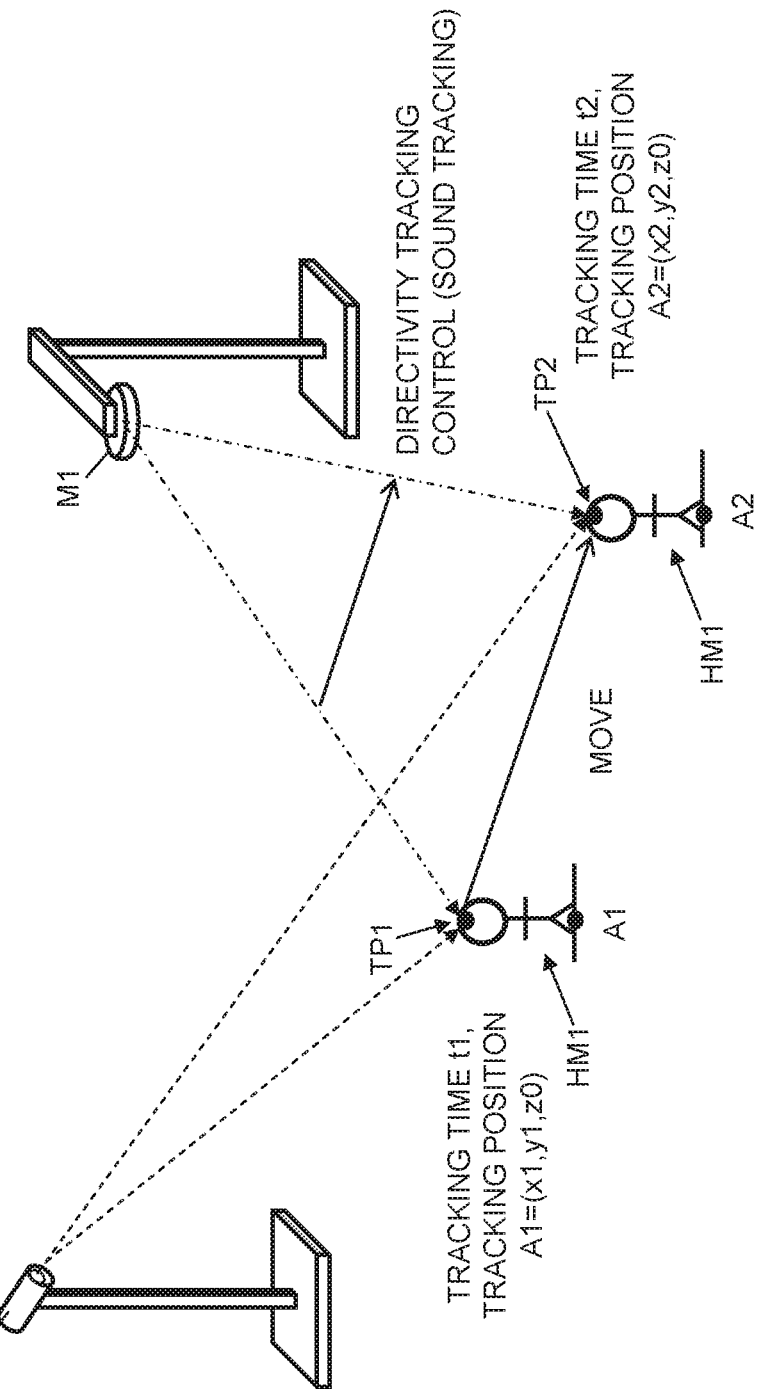
FIG. 1 is a diagram illustrating an operation outline of a directivity control system according to a first embodiment.
Figure 2:
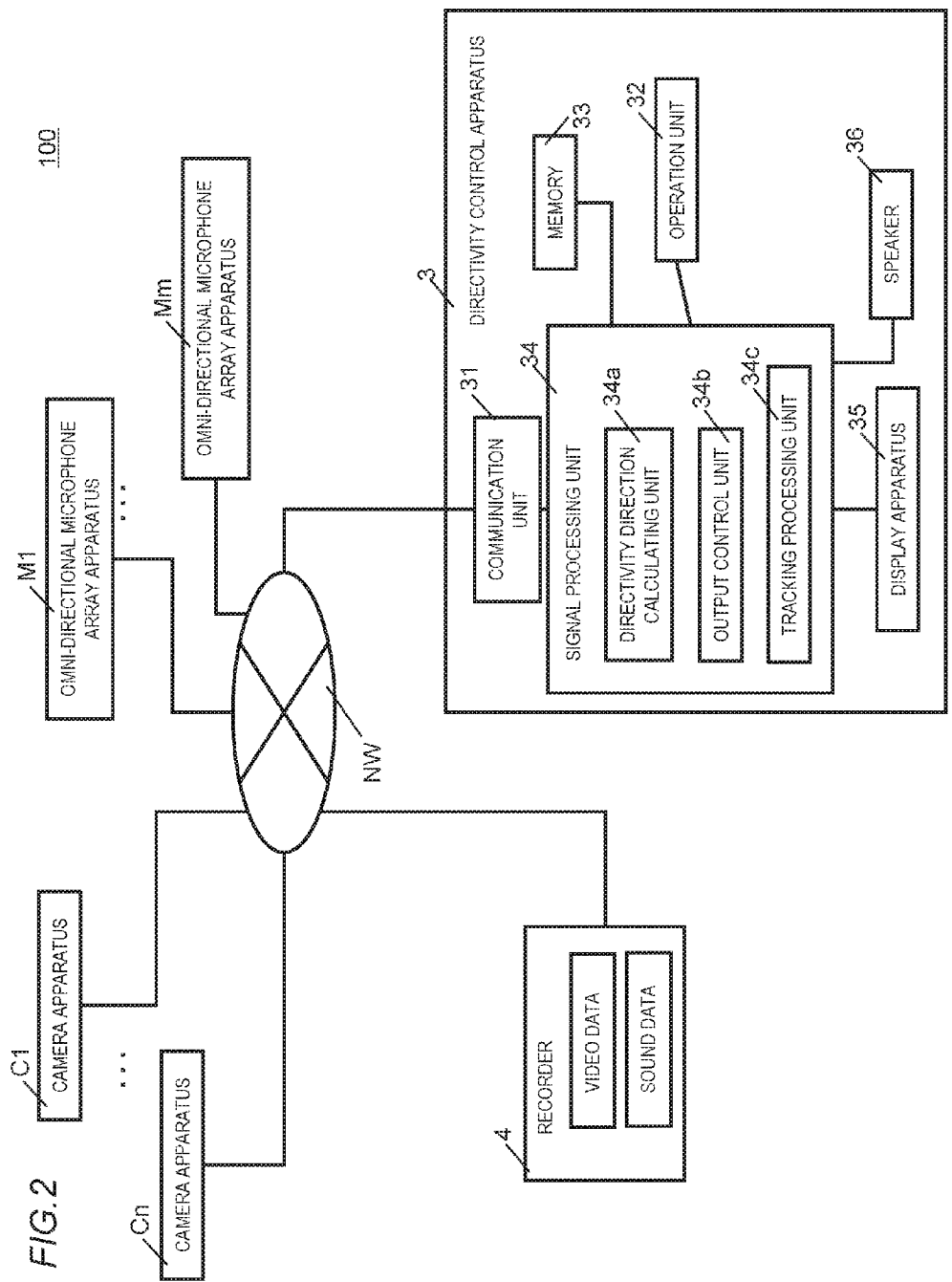
FIG. 2 is a block diagram illustrating a first system configuration example of the directivity control system according to the first embodiment.
Figure 3:
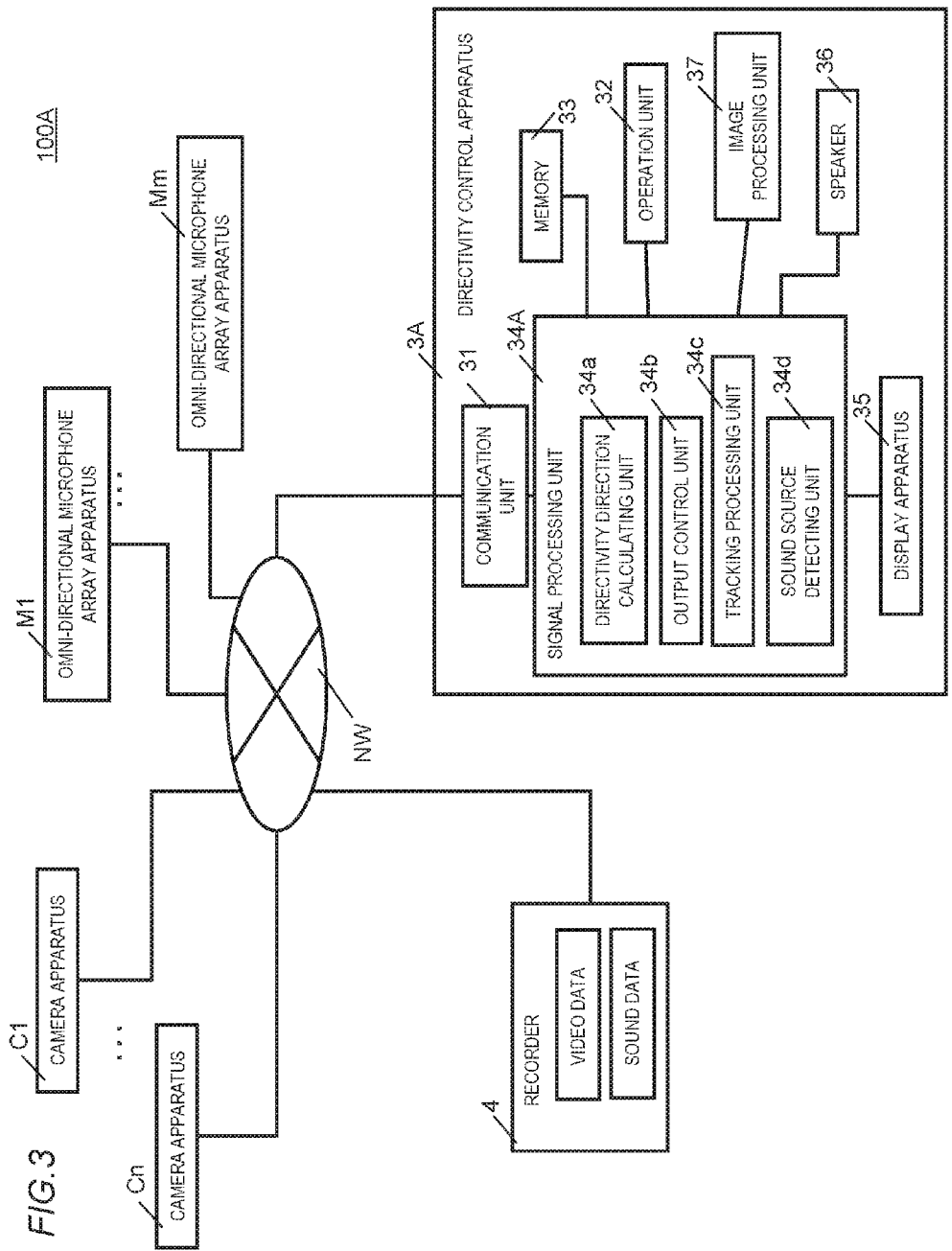
FIG. 3 is a block diagram illustrating a second system configuration example of the directivity control system according to the first embodiment.

FIG. 1 is a diagram illustrating an operation outline of directivity control systems 100 and 100A according to a first embodiment. FIG. 2 is a block diagram illustrating a first system configuration example of the directivity control system 100 according to the first embodiment. FIG. 3 is a block diagram illustrating a second system configuration example of the directivity control system 100A according to the first embodiment.

Specific configurations of the directivity control systems 100 and 100A will be described later. First, the operation outline of the directivity control systems 100 and 100A will be briefly described with reference to FIG. 1.

In FIG. 1, a camera apparatus C1 images a monitoring target (for example, a person HM1) of the directivity control systems 100 and 100A used as a monitoring system, for example, and transmits data on an image obtained by the imaging to a directivity control apparatus 3 connected through a network NW.

In the respective embodiments including the present embodiment, the person HM1 may be stationary or moving, but hereinafter, it is assumed that the person HM1 is moving. The person HM1 moves from a tracking position A1 (x1, y1, z0) at a tracking time t1, for example, to a tracking position A2 (x2, y2, z0) at a tracking time t2.

Here, a tracking point indicates, when the image of the moving person HM1 obtained by the imaging of the camera apparatus C1 is displayed on a tracking screen TRW of a display apparatus 35, a position where a user designates the person HM1 on the tracking screen TRW, i.e., indicates a position of the tracking screen TRW. The tracking point is associated with data on a tracking position and a tracking time (for example, refer to FIG. 16B as explained below). The tracking position refers to three-dimensional coordinates that represent the position in the actual space corresponding to the position on the tracking screen TRW where the person HM1 is designated.

Further, the tracking screen TRW refers to a specific screen among a screen (hereinafter, referred to as camera screen) where the image obtained by the imaging of the camera apparatus (for example, the camera apparatus C1) is displayed in the display apparatus 35, which represents a screen on which the person HM1, for example, is projected as a monitoring target that is a target of sound tracking process (to be described later). In the following respective embodiments, a screen on which the person HM1 or the like is not projected as the monitoring target is referred to as a camera screen, and a screen on which the person HM1 or the like is projected as the monitoring target is referred to as a tracking screen. The camera screen and the tracking screen are distinctly used unless otherwise described.

In FIG. 1, for ease of description, it is assumed that the same person HM1 is moving, and thus, z coordinates of the tracking positions at tracking points TP1 and TP2 are equal to each other. (See FIG. 1, It is assumed that heights (z axis) of tracking points are the same.) Further, even when the person HM1 moves from the tracking position A1 to the tracking position A2, the person HM1 is imaged by the camera apparatus C1, but the camera apparatus C1 may continuously image the person HM1 according to the movement of the person HM1, or may stop the imaging. (See FIG.

1, The camera apparatus may or may not perform imaging while tracking movement of monitoring target (person HM1).)

An omni-directional microphone array apparatus M1 collects a sound from the person HM1, and transmits the sound data that is collected to the directivity control apparatus 3 connected through the network NW.

When the person HM1 that is the monitoring target is stationary at the tracking position A1, the directivity control apparatus 3 forms directivity of the collected sound in a directivity direction from the omni-directional microphone array apparatus M1 toward the tracking position A1. Further, when the person HM1 moves from the tracking position A1 to the tracking position A2, the directivity control apparatus 3 switches and forms the directivity of the collected sound into a directivity direction from the omni-directional microphone array apparatus M1 toward the tracking position A2. (See FIG. 1, Directivity of collected sound is formed by switching the direction from omni-directional microphone array apparatus M1 toward tracking position A1 (three-dimensional position in actual space) of tracking point TP1 (designated position on screen) to the direction from omni-directional microphone array apparatus M1 toward tracking position A2 (three dimensional position in actual space) of tracking point TP2 (designated position on screen).

In other words, according to the movement of the person HM1 that is the monitoring target from the tracking position A1 to the tracking position A2, the directivity control apparatus 3 tracking-controls, i.e., performs a sound tracking process on the directivity of the collected sound from the direction from the omni-directional microphone array apparatus M1 toward the tracking position A1 to the direction from the omni-directional microphone array apparatus M1 toward the tracking position A2.

The directivity control system 100 shown in FIG. 2 includes one or more camera apparatuses C1, ..., Cn, one or more omni-directional microphone array apparatuses M1, ..., Mm, the directivity control apparatus 3 and a recorder 4. Here, n and m represent an integer of 1 or greater, which may be the same, or may be different from each other. This is similarly applied to the following respective embodiments.

The camera apparatus C1, ..., Cn, the omni-directional microphone array apparatuses M1, ..., Mm, the directivity control apparatus 3 and the recorder 4 are connected to each other through the network NW. The network NW may be a wired network (for example, an intranet or the Internet), a wireless network (for example, a wireless local area network (LAN), WiMAX (registered trademark) or a wireless wide area network (WAN)). Hereinafter, in the present embodiment, for ease of description, a configuration in which one camera apparatus C1 and one omni-directional microphone array apparatus M1 are provided is used.

Hereinafter, the respective apparatuses that form the directivity control system 100 will be described. In the respective embodiments including the present embodiment, a housing of the camera apparatus C1 and a housing of the omni-directional microphone array apparatus M1 are mounted at different positions separately, but the housing of the camera apparatus C1 and the housing of the omni-directional microphone array apparatus M1 may be integrally mounted at the same position.

The camera apparatus C1 that is an example of an imaging unit is fixedly mounted to a ceiling surface of an event venue, for example, and has a function as a monitoring camera in a monitoring system. The camera apparatus C1 captures an image in a predetermined field angle of the camera apparatus C1 in a predetermined sound collecting area (for example, a predetermined area in the event venue) by a remote control operation from a monitoring control chamber (not shown) connected to the network NW. The camera apparatus C1 may be a camera having a PTZ function, or may be a camera capable of performing imaging in omni-directions. When the camera apparatus C1 is the camera capable of performing imaging in omni-directions, the camera C1 transmits image data (that is, omni-directional image data) indicating omni-directional images in the sound collecting area or planar image data generated by performing a predetermined distortion correction process for the omni-directional images data to perform panorama conversion to the directivity control apparatus 3 or to the recorder 4 through the network NW.

If an arbitrary position in image data displayed in the display apparatus 35 is designated by a cursor CSR or a finger FG of the user, the camera apparatus C1 receives coordinate data on the designated position in the image data from the directivity control apparatus 3, calculates data on a distance and a direction (including a horizontal angle and a vertical angle, which is the same with the following description) from the camera apparatus C1 to a sound position in an actual space corresponding to the designated position (hereinafter, simply referred to as a "sound position"), and transmits the calculated data to the directivity control apparatus 3. Since the process of calculating the data on the distance and the direction in the camera apparatus C1 is a known technique in the related art, its description is not made herein.

The omni-directional microphone array apparatus M1 that is an example of a sound collecting unit is fixedly mounted to a ceiling surface of an event venue, for example, and includes at least the following, a microphone part in which plural microphone units 22 and 23 (see FIGS. 36A to 36E) are provided at equal intervals and a central processing unit (CPU) that controls operations of the respective microphone units 22 and 23 of the microphone part.

If a power is supplied, the omni-directional microphone array apparatus M1 performs a predetermined sound signal processing (for example, an amplification process, a filtering process and an addition process) for sound data on a sound collected by the microphone element of the microphone unit, and transmits the sound data obtained by the predetermined sound signal processing to the directivity control apparatus 3 or the recorder 4 through the network NW.

Here, the appearance of the housing of the omni-directional microphone array apparatus M1 will be described with reference to FIGS. 36A to 36E. FIGS. 36A to 36E are appearance drawings of the housing of the omni-directional microphone array apparatus M1. In omni-directional microphone array apparatuses M1C, M1A, M1B, M1 and M1D shown in FIGS. 36A to 36E, the appearances and arrangement positions of plural microphone units are different from each other, but the functions of the omni-directional microphone array apparatuses are the same.

Figure 36:
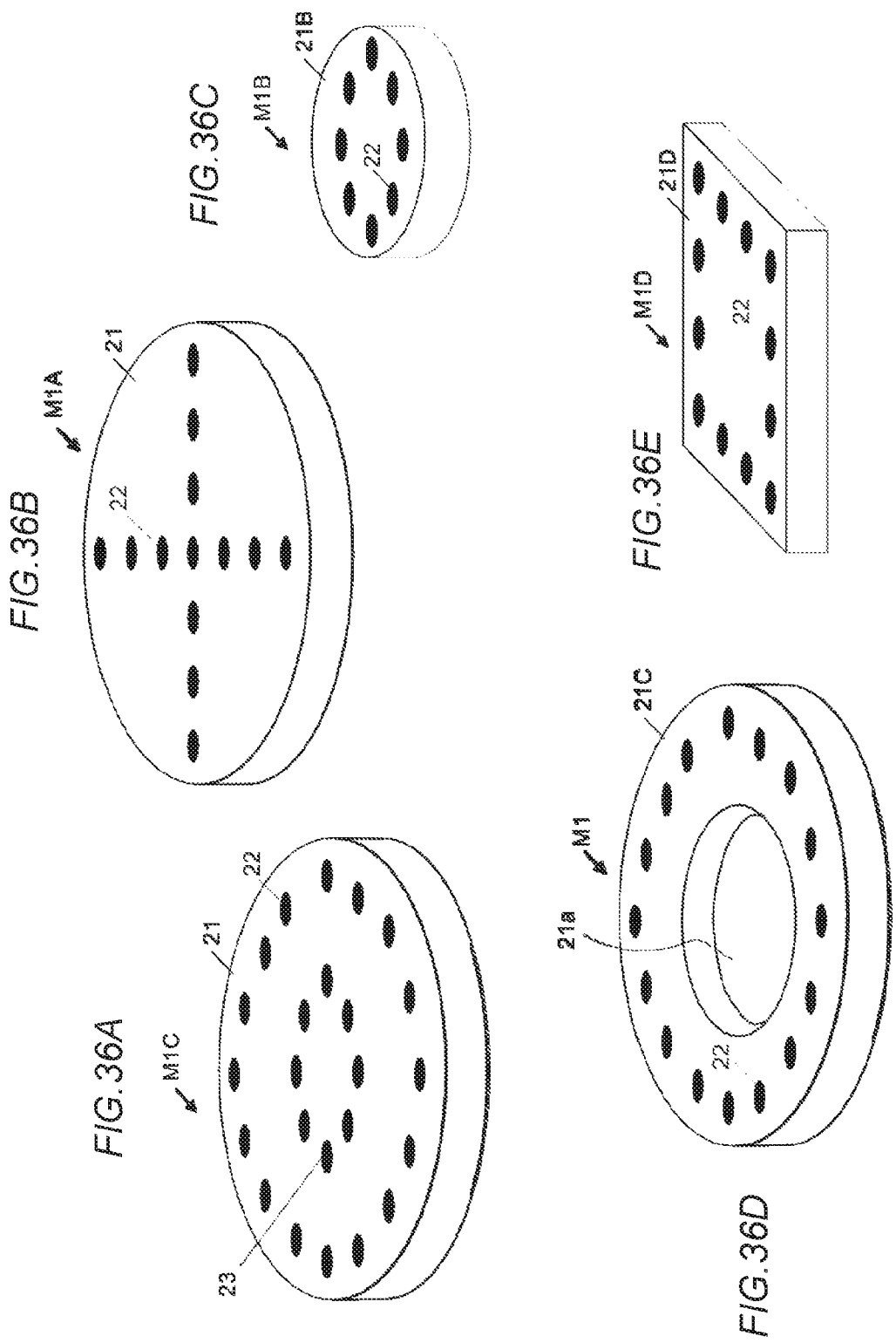
FIGS. 36A to 36E are appearance drawings of a housing of the omni-directional microphone array apparatus.

The omni-directional microphone array apparatus M1C shown in FIG. 36A has a disk shaped housing 21. In the housing 21, the plural microphone units 22 and 23 are concentrically arranged. Specifically, the plural microphone units 22 are arranged in a concentric circle shape having the same center as the housing 21 along the circumference of the housing 21, and the plural microphone units 23 are arranged in a concentric circle shape having the same center as the housing 21 on the inside of the housing 21. The respective microphone units 22 are arranged with a wide interval, each of which has a large diameter and has a characteristic suitable for a low sound range. On the other hand, the respective microphone units 23 are arranged in a narrow interval, each of which has a small diameter and has a characteristic suitable for a high sound range.

The omni-directional microphone array apparatus M1A shown in FIG. 36B has the disk shaped housing 21. In the housing 21, the plural microphone units 22 are arranged in a cross shape along two directions of a longitudinal direction and a transverse direction at equal intervals, in which the longitudinal array and the transverse array cross each other at the center of the housing 21. In the omni-directional microphone array apparatus M1A, the plural microphone units 22 are linearly arranged in two directions of the longitudinal direction and the transverse direction, and thus, it is possible to reduce an arithmetic amount in formation of the directivity of the sound data. In the omni-directional microphone array apparatus M1A shown in FIG. 36B, the plural microphone units 22 may be arranged on only one line in the longitudinal direction or in the transverse direction.

The omni-directional microphone array apparatus M1B shown in FIG. 36C has a disk shaped housing 21B having a small diameter, compared with the omni-directional microphone array apparatus M1C shown in FIG. 36A. In the housing 21B, the plural microphone units 22 are arranged at equal intervals along the circumference of the housing 21B. Since the interval of the respective microphone units 22 is short, the omni-directional microphone array apparatus M1B shown in FIG. 36C has a characteristic suitable for a high sound range.

The omni-directional microphone array apparatus M1 shown in FIG. 36D has a housing 21C which is in a donut shape or a ring shape and in which an opening portion 21a having a predetermined diameter is formed at the center of the housing 21C. In the directivity control systems 100 and 100A according to the present embodiment, the omni-directional microphone array apparatus M1 shown in FIG. 36D is used. In the housing 21C, the plural microphone units 22 are concentrically arranged at equal intervals along the circumferential direction of the housing 21C.

The omni-directional microphone array apparatus M1D shown in FIG. 36E has a rectangular housing 21D. In the housing 21D, the plural microphone units 22 are arranged at equal intervals along the circumference of the housing 21D. In the omni-directional microphone array apparatus M1D shown in FIG. 36E, since the housing 21D has the rectangular shape, it is possible to simplify mounting of the omni-directional microphone array apparatus M1D even at a corner or on a wall surface, for example.

The microphone units 22 and 23 of the omni-directional microphone array apparatus M1 may be a non-directional microphone, a bi-directional microphone, a unidirectional microphone, a sharp directional microphone, a super-directional microphone (for example, a shotgun microphone), or a combination thereof.

For example, the directivity control apparatuses 3 and 3A may be a stationary PC installed in a monitoring control chamber (not shown), or may be a data communication terminal that can be carried by a user, such as a mobile phone, a personal digital assistant (PDA), a tablet terminal or a smart phone.

The directivity control apparatus 3 includes at least the following, a communication unit 31, an operation unit 32, a memory 33, a signal processing unit 34, a display apparatus 35 and a speaker 36. The signal processing unit 34 includes at least the following, a directivity direction calculating unit 34a, an output control unit 34b and a tracking processing unit 34c.

The communication unit 31 receives the image data transmitted from the camera apparatus C1 or the sound data transmitted from the omni-directional microphone array apparatus M1, and outputs the received image data or sound data to the signal processing unit 34.

The operation unit 32 corresponds to a user interface (UI) for notifying the signal processing unit 34 of a user's input operation, and the operation unit 32 is, for example, a pointing device such as a mouse or a keyboard. Further, the operation unit 32 may be disposed corresponding to a display screen of the display apparatus 35, and may be formed using a touch panel capable of detecting an input operation by means of a finger FG of the user or a stylus pen.

The operation unit 32 outputs coordinate data on the designated position designated by the cursor CSR using a mouse operation of the user or the finger FG of the user in the image data (that is, the image data obtained by the imaging of the camera apparatus C1) displayed in the display apparatus 35 to the signal processing unit 34.

The memory 33 is configured by a random access memory (RAM), for example, and functions as a work memory when the respective units of the directivity control apparatus 3 are operated. Further, the memory 33 that is an example of an image storage unit or a sound storage unit is configured by a hard disk or a flash memory, for example, and stores the image data or the sound data stored in the recorder 4, that is, the image data obtained by the imaging of the camera apparatus C1 or the sound data collected by the omni-directional microphone array apparatus M1 for a predetermined period of time.

The memory 33 that is an example of a designation list storage unit stores data on a tracking list LST (for example, see FIG. 16B) that is an example of a designation list that includes data on all the designated positions on the tracking screen TRW of the image data displayed in the display apparatus 35 and designation times (to be described later).

The signal processing unit 34 is configured by a central processing unit (CPU), a micro processing unit (MPU) or a digital signal processor (DSP), for example, and performs a control process for controlling overall operations of the respective units of the directivity control apparatus 3, a data input/output process with respect to the other units, a data computation (calculation) process and a data storage process.

If the coordinate data on the designated position of the image data designated by the cursor CSR using the mouse operation of the user or the finger FG of the user is obtained from the operation unit 32 during calculation of directivity direction coordinates ($\theta_{MAh}$, $\theta_{MAv}$), the directivity direction calculating unit 34a transmits the coordinate data to the camera apparatus C1 through the communication unit 31. The directivity direction calculating unit 34a obtains data on the distance and the direction from the mounting position of the camera apparatus 1 to the sound (sound source) position in the actual space corresponding to the designated position of the image data, through the communication unit 31.

The directivity direction calculating unit 34a calculates the directivity direction coordinates ($\theta_{MAh}$, $\theta_{MAv}$) from the mounting position of the omni-directional microphone array apparatus M1 toward the sound position using the data on the distance and the direction from the mounting position of the camera apparatus C1 to the sound position.

Further, as in the present embodiment, when the housing of the camera apparatus C1 and the housing of the omni-directional microphone array apparatus M1 are separately mounted, the directivity direction calculating unit 34a calculates the directivity direction coordinates ($\theta_{MAh}$, $\theta_{MAv}$)

from the omni-directional microphone array apparatus M1 to the sound position (sound source position), using data on a predetermined calibration parameter that is calculated in advance and the data on the direction (horizontal angle and vertical angle) from the camera apparatus C1 to the sound position (sound source position). Here, the calibration refers to an operation of calculating or obtaining a predetermined calibration parameter necessary for calculating the directivity direction coordinates ($\theta_{MAh}$, $\theta_{MAv}$) by the directivity direction calculating unit 34a of the directivity control apparatus 3. A specific calibration method and content of the calibration parameter are not particularly limited, and for example, may be realized in a range of a known technique.

Further, when the housing of the omni-directional microphone array apparatus M1 is integrally mounted to surround the housing of the camera apparatus C1, the direction (horizontal angle and vertical angle) from the camera apparatus C1 to the sound position (sound source position) may be used as the directivity direction coordinates ($\theta_{MAh}$, $\theta_{MAv}$) from the omni-directional microphone array apparatus 2 to the sound position.

Here, among the directivity direction coordinates ($\theta_{MAh}$, $\theta_{MAv}$), $\theta_{MAh}$ represents the horizontal angle in the directivity direction from the mounting position of the omni-directional microphone array apparatus 2 toward the sound position, and $\theta_{MAv}$ represents the vertical angle in the directivity direction from the mounting position of the omni-directional microphone array apparatus 2 toward the sound position. In the following description, for ease of description, it is assumed that reference directions (0 degree direction) of the respective horizontal angles of the camera apparatus C1 and the omni-directional microphone array apparatus M1 are identical to each other.

The output control unit 34b controls the operations of the display apparatus 35 and the speaker 36. For example, the output control unit 34b that is an example of a display control unit allows the display apparatus 35 to display the image data transmitted from the camera apparatus C1 according to an input operation based on the cursor CSR using the mouse operation of the user or the finger FG of the user, for example. When the sound data transmitted from the omni-directional microphone array apparatus 2 or the sound data collected by the omni-directional microphone array apparatus M1 for a predetermined period of time is obtained from the recorder 4, the output control unit 34b that is an example of a sound output control unit outputs the sound data to the speaker 36 according to an input operation based on the cursor CSR using the mouse operation of the user or the finger FG of the user, for example.

Further, when the image data obtained by the imaging of the camera apparatus C1 for a predetermined time is obtained from the recorder 4, the output control unit 34b that is an example of an image reproduction unit allows the display apparatus 35 to reproduce the image data according to the input operation based on the cursor CSR using the mouse operation of the user or the finger FG of the user, for example.

Further, the output control unit 34b that is an example of a directivity forming unit forms the directivity (beam) of the sound (collected sound) collected by the omni-directional microphone array apparatus 2 in the directivity direction indicated by the directivity direction coordinates ($\theta_{MAh}$, $\theta_{MAv}$) calculated by the directivity direction calculating unit 34a, using the sound data transmitted from the omni-directional microphone array apparatus 2 or the sound data obtained from the recorder 4.

Thus, the directivity control apparatus 3 can relatively increase a volume level of the sound emitted by the monitoring target (for example, the person HM1) that is present in the directivity direction where the directivity is formed, and can decrease the sound in a direction where the directivity is not formed to relatively reduce the volume level.

The tracking processing unit 34c that is an example of an information obtaining unit obtains information on the above-described sound tracking process. For example, when a new position is designated according to the input operation based on the cursor CSR using the mouse operation of the user or the finger FG of the user, for example, on the tracking screen TRW of the display apparatus 35 in which the image data obtained by the imaging of the camera apparatus C1 is displayed, the tracking processing unit 34c obtains information on the newly designated position.

Here, the information on the newly designated position includes coordinate information on a time when the new position is designated (designation time) and the sound position (sound source position) where the monitoring target (for example, the person HM1) is present in the actual space corresponding to the position on the image data designated at the designation time, or information on the distance from the omni-directional microphone array apparatus M1 to the sound position (sound source position), in addition to the coordinate information indicating the position on the image data designated on the tracking screen TRW.

Further, the tracking processing unit 34c that is an example of a reproduction time calculation unit calculates a sound reproduction time at a position on a designated movement route according to the input operation based on the cursor CSR using the mouse operation of the user or the finger FG of the user, for example, using the data on the tracking list LST stored in the memory 33 (to be described later).

The display apparatus 35 that is an example of a display unit is configured by a liquid crystal display (LCD) or an organic electroluminescence (EL), for example, and displays the image data obtained by the imaging of the camera apparatus C1 under the control of the output control unit 34b.

The speaker 36 that is an example of a sound output unit outputs sound data on the sound collected by the omni-directional microphone array apparatus M1 or sound data on which the directivity is formed in the directivity direction indicated by the directivity direction coordinates ($\theta_{MAh}$, $\theta_{MAv}$). The display apparatus 35 and the speaker 36 may have a configuration different from those of the directivity control apparatus 3.

The recorder 4 stores in association the image data obtained by the imaging of the camera apparatus C1 and the sound data on the sound collected by the omni-directional microphone array apparatus M1.

The directivity control system 100A shown in FIG. 3 includes one or more camera apparatuses C1, . . . , Cn, one or more omni-directional microphone array apparatuses M1, . . . , Mm, a directivity control apparatus 3A, and the recorder 4. In FIG. 3, the same reference numerals are given to the same components and operations as in the respective units shown in FIG. 2, and thus, the description thereof will be simplified or not repeated and only the contents that are different will be described.

The directivity control apparatus 3A includes at least the following, the communication unit 31, the operation unit 32, the memory 33, a signal processing unit 34A, the display apparatus 35, the speaker 36, and an image processing unit 37. The signal processing unit 34A includes at least the following, the directivity direction calculating unit 34*a*, the output control unit 34*b*, the tracking processing unit 34*c*, and a sound source detecting unit 34*d*.

The sound source detecting unit 34*d* detects the sound position (sound source position) in the actual space corresponding to the sound generated by the person HM1 that is the monitoring target, from the image data displayed in the display apparatus 35. For example, the sound source detecting unit 34*d* divides a sound collecting area of the omni-directional microphone array apparatus M1 into plural lattice-shaped areas, and measures the strength of the sound or the sound volume level of the sound on which the directivity is formed from the omni-directional microphone array apparatus M1 with respect to the central position of each lattice-shaped area. The sound source detecting unit 34*d* estimates that the sound source is present in the lattice-shaped area with the highest sound strength or sound volume level among all the lattice-shaped areas. The detection result of the sound source detecting unit 34*d* includes information on the distance from the omni-directional microphone array apparatus M1 to the central position of the lattice-shaped area with the highest sound strength or sound volume level.

The image processing unit 37 performs a predetermined image processing (for example, a video motion detection process of detecting a motion of the person HM1, a detection process of a person's face or face direction, or a person detection process) for the image data displayed in the display apparatus 35 according to an instruction of the signal processing unit 34, and outputs the image processing result to the signal processing unit 34.

Further, according to the input operation based on the cursor CSR using the mouse operation of the user or the finger FG of the user, for example, the image processing unit 37 detects an outline DTL of the face of the monitoring target (for example, the person HM1) displayed in the display apparatus 35, and performs a masking process for the face. Specifically, the image processing unit 37 calculates a rectangular region that includes the detected outline DTL of the face, and performs a predetermined process of shading off the detected outline DTL in the rectangular region (see FIG. 22C). FIG. 22C is a diagram illustrating a process of shading off the detected outline DTL of the person's face. The image processing unit 37 outputs the image data generated by the shading-off process to the signal processing unit 34.

Figure 37:
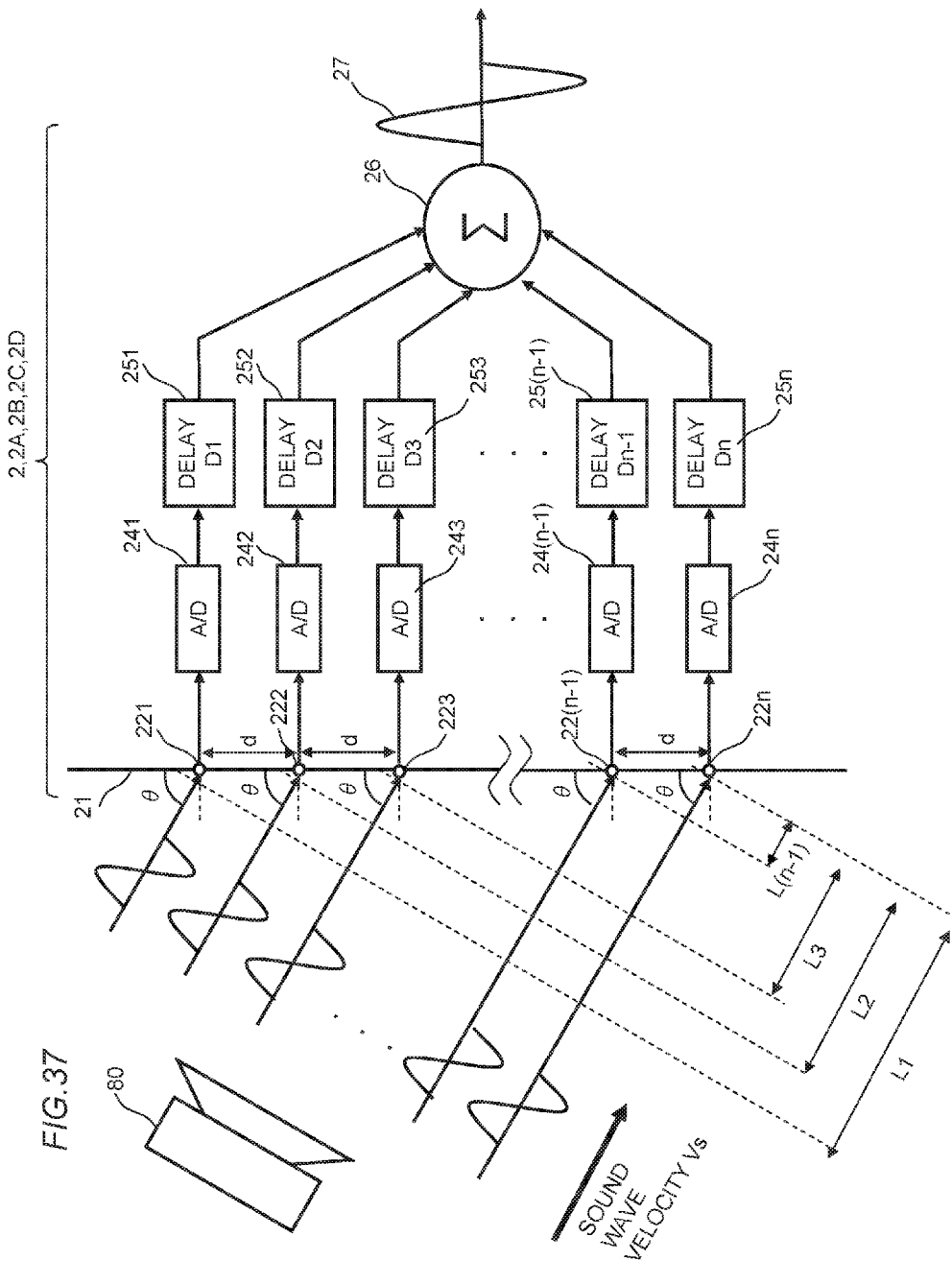
FIG. 37 is a diagram briefly illustrating a delay and sum technique in which the omni-directional microphone array apparatus forms directivity of sound data in a direction at an angle θ.

FIG. 37 is a diagram briefly illustrating a delay and sum technique in which the omni-directional microphone array apparatus M1 forms the directivity of the sound data in the direction at an angle θ. For ease of understanding, it is assumed that microphone elements 221 to 22*n* are linearly arranged. In this case, the directivity is present in a two-dimensional region in the surface. Here, in forming the directivity in a three-dimensional space, the microphones may be two-dimensionally arranged, and then, the same processing method may be performed.

A sound wave emitted from a sound source 80 is incident at a certain specified angle (incident angle=(90−θ) degrees) with respect to the respective microphone elements 221, 222, 223, ..., 22(*n*−1) and 22*n* built in the microphone units 22 and 23 of the omni-directional microphone array apparatus M1.

The sound source 80 is a monitoring target (for example, the person HM1) that is present in the directivity direction of the omni-directional microphone array apparatus M1, for example, and is present in the direction of a predetermined angle θ with respect to the surface of the housing 21 of the omni-directional microphone array apparatus M1. Further, an interval d between the respective microphone elements 221, 222, 223, ..., 22(*n*−1) and 22*n* is uniform.

The sound wave emitted from the sound source 80 first reaches the microphone element 221 to be collected, and then reaches the microphone element 222 to be collected. Similarly, the sound wave is sequentially collected, and finally reaches the microphone element 22*n* to be collected.

A direction from the position of each of the microphone elements 221, 222, 223, ..., 22(*n*−1) and 22*n* of the omni-directional microphone array apparatus M1 toward the sound source 80 is the same as the direction from each microphone (microphone element) of the omni-directional microphone array apparatus 2 toward the sound position (sound source position) corresponding to the designated position that the user designates in the display apparatus 35 when the sound source 80 is the sound emitted from the monitoring target (for example, the person HM1), for example.

Here, from the times when the sound wave sequentially reaches the microphone elements 221, 222, 223, ..., and 22(*n*−1) to the time when the sound wave reaches the final microphone element 22*n*, arrival time differences τ1, τ2, τ3, ..., and τ(n−1) occur. Thus, when the sound data on the sound collected by the respective microphone elements 221, 222, 223, ..., 22(*n*−1) and 22*n* is added as is, the addition is performed in a state where the phase is deviated, and thus, the sound volume level of the sound wave is weakened as a whole.

Here, τ1 corresponds to a time difference between the time when the sound wave reaches the microphone element 221 and the time when the sound wave reaches the microphone element 22*n*, and τ2 corresponds to a time difference between the time when the sound wave reaches the microphone element 222 and the time when the sound wave reaches the microphone element 22*n*. Similarly, τ1(*n*−1) corresponds to a time difference between the time when the sound wave reaches the microphone element 22(*n*−1) and the time when the sound wave reaches the microphone element 22*n*.

In the present embodiment, the omni-directional microphone array apparatus M1 includes A/D converters 241, 242, 243, ..., 24(*n*−1) and 24*n* provided corresponding to the microphone elements 221, 222, 223, ..., 22(*n*−1) and 22*n*, delay units 251, 252, 253, ..., 25(*n*−1) and 25*n*, and an adder 26 (see FIG. 37).

That is, the omni-directional microphone array apparatus M1 AD-converts analogue sound data collected by the microphone elements 221, 222, 223, ..., 22(*n*−1) and 22*n* into digital sound data in the AD converters 241, 242, 243, ..., 24(*n*−1), and 24*n*.

Further, the omni-directional microphone array apparatus M1 assigns delay times corresponding to the arrival time differences in the respective microphone elements 221, 222, 223, ..., 22(*n*−1) and 22*n*, in the delay units 251, 252, 253, ..., 25(*n*−1) and 25*n*, to align the phases of all sound waves, and then adds sound data after the delay process in the adders 26. Thus, the omni-directional microphone array apparatus M1 is able to form the directivity of the sound data in the direction of the predetermined angle θ with respect to the respective microphone elements 221, 222, 223, ..., 22(*n*−1) and 22*n*.

For example, in FIG. 37, respective delay times D1, D2, D3, ..., D(*n*−1) and Dn set in the delay units 251, 252, 253, ..., 25(*n*−1) and 25*n* respectively correspond to the arrival time differences τ1, τ2, τ3, ... and τ(n−1), which are expressed by the following expression (1).

[Expression 1]

$$D1 = \frac{L1}{Vs} = \frac{\{d \times (n-1) \times \cos\theta\}}{Vs} \quad (1)$$
$$D2 = \frac{L2}{Vs} = \frac{\{d \times (n-2) \times \cos\theta\}}{Vs}$$
$$D3 = \frac{L3}{Vs} = \frac{\{d \times (n-3) \times \cos\theta\}}{Vs}$$
$$, \ldots ,$$
$$Dn-1 = \frac{Ln-1}{Vs} = \frac{\{d \times 1 \times \cos\theta\}}{Vs}$$
$$Dn = 0 \ldots (1)$$

L1 represents a difference between sound wave arrival distances in the microphone element 221 and the microphone element 22n. L2 represents a difference between sound wave arrival distances in the microphone element 222 and the microphone element 22n. L3 represents a difference between sound wave arrival distances in the microphone element 223 and the microphone element 22n. Similarly, L(n−1) represents a difference between sound wave arrival distances in the microphone element 22(n−1) and the microphone element 22n. "Vs" represents a sound wave velocity (sound velocity). L1, L2, L3, . . . , L(n−1) and Vs are values that are already known. In FIG. 37, the delay time Dn set in the delay unit 25n is 0 (zero).

As described above, by changing the delay times D1, D2, D3, . . . , Dn−1 and Dn set in the delay units 251, 252, 253, . . . , 25(n−1) and 25n, the omni-directional microphone array apparatus M1 can easily form the directivity of the sound data on the sound collected by the respective microphone elements 221, 222, 223, . . . , 22(n−1) and 22n built in the microphone units 22 and 23.

In the above description, it is assumed that the directivity forming process shown in FIG. 37 is performed by the omni-directional microphone array apparatus 2 for ease of description, and this may be similarly applied to a different omni-directional microphone array apparatus (for example, an omni-directional microphone array apparatus Mm). Here, when the output control unit 34b of the signal processing units 34 and 34A of the directivity control apparatuses 3 and 3A includes the AD converters 241 to 24n and the delay units 251 to 25n of the same number as the number of the microphones of the omni-directional microphone array apparatus M1, and one adder 26, the output control unit 34b of the signal processing units 34 and 34A of the directivity control apparatuses 3 and 3A may perform the directivity forming process shown in FIG. 37 using the sound data on the sound collected by each microphone element of the omni-directional microphone array apparatus M1.

(Description of Various Modes and Various Methods)

Here, various modes and various methods common to the respective embodiments including the present embodiment will be described in detail.

In the respective embodiments including the present embodiment, the following various modes and various methods are present. The description thereof will be briefly made as follows.

(1) Recording and reproduction mode: On/Off
(2) Tracking mode: On/Off
(3) Tracking processing mode: Manual/Automatic
(4) Tracking target number: Single/Multiple
(5) Manual designation method: Click operation/Drag operation
(6) Slow reproduction mode: On/Off
(7) Enlarge display mode: On/Off
(8) Sound privacy protection mode: On/Off
(9) Image privacy protection mode: On/Off
(10) Connection mode: Each time/Batch
(11) Correction mode: On/Off
(12) Plural-camera switching method: Automatic/Manual
(13) Plural-microphone switching method: Automatic/Manual
(14) Tracking point upper limit setting mode: On/Off (1) The recording and reproduction mode is used when image data on image obtained by the imaging of the camera apparatus C1 for a predetermined period of time, for example, is reproduced for content confirmation or the like by a user (for example, a monitor, which is the same with the following description) at a certain time after being imaged. If the recording and reproduction mode is turned off, the image data on the image obtained by the imaging of the camera apparatus C1 in real time is displayed in the display apparatus 35.

(2) The tracking mode is used when a directivity tracking control (sound tracking process) of the sound collected by the omni-directional microphone array apparatus M1 is performed according to movement of the monitoring target (for example, the person HM1).

(3) The tracking processing method refers to a method for setting the position (for example, the designated position on the tracking screen TRW of the display apparatus 35 or the position in the actual space) when the directivity tracking control (sound tracking process) of the sound collected by the omni-directional microphone array apparatus M1 is performed by the movement of the monitoring target (for example, the person HM1), which is divided into a manual tracking process and an automatic tracking process. The details thereof will be provided later.

(4) The tracking target number represents the number of monitoring targets that are targets of the directivity tracking control (sound tracking process) of the sound collected by the omni-directional microphone apparatus M1, which is, for example, singular or in plural if the monitoring target is a person.

(5) The manual designation process is used when the user designates tracking points on the tracking screen TRW in the manual tracking process (to be described later), which is, for example, a click operation or a drag operation of the cursor CSR using the mouse operation, or a touch operation or a touch slide operation using the finger FG of the user.

(6) The slow reproduction mode is used when a reproduction speed of the image data reproduced in the display apparatus 35 is a speed value smaller than an initial value (for example, a normal value) on the assumption that the recording and reproduction mode is turned on.

(7) The enlarge display mode is used when the monitoring target (for example, the person HM1) displayed on the tracking screen TRW of the display apparatus 35 is enlarged and displayed.

(8) The sound privacy protection mode is used, when the sound data collected by the omni-directional microphone array apparatus M1 is output in the speaker 36, or when sound processing (for example, a voice change process) for making it difficult to recognize a target output sound is performed.

(9) The image privacy protection mode is used when an image processing for making it difficult to specify the monitoring target (for example, the person HM1) displayed on the tracking screen TRW of the display apparatus 35 is performed.

(10) The connection mode is used when designated positions (for example, see a point marker MR1 to be described later) designated on the tracking screen TRW by manual designation or automatic designation in the course of movement of the monitoring target are connected. If the connection mode is performed every time, whenever the designated position is designated in the course of movement of the monitoring target, adjacent point markers are connected to each other. If the connection mode is performed in a batch, point markers corresponding to all the designated positions obtained in the course of movement of the monitoring target are connected in a batch between the adjacent point markers.

(11) The correction mode is used when the automatic tracking process is switched to the manual tracking process in a case where the designated position that is automatically designated in the manual tracking process is deviated from the movement course of the monitoring target, or in similar cases.

(12) The plural-camera switching method is used when the camera apparatus used for capturing the image of the monitoring target among the plural camera apparatuses C1 to Cn is switched. Details of the plural-camera switching method will be described in a second embodiment.

(13) The plural-microphone switching method is used when the omni-directional microphone array apparatus used for the sound collection emitted by the monitoring target among the plural omni-directional microphone array apparatuses M1 to Mm is switched. Details of the plural-microphone switching method will be described in the second embodiment.

(14) The tracking point upper limit setting mode is used when an upper limit value of the tracking points is set. For example, when the tracking point upper limit setting mode is turned on, if the number of tracking points reaches the upper limit value, the tracking processing unit 34c may reset (delete) all the tracking points, or may display information indicating that the number of tracking points reaches the upper limit value on the tracking screen TRW. Further, until the number of tracking points reaches the upper limit value, it is possible to execute the sound tracking process plural times.

The designation of the various modes or various methods of (1) to (14) as described above is determined by performing a click operation of the cursor CSR using the mouse operation of the user or a touch operation using the finger FG of the user, for example, with respect to a predetermined setting button or setting menu in a monitoring system application (not shown), or a setting button or a setting menu displayed on the tracking screen TRW.

Next, an operation example of the manual tracking process in the directivity control apparatuses 3 and 3A will be described with reference to FIG. 4. FIG. 4 is a diagram illustrating an operation example of the manual tracking process.

In FIG. 4, the movement course of the person HM1 that is the monitoring target is shown on the tracking screen TRW displayed in the display apparatus 35, and for example, three tracking points b1, b2 and b3 are designated by the click operation or the drag operation of the cursor CSR using the mouse operation of the user, for example.

The tracking processing unit 34c obtains information on the tracking time t1 when the cursor CSR designates the tracking point b1, the tracking time t2 when the cursor CSR designates the tracking point b2, and a tracking time t3 when the cursor CSR designates the tracking point b3. Further, the tracking processing unit 34c stores coordinate information on the tracking point b1 on the tracking screen TRW or three dimensional coordinates that represent a position in the actual space corresponding to the coordinate position and information on the tracking time t1 in association with each other in the memory 33. Further, the tracking processing unit 34c stores coordinate information on the tracking point b2 on the tracking screen TRW or three dimensional coordinates that represent a position in the actual space corresponding to the coordinate position and information on the tracking time t2 in association with each other in the memory 33. Further, the tracking processing unit 34c stores coordinate information on the tracking point b3 on the tracking screen TRW or three dimensional coordinates that represent a position in the actual space corresponding to the coordinate position and information on the tracking time t3 in association with each other in the memory 33.

The output control unit 34b allows the display apparatus 35 to display a point marker MR1 on the tracking point b1 on the tracking screen TRW, allows the display apparatus 35 to display a point marker MR2 on the tracking point b2 on the tracking screen TRW, and allows the display apparatus 35 to display a point marker MR3 on the tracking point b3 on the tracking screen TRW. Thus, the output control unit 34b can clearly display the tracking points through which the moving person HM1 passes on the tracking screen TRW as a track.

Further, the output control unit 34b connects the point markers MR1 and MR2 to display a moving route LN1, and connects the point markers MR2 and MR3 to display a moving route LN2.

Next, an operation example of the correction mode in the directivity control apparatuses 3 and 3A will be described with reference to FIG. 5. FIG. 5 is a diagram illustrating an operation example where a tracking point is changed by the manual tracking process when a tracking point automatically designated in the automatic tracking process is wrong.

On the tracking screen TRW on the left side in FIG. 5, a tracking point automatically designated by the image processing unit 37 or the sound source detecting unit 34d is different from a point of the person HM1 in the course of movement, and a wrong moving route LNW is displayed by connection of the point markers MR1 and MR2W.

When the correction mode is turned on, as shown in the tracking screen TRW on the right side in FIG. 5, the automatic tracking process is switched to the manual tracking process. Thus, for example, if a correct tracking point is designated by a click operation using the cursor CSR, the output control unit 34b connects the point markers MR1 and MR2R to display a correct moving route LNR on the tracking screen TRW.

Next, the slow reproduction process in the recording and reproduction mode and the slow reproduction mode in the directivity control apparatuses 3 and 3A will be described with reference to FIG. 6. FIG. 6 is a diagram illustrating the slow reproduction process in the recording and reproduction mode and the slow reproduction mode.

On the tracking screen TRW on the upper side in FIG. 6, it is assumed that since the motion of the person HM1 is fast, for example, it is difficult to designate the person HM1 in either of the manual tracking process or the automatic tracking process. When the recording and reproduction mode and the slow reproduction mode are turned on, for example, if a slow reproduction button displayed in the display apparatus 35 is touched by the finger FG of the user, the output control unit 34b slowly reproduces image data of video indicating the movement course of the person HM1 on the tracking screen TRW (see the tracking screen TRW on the lower side in FIG. 6) with a speed value smaller than an initial value (normal value) of the reproduction velocity.

Thus, since the output control unit 34*b* can delay the motion of the person HM1 on the tracking screen TRW, it is possible to easily designate the tracking point in the manual tracking process or the automatic tracking process. When the movement speed of the person HM1 is equal to or greater than a predetermined value, the output control unit 34*b* may perform the slow reproduction process without accepting the touch operation of the finger FG of the user. Further, the reproduction speed during the slow reproduction may be constant, or may be appropriately changed according to the input operation based on the cursor CSR using the mouse operation of the user or the finger FG of the user.

Next, the enlarge display process in the enlarge display mode in the directivity control apparatuses 3 and 3A will be described with reference to FIG. 7. FIG. 7 is a diagram illustrating the enlarge display process in the enlarge display mode.

On the tracking screen TRW on the upper side in FIG. 7, it is assumed that since the size of the person HM1 is small, for example, it is difficult to designate the person HM1 in the manual tracking process or the automatic tracking process. For example, after the enlarge display mode is turned on by the click operation of the cursor CSR using the mouse operation of the user, for example, if the click operation is performed on a position (display position) of the person HM1, the output control unit 34*b* enlarges and displays the tracking screen TRW at a predetermined magnification while placing the clicked position (see the tracking screen TRW on the lower side in FIG. 7) at a center of enlargement. Thus, since the output control unit 34*b* can enlarge and display the person HM1 on the tracking screen TRW, it is possible to easily designate the tracking point in the manual tracking process or the automatic tracking process.

Here, the output control unit 34*b* may enlarge and display the content of the tracking screen TRW on a separate popup screen (not shown) while placing the clicked position at a center of enlargement. Thus, the output control unit 34*b* can compare the tracking screen TRW that is not enlarged and displayed with the popup screen that is enlarged and displayed by a simple designation operation of the user, so that the user can easily designate the monitoring target (person HM1).

Further, when the tracking point is not yet designated, for example, the output control unit 34*b* may enlarge and display the content of the projected camera screen with reference to the center of the display apparatus 35. Thus, for example, when the monitoring target (the person HM1) is projected around the center of the display apparatus 35, the output control unit 34*b* can allow the user to easily designate the monitoring target by a simple designation operation of the user, for example.

Further, when plural monitoring targets are designated, the output control unit 34*b* may enlarge and display the monitoring targets while placing a position corresponding to a geometrical average of the plural designated positions at a center on the tracking screen TRW. Thus, the output control unit 34*b* can allow the user to easily select the plural monitoring targets projected on the tracking screen TRW.

Figure 8B:
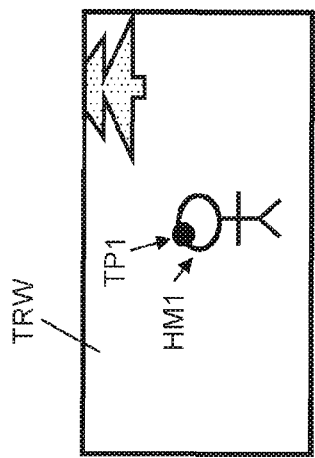
FIG. 8B is a diagram illustrating a tracking screen at time t=t1.
Figure 8C:
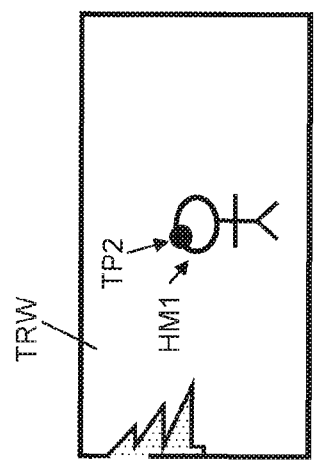
FIG. 8C is a diagram illustrating a tracking screen at time t=t2.
Figure 8A:
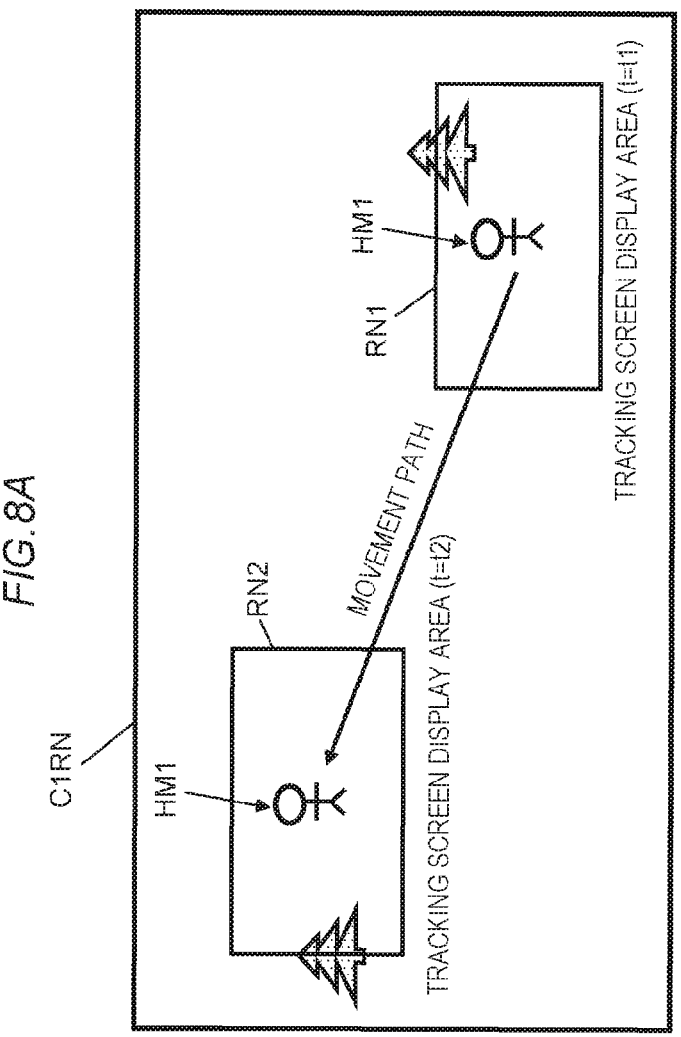
FIG. 8A is a diagram illustrating an automatic scroll process after the enlarge display process in the enlarge display mode.

Next, the automatic scroll process after the enlarge display process in the enlarge display mode in the directivity control apparatuses 3 and 3A will be described with reference to FIGS. 8A, 8B and 8C. FIG. 8A is a diagram illustrating the automatic scroll process after the enlarge display process in the enlarge display mode. FIG. 8B is a diagram illustrating a tracking screen TRW at the time t=t1. FIG. 8C is a diagram illustrating a tracking screen TRW at the time t=t2.

In FIG. 8A, in an imaging area C1RN of the camera apparatus C1, a movement path from the position at the time t=t1 of the person HM1 that is the monitoring target to the position at the time t=t2 is shown. For example, as the tracking screen TRW is enlarged and displayed, consequently, an overall image of the imaging area C1RN may not be projected onto the tracking screen TRW.

The output control unit 34*b* automatically scrolls the tracking screen TRW so that the person HM1 is constantly displayed at the center of the tracking screen TRW, along the movement path of the person HM1 from the time t=t1 to the time t=t2, for example, according to the input operation based on the cursor CSR of the mouse operation of the user or the finger of the user. Thus, as the person HM1 projected to the enlarged and displayed tracking screen TRW is moving, the output control unit 34*b* automatically scrolls the tracking screen TRW so that the designated position of the user is constantly present at the center of the tracking screen TRW. Thus, it is possible to prevent the designated position of the person HM1 of the user from being deviated from the tracking screen TRW even though the tracking screen TRW is enlarged and displayed, and thus, it is possible to easily designate the person HM1 during continuous movement on the tracking screen TRW. (See FIGS. 8A-8C, When the tracking point is manually designated after enlarge display, automatic scroll is performed so that tracking point (for example, position around person HM 1) is not deviated from the display area and is present at the center of the display area.)

In FIG. 8B, the tracking screen TRW at the time t=t1 is shown, in which the person HM1 is displayed at the center thereof. TP1 in FIG. 8B represents a tracking point where the person HM1 is designated by an input operation based on the cursor CSR using the mouse operation of the user or the finger FG of the user at time t=t1.

Similarly, in FIG. 8C, the tracking screen TRW at the time t=t2 is shown, in which the person HM1 is displayed at the center thereof. TP2 in FIG. 8C represents a tracking point where the person HM1 is designated by an input operation based on the cursor CSR using the mouse operation of the user or the finger FG of the user at time t=t2. In both of FIGS. 8B and 8C, since the person HM1 that is the monitoring target is displayed at the center on the tracking screen TRW during the automatic scroll process, the selection of the user becomes easy.

Next, an overall flow of the manual tracking process in the directivity control system 100 according to the present embodiment will be described with reference to FIGS. 9A and 9B. FIG. 9A is a flowchart illustrating a first example of the overall flow of the manual tracking process in the directivity control system 100 according to the first embodiment. FIG. 9B is a flowchart illustrating a second example of the overall flow of the manual tracking process in the directivity control system 100 according to the first embodiment.

Hereinafter, for ease of description, first, the overall flow of the manual tracking process in the directivity control system 100 according to the present embodiment will be described with reference to FIGS. 9A and 9B, and then, the detailed description for the contents of individual processes with reference to the drawings will be made later. In the operation shown in FIG. 9B, the same step numbers are given to the same content as in the operation shown in FIG. 9A, and the description thereof will be simplified or not repeated and only the contents that are different will be described. In FIGS. 9A and 9B, the operation of the directivity control apparatus 3 is shown.

For description of FIG. 9A, it is assumed that the output control unit 34b forms the directivity of the collected sound in a direction from the omni-directional microphone array apparatus M1 toward the position (sound position or sound source position) of the person HM1 corresponding to the position designated by the input operation based on the cursor CRS using the mouse operation of the user or the finger FG of the user, on the tracking screen TRW of the display apparatus 35 where the image of the person HM1 that is the monitoring target obtained by the imaging of the camera apparatus C1 is projected. This is similarly assumed for description of FIG. 9B.

In FIG. 9A, if the tracking mode is turned off (S1, NO), the manual tracking process shown in FIG. 9A is terminated. However, if the tracking mode is turned on (S1, YES), the tracking auxiliary process is started (S2). The details about the tracking auxiliary process will be described with reference to FIG. 13A.

After step S2, on the tracking screen TRW of the display apparatus 35, the tracking position of the movement course (movement path) of the person HM1, that is, the tracking point is designated by the click operation of the cursor CSR using the mouse operation of the user or the touch operation of the finger FG of the user (S3).

The tracking processing unit 34c stores three dimensional coordinates that represent a position in the actual space corresponding to the designated position on the tracking screen TRW and the designation time designated in step S3 in the memory 33 in association as the tracking position and the tracking time of each tracking point, and displays the point marker on the tracking point on the tracking screen TRW through the output control unit 34b (S4). The point marker may be displayed by the tracking processing unit 34c, which is similarly applied to the following respective embodiments.

The output control unit 34b forms the directivity of the collected sound in a direction from the omni-directional microphone array apparatus M1 toward the position (sound position, sound source position) of the person HM1 corresponding to the tracking point designated in step S3 (S5). Here, when the tracking processing unit 34c has only to obtain the data on the tracking position and the tracking time of the tracking point according to the input operation based on the cursor CSR using the mouse operation of the user or the finger FG of the user, the operation in step S5 may not be performed. In other words, the output control unit 34b may not switch the directivity in a direction from the omni-directional microphone array apparatus M1 toward the position (sound position, sound source position) of the person HM1 corresponding to the tracking point designated in step S3, which is similarly applied to the following respective embodiments.

After step S5, the output control unit 34b performs the tracking connection process (S6). Details of the tracking connection process will be described later with reference to FIG. 15A. After step S6, the output control unit 34b outputs the collected sound in which the directivity is formed in step S5 through the speaker 36 (S7). Details of the sound output processing will be described later with reference to FIG. 21A. After step S7, the operation of the directivity control apparatus 3 returns to step S1, and the processes of steps S1 to S7 are repeated until the tracking mode is turned off.

In FIG. 9B, after step S1, the tracking auxiliary process is started (S2). Details of the tracking auxiliary process will be described later with reference to FIG. 13A. After step S2, on the tracking screen TRW of the display apparatus 35, with respect to the tracking position of the movement course (movement path) of the person HM1, that is, the tracking point, the drag operation of the cursor CSR using the mouse operation of the user or the touch slide operation of the finger FG of the user is started (S3A)

After step S3A, if a predetermined time (for example, about several seconds) does not elapse after storage of data on the tracking position and the tracking time corresponding to the previous tracking point is finished (S8, NO), it is considered that the drag operation or the touch slide operation started in step S3A is not terminated, and the operation of the directivity control apparatus 3 proceeds to step S7.

On the other hand, after step S3, if the predetermined time (for example, about several seconds) elapses after storage of data on the tracking position and the tracking time corresponding to the previous tracking point is finished (S8, YES), it is considered that the drag operation or the touch slide operation started in step S3 is terminated, and a new tracking point is designated. That is, the tracking processing unit 34c stores three dimensional coordinates that represent the position in the actual space corresponding to the designated position and the designation time when the drag operation or the touch slide operation is terminated in the memory 33 in association as a tracking position and a tracking time of the new tracking point, and displays the point marker on the tracking point on the tracking screen TRW through the output control unit 34b (S4). Since the operations after step S4 is the same as the operations after step S4 shown in FIG. 9A, the description thereof will not be repeated.

Figure 12:
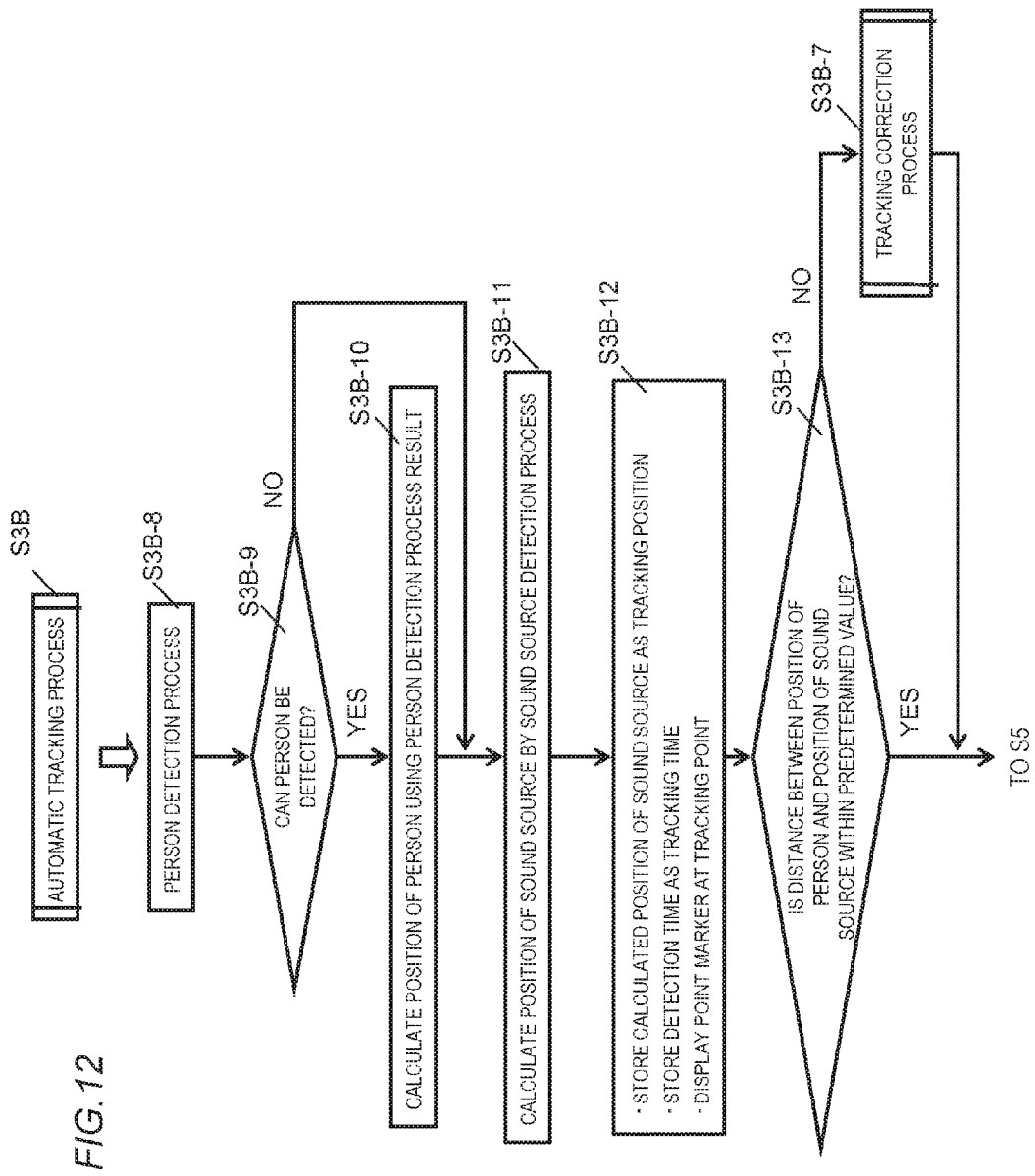
FIG. 12 is a flowchart illustrating a third example of the automatic tracking process shown in FIG. 10A.

Next, an overall flow of the automatic tracking process in the directivity control system 100A according to the present embodiment will be described with reference to FIGS. 10A and 10B, FIGS. 11A and 11B and FIG. 12. FIG. 10A is a flowchart illustrating a first example of an overall flow of the automatic tracking process in the directivity control system 100A according to the first embodiment. FIG. 10B is a flowchart illustrating the first example of the automatic tracking process shown in FIG. 10A. FIG. 11A is a flowchart illustrating a second example of the automatic tracking process shown in FIG. 10A. FIG. 11B is a flowchart illustrating an example of a tracking correction process shown in FIG. 11A. FIG. 12 is a flowchart illustrating a third example of the automatic tracking process shown in FIG. 10A.

Further, in FIG. 10A, similarly to FIGS. 9A and 9B, for ease of description, first, the overall flow of the automatic tracking process in the directivity control system 100A according to the present embodiment will be described with reference to FIG. 10A, and then, detailed contents of individual processes will be described with reference to the following drawings.

In the operation shown in FIG. 10A, the same step numbers are given to the same content as in the operation shown in FIG. 9A or 9B, and the description thereof will be simplified or not repeated and only the contents that are different will be described. In FIG. 10A, the operation of the directivity control apparatus 3 is shown.

In the description of FIG. 10A, it is assumed that the output control unit 34b forms the directivity of the collected sound in a direction from the omni-directional microphone array apparatus M1 toward the position (sound position or sound source position) of the person HM1 corresponding to the position automatically designated using the detection processing result of the sound source detecting unit 34d or the image processing unit 37, on the tracking screen TRW of the display apparatus 35 on which the image of the person HM1 who is the monitoring target obtained by the imaging of the camera apparatus C1 is projected.

In FIG. 10A, after step S1, the tracking auxiliary process is started (23). Details of the tracking auxiliary process will be described later with reference to FIG. 13A. After step S3B, the automatic tracking process is performed (S3B). Details of the automatic tracking process will be described later with reference to FIGS. 10A, 11A and 12. After step S3B, the output control unit 34b forms the directivity of the collected sound in a direction from the omni-directional microphone array apparatus M1 toward the position (sound position, sound source position) of the person HM1 corresponding to the tracking point automatically designated in step S3B (S5). Further, since the operation in step S5 is the same as the operation after step S4 shown in FIG. 9A, the description thereof will not be repeated.

In FIG. 10B, the image processing unit 37 determines whether the person HM1 that is the monitoring target is detected on the tracking screen TRW of the display apparatus 35 by performing a known image processing, and if it is determined that the person HM1 is detected, the image processing unit 37 outputs the determination result (including data on the detected position of the person HM1 (for example, a known representative point) and the detection time) to the tracking processing unit 34c of the signal processing unit 34 (S3B-1).

Alternatively, the sound source detecting unit 34d determines whether the position of the sound (sound source) emitted by the person HM1 that is the monitoring target is detected on the tracking screen TRW of the display apparatus 35 by performing a known sound source detection process, and if it is determined that the position of the sound source is detected, the sound source detecting unit 34d outputs the determination result (including data on the detected position of the sound source and the detection time) to the tracking processing unit 34c (S3B-1). For ease of description of step S3B-1, it is assumed that a monitoring target other than the person HM1 that is the monitoring target is not present on the tracking screen TRW.

The tracking processing unit 34c automatically sets the designated position of the person HM1 in the automatic tracking process, that is, the tracking point using the determination result of the image processing unit 37 or the sound source detecting unit 34d (S3B-1). The tracking processing unit 34c stores three dimensional coordinates that represent the position in the actual space corresponding to the detection position and the detection time on the tracking screen TRW automatically designated in step S3B-1 in the memory 33 in association as a tracking position and a tracking time of each tracking point, and displays the point marker on the tracking point on the tracking screen TRW through the output control unit 34b (S3B-2). After step S3B-2, the automatic tracking process shown in FIG. 10B is terminated, and then, the procedure proceeds to step S5 shown in FIG. 10A.

In FIG. 11A, if an initial tracking point (initial position) is already designated (S3B-3, YES), the operation of step S3B-4 is not performed. On the other hand, if the initial tracking point is not designated (S3B-3, NO), the position of the movement course (movement path) of the person HM1, that is, the tracking point is designated on the tracking screen TRW of the display apparatus 35 by the input operation (for example, click operation, touch operation) based on the cursor CSR using the mouse operation of the user or the finger FG of the user (S3B-4).

If the initial tracking point is already designated, after the initial tracking point is designated in step S3B-4, the tracking processing unit 34c automatically designates the next tracking point using the determination result of the image processing unit 37 or the sound source detecting unit 34d while placing the initial tracking point at a center (S3B-5). Thus, for example, since the user designates the initial tracking point, the detection process of the information on the position of the sound (sound source) emitted by the person HM1 or the information on the position of the person HM1 is started while placing the initial tracking point (initial position) at a center on the tracking screen TRW, and thus, the tracking processing unit 34c is able to perform the respective detection processes at high speed.

The tracking processing unit 34c stores in association three dimensional coordinates that represent the position in the actual space corresponding to the detected position and the detection time on the tracking screen TRW that are automatically designated in step S3B-5 in memory 33 as the tracking position and the tracking time of the tracking point, and displays the point marker on the tracking point on the tracking screen TRW through the output control unit 34b (S3B-2).

After step S3B-2, if the correction operation of the tracking point is not performed (S3B-6, NO), the automatic tracking process shown in FIG. 11A is terminated, and then, the procedure proceeds to step S3 shown in FIG. 10A.

On the other hand, after step S3B-2, for example, if the operation of correcting the tracking position corresponding to the tracking point is performed since the determination result of the image processing unit 37 or the sound source detecting unit 34d is wrong (S3B-6, YES), the tracking correction process shown in FIG. 11B is performed (S3B-7).

In FIG. 11B, when the sound emitted by the person HM1 who is moving on the tracking screen TRW is output, the output of the sound is temporarily stopped by the input operation based on the cursor CSR using the mouse operation of the user or the finger FG of the user (S3B-7-1). After step S3B-7-1, the process is temporarily changed from the automatic tracking process to the manual tracking process as the correction mode is turned on by the input operation based on the cursor CSR using the mouse operation of the user or the finger FG of the user, and a correct tracking point is designated (S3B-7-2).

The output control unit 34b deletes the wrong point marker displayed on the tracking screen TRW designated in step S3B-7-2 (S3B-7-3), displays the point marker on the changed tracking point, that is, the tracking point designated in step S3B-7-2, and restarts the output of the sound that is temporarily stopped in step S3B-7-1 (S3B-7-3). Further, the tracking processing unit 34c saves the position designated in step S3B-7-2 as the tracking point (S3B-7-3). After step S3B-7-3, the tracking correction process shown in FIG. 11B is terminated, and then, the procedure proceeds to step S5 shown in FIG. 10A.

In FIG. 12, the image processing unit 37 determines whether the person HM1 that is the monitoring target is detected on the tracking screen TRW of the display apparatus 35 by performing known image processing (S3B-8). If it is determined that the person HM1 is detected (S3B-9, YES), the image processing unit 37 calculates the detected position (for example, a known representative point) of the person HM1, and outputs each data on the detection time and the detected position to the tracking processing unit 34c of the signal processing unit 34 as the determination result (S3B-10).

The sound source detecting unit 34d determines whether the position of the sound (sound source) emitted by the person HM1 that is the monitoring target is detected on the tracking screen TRW of the display apparatus 35 by performing a known sound detection process, and if it is determined that the position of the sound source is detected, the sound source detecting unit 34d calculates the detected position of the person HM1, and outputs each data on the detection time and the detected position to the tracking processing unit 34c as the determination result (S3B-11).

The tracking processing unit 34c stores the detected position and the detection time of the sound source on the tracking screen TRW calculated in the step S3B-11 in the memory 33 in association as the tracking position and the tracking time of the tracking point, and displays the point marker around the tracking position on the tracking screen TRW through the output control unit 34b (S3B-12).

After step S3B-12, the tracking processing unit 34c determines whether the distance between the detected position of the person HM1 calculated in step S3B-10 and the detected position of the sound source calculated in step S3B-11 is within a predetermined value (S3B-13). If it is determined that the distance between the detected position of the person HM1 and the detected position of the sound source is within the predetermined value (S3B-13, YES), the automatic tracking process shown in FIG. 12 is terminated, and then, the procedure proceeds to step S5 shown in FIG. 10A.

On the other hand, if it is determined that the distance between the detected position of the person HM1 and the detected position of the sound source is not within the predetermined value (S3B-13, NO), the automatic tracking process shown in FIG. 11B is performed (S3B-7). Since the tracking correction process is described with reference to FIG. 11B, the description thereof will not be made herein. After step S3B-7, the automatic tracking process shown in FIG. 12 is terminated, and then, the procedure proceeds to step S5 shown in FIG. 10A.

Thus, if the distance between the position of the sound source and the position of the person HM1 detected by the detection process of the position of the sound source or the detection process of the position of the person HM1 is equal to or greater than the predetermined value, for example, the tracking processing unit 34c can easily modify and obtain the information on the position designated by the change operation of the position of the user in the tracking correction process (see FIG. 11B) as the information on the position of the person HM1. Further, if the distance between the position of the sound source and the position of the person HM1 detected by the detection process of the position of the sound source or the detection process of the position of the person HM1 is not equal to or greater than the predetermined value, for example, the tracking processing unit 34c can easily obtain the position of the sound source or the position of the person HM1 as the information on the position after movement of the person HM1, without performing the change operation of the position of the user, for example.

Next, details of the tracking auxiliary process in the directivity control apparatuses 3 and 3A will be described with reference to FIG. 13A. FIG. 13A is a flowchart illustrating an example of the tracking auxiliary process shown in FIG. 9A.

In FIG. 13A, if the enlarge display mode of the directivity control apparatuses 3 and 3A is turned off (S2-1, NO), the operation of the directivity control apparatuses 3 and 3A proceeds to step S2-5. On the other hand, when the enlarge display mode of the directivity control apparatuses 3 and 3A is turned on (S2-1, YES), the directivity control apparatuses 3 and 3A perform the image privacy protection process (S2-2), and perform the automatic scroll process (S2-3). Details of the image privacy protection process will be described with reference to FIG. 21B. Details of the automatic scroll process will be described with reference to FIGS. 13B, 14A and 14B.

After step S2-3, the output control unit 34b enlarges and displays the content of the tracking screen TRW at a predetermined magnification while placing a tracking position corresponding to an immediately close tracking point at a center on the tracking screen TRW (S2-4). After step S2-4, if both of the recording and reproduction mode and the slow reproduction mode of the directivity control apparatuses 3 and 3A are turned on (S2-5, YES), the output control unit 34b slowly reproduces image data on video indicating the movement course of the person HM1 with a speed value smaller than the initial value (normal value) of the reproduction speed on the tracking screen TRW (S2-6).

After step S2-6 or if both of the recording and reproduction mode and the slow reproduction mode of the directivity control apparatuses 3 and 3A are not turned on (S2-5, NO), the tracking auxiliary process shown in FIG. 13A is terminated, and then, the procedure proceeds to step S5 shown in FIG. 9A, step S3A shown in FIG. 9B or step S3B shown in FIG. 10A.

Next, details of the automatic scroll process in the directivity control apparatuses 3 and 3A will be described with reference to FIGS. 13B, 14A and 14B. FIG. 13B is a flowchart illustrating an example of the automatic scroll process shown in FIG. 13A. FIG. 14A is a flowchart illustrating an example of an automatic scroll process necessity determination process shown in FIG. 13B. FIG. 14B is a diagram illustrating a scroll necessity determination line in the automatic scroll process necessity determination process.

In FIG. 13B, the tracking processing unit 34c performs the automatic scroll process necessity determination process (S2-3-1). Details of the automatic scroll process necessity determination process will be described later with reference to FIG. 14A.

After step S2-3-1, if it is determined that it is necessary to perform the automatic scroll process as the automatic scroll process necessity determination process result (S2-3-2, YES), the output control unit 34b performs a predetermined automatic scroll process for the tracking screen TRW (S2-3-3). For example, the output control unit 34b automatically scrolls the tracking screen TRW so that the person HM1 is constantly displayed at the center of the tracking screen TRW along the movement path of the person HM1 on the tracking screen TRW, according to the input operation based on the CSR using the mouse operation of the user or the finger FG of the user. Thus, even when the tracking screen TRW is enlarged and displayed, the output control unit 34b can prevent the designated position of the person HM1 that is the monitoring target of the user from being deviated from the tracking screen TRW, and can easily designate the person HM1 during continuous movement on the tracking screen TRW.

When the tracking point is not designated at step S2-3-1-1, the tracking screen TRW may be automatically scrolled so that the person HM1 is displayed at the center of the tracking screen TRW, and in this case, the output control unit 34b may not perform the automatic scroll process necessity determination process shown in step S2-3-1.

Further, when the person HM1 moves out of a scroll determination line JDL (to be described later), the output control unit 34b performs the automatic scroll process by a predetermined amount in the movement direction of the person HM1 (for example, in a direction out of where the person HM1 is out of the scroll determination line JDL (to be described later)). Thus, even when the tracking screen TRW is enlarged and displayed, the output control unit 34b can prevent the designated position of the person HM1 that is the monitoring target of the user from being deviated from the tracking screen TRW.

Further, when the person HM1 moves out of the scroll determination line JDL (to be described later), the output control unit 34b performs the automatic scroll process so that the position (for example, a next tracking point) designated by the input operation based on the cursor CSR using the mouse operation of the user or the finger FG of the user is present at the center of the tracking screen TRW. Thus, even when the tracking screen TRW is enlarged and displayed, the output control unit 34b can prevent the designated position of the person HM1 that is the monitoring target of the user from being deviated from the tracking screen TRW, and can easily designate the person HM1 during continuous movement on the tracking screen TRW.

After step S2-3-3, or if it is determined that the automatic scroll process is not necessary as the automatic scroll process necessity determination process result (S2-3-2, NO), the automatic scroll process shown in FIG. 13B is terminated, and then, the procedure proceeds to step S2-4 shown in FIG. 13A.

In FIG. 14A, the tracking processing unit 34c determines whether the tracking position corresponding to the tracking point TP1 that is designated is out of any one of the upper, lower, right and left determination lines JDL on the tracking screen XTRW that is enlarged and displayed (S2-3-1-1).

If it is determined that the tracking position is not out of any scroll determination line JDL (S2-3-1-1, NO), the tracking processing unit 34c determines that the automatic scroll process is not necessary (S2-3-1-2). On the other hand, if it is determined that the tracking position is out of any scroll determination line JDL (S2-3-1-1, YES), the tracking processing unit 34c determines that the automatic scroll process is necessary, and stores the type (for example, information indicating any one of four scroll determination lines JDL shown in FIG. 14B) of the scroll determination line JDL in the memory 33 (S2-3-1-3). After steps S2-3-1-2 and S2-3-1-3, the automatic scroll process necessity determination process shown in FIG. 14A is terminated, and then, the procedure proceeds to step S2-3-2 shown in FIG. 13B.

Figure 15B:
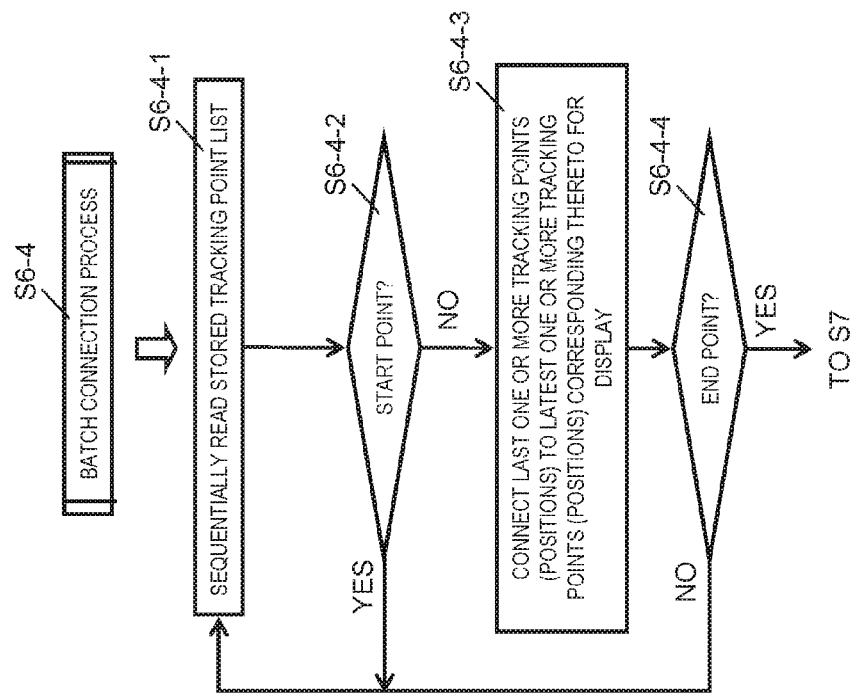
FIG. 15B is a flowchart illustrating an example of a batch connection process shown in FIG. 15A.
Figure 15A:
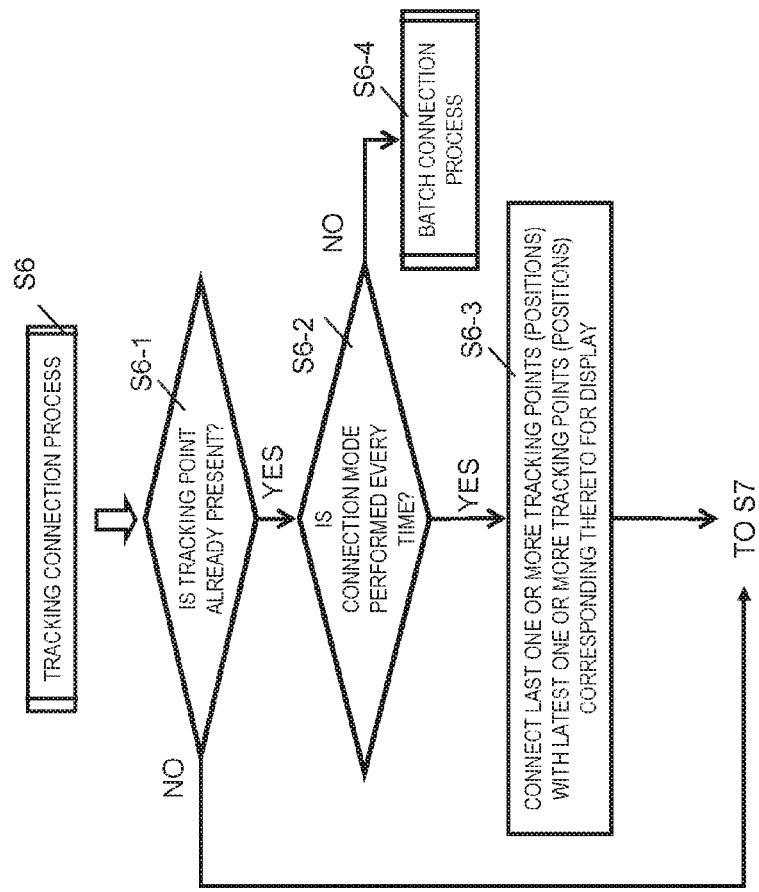
FIG. 15A is a flowchart illustrating an example of a tracking connection process shown in FIG. 9A.

Next, details of the tracking connection process in the directivity control apparatuses 3 and 3A will be described with reference to FIGS. 15A and 15B. FIG. 15A is a flowchart illustrating an example of the tracking connection process shown in FIG. 9A. FIG. 15B is a flowchart illustrating an example of a batch connection process shown in FIG. 15A.

In FIG. 15A, if the tracking point is already designated (S6-1, YES), the tracking processing unit 34c determines whether the connection mode is performed every time (S6-2). If it is determined that the connection mode is performed every time (S6-2, YES), the output control unit 34b connects one or more tracking points that are designated immediately before with the latest one or more tracking points for display (S6-3). Thus, since at least the current designated position and the last designated position among the plural designated positions designated by the designation operation of the user when the person HM1 projected onto the tracking screen TRW of the display apparatus 35 is moving are connected to each other for display, the output control unit 34b can clearly show the track of a part of the movement of the person HM1.

In step S6-3, the present invention is not limited to the operation of the single designation where the tracking points are designated one by one, and also includes an operation where the plural tracking points are simultaneously designated. This is similarly applied to step S6-4-3 to be described later.

After step S6-3, or if it is determined that the tracking point is not yet designated (S6-1, NO), the tracking connection process shown in FIG. 15A is terminated, and then, the procedure proceeds to step S7 shown in FIGS. 9A and 9B or FIG. 10A.

If it is determined that the connection mode is not performed every time (S6-2, NO), the batch connection process is performed (S6-4). The batch connection process will be described with reference to FIG. 15B.

In FIG. 15B, the tracking processing unit 34c sequentially reads data on the tracking list LST (for example, see FIG. 16B) stored in the memory 33 (S6-4-1, YES). If it is determined that the read data is a start point of the tracking point (S6-4-2, YES), the tracking processing unit 34c reads again the data on the tracking list LST (for example, see FIG. 16B) (S6-4-1).

On the other hand, if it is determined that the read data is not the start point of the tracking point (S6-4-2, NO), the output control unit 34b connects point markers of the last designated one or more tracking points and the latest one or more tracking points using the read data on the tracking list for display (S6-4-3).

After step S6-4-3, if the connection is performed up to an end point of the tracking point (S6-4-4, YES), the batch connection process shown in FIG. 15B is terminated, and then, the procedure proceeds to step S7 shown in FIGS. 9A and 9B or FIG. 10A.

On the other hand, after step S6-4-3, if the connection is not performed up to an end point of the tracking point (S6-4-4, NO), the tracking processing unit 34c sequentially reads the data on the tracking list LST (for example, see FIG. 16B) stored in the memory 33, and then, the operations from step S6-4-1 to step S6-4-4 are repeated until the point markers corresponding to all the tracking points in the tracking list LST are connected to each other for display. Thus, since the output control unit 34b connects one or two designated positions adjacent to each designated position for display with respect to all the plural designated positions designated by the designation operation of the user when the person HM1 projected onto the tracking screen TRW of the display apparatus 35 is moving, it is possible to clearly display the track of the entire movement of the person HM1.

Figures 16A, 16B:
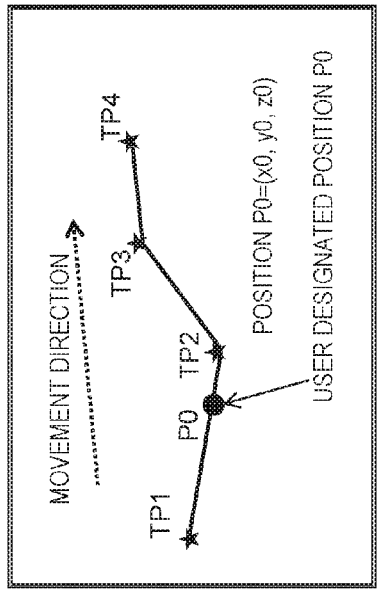
FIG. 16A is a diagram illustrating a reproduction start time PT of a collected sound corresponding to a designated position of a user on a movement route between tracking points displayed with respect to one-time movement of a person.
FIG. 16B is a diagram illustrating a first example of a tracking list.

FIG. 16A is a diagram illustrating a reproduction start time PT of a collected sound corresponding to a designated position P0 of a user on a movement route between tracking points displayed with respect to one-time movement of the person HM1. FIG. 16B is a diagram illustrating a first example of a tracking list. In FIG. 16A, TP1, TP2, TP3 and TP4 represent tracking points designated during one-time movement of the person HM1 as shown in the tracking list LST shown in FIG. 16B.

In FIG. 16B, coordinates (x, y, z) indicating the tracking position and the tracking time are stored in association for each of the tracking points TP1 (start point), TP2, TP3 and TP4 (end point). For ease of description, it is assumed that a z coordinate value z0 of the z coordinate indicating the tracking position is constant. (see FIGS. 16A and 16B, It is assumed that height direction (x-axis) is constant.)

If the designated position P0 is designated according to the input operation based on the cursor CSR using the mouse operation of the user or the finger FG of the user on the movement route between the tracking points shown in FIG. 16A, the tracking processing unit 34c extracts two tracking points TP1 and TP2 before and after the designated position P0, and calculates the reproduction start time PT at the designated position P0 according to expression (2) using the data on the coordinates indicating the tracking positions of the tracking points TP1 and TP2 and the tracking times. (See FIGS. 16A and 16B, Two tracking points TP1 and TP2 are extracted immediately after designated position P0, and reproduction time PT is calculated at designated position P0 using information on positions and times of two extracted tracking points TP1 and TP2.)

[Expression 2]

$$PT = T1 + \left\{ (T2 - T1) \times \frac{\sqrt{(x0 - x1)^2 + (y0 - y1)^2}}{\sqrt{(x2 - x1)^2 + (y2 - y1)^2}} \right\} \quad (2)$$

Further, when the sound is output (reproduced) to the speaker 36, the output control unit 34b forms the directivity in the directivity direction corresponding to the tracking position in the order of the tracking times including the designated position P0 designated by the input operation based on the cursor CSR using the mouse operation or the finger FG of the user, and then, outputs (reproduces) the sound to which the directivity is formed.

Figures 17A, 17B:
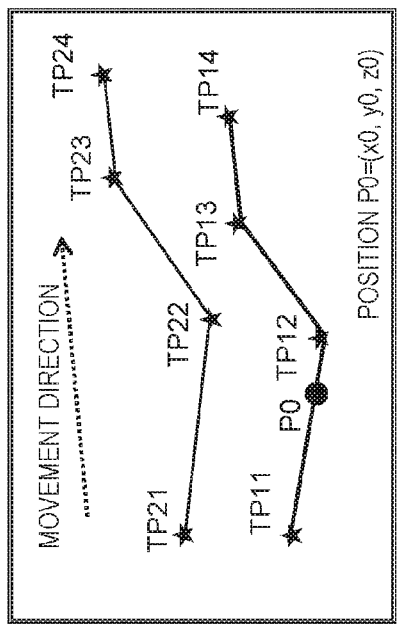
FIG. 17A is a diagram illustrating a reproduction start time PT of a collected sound corresponding to a designated position of a user on a movement route between different tracking points based on plural simultaneous designations.
FIG. 17B is a diagram illustrating a second example of the tracking list.

FIG. 17A is a diagram illustrating a reproduction start time PT of a collected sound corresponding to a designated position P0 of a user on a movement route between different tracking points based on plural simultaneous designations. FIG. 17B is a diagram illustrating a second example of the tracking list LST. In FIG. 17A, (TP11, TP21), (TP12, TP22), (TP13, TP23), and (TP14, TP24) are tracking points that are simultaneously designated during movement of different persons that are plural monitoring targets, for example, as shown in the tracking list LST shown in FIG. 17B.

In FIG. 17B, for each set of (TP11, TP21), (TP12, TP22), (TP13, TP23), and (TP14, TP24), the coordinates (x, y, z) indicating the tracking position and the tracking time are stored in association. The tracking points (TP11, TP21) are start points, and the tracking points (TP14, TP24) are end points. For ease of description, it is assumed that the z coordinate value z0 of the z coordinate indicating the tracking position is constant.

If the designated position P0 is designated according to the input operation based on the cursor CSR using the mouse operation of the user or the finger FG of the user at any position on different movement routes between the tracking points shown in FIG. 17A, the tracking processing unit 34c extracts two tracking points TP11 and TP12 before and after the designated position P0, and calculates the reproduction start time PT at the designated position P0 according to expression (3) using the data on the coordinates indicating the tracking positions of the tracking points TP11 and TP12 and the tracking times.

[Expression 3]

$$PT = T1 + \left\{ (T2 - T1) \times \frac{\sqrt{(x0 - x11)^2 + (y0 - y11)^2}}{\sqrt{(x12 - x11)^2 + (y12 - y11)^2}} \right\} \quad (3)$$

Further, when the sound is output (reproduced) to the speaker 36, the output control unit 34b forms the directivity in the directivity direction corresponding to the tracking position in the order of the tracking times including the designated position P0 designated by the input operation based on the cursor CSR using the mouse operation or the finger FG of the user, and then, outputs (reproduces) the sound to which the directivity is formed.

Figures 18A, 18B:
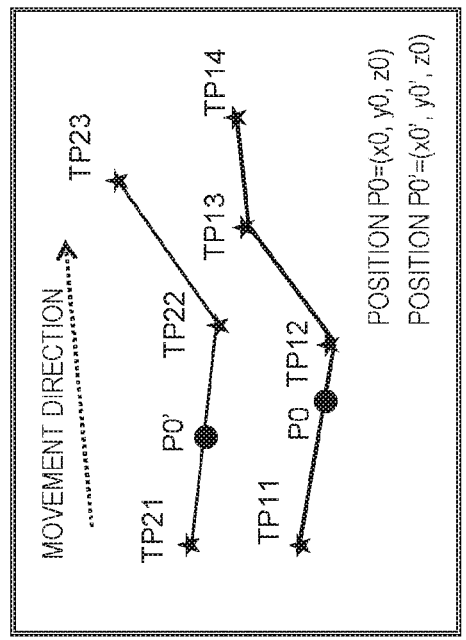
FIG. 18A is a diagram illustrating reproduction start times PT and PT' of a collected sound corresponding to respective designated positions of a user on movement routes between different tracking points based on plural-time designations.
FIG. 18B is a diagram illustrating a third example of the tracking list.

FIG. 18A is a diagram illustrating reproduction start times PT and PT' of a collected sound corresponding to respective designated positions P0 and P0' of a user on movement routes between different tracking points based on plural-time designations. FIG. 18B is a diagram illustrating a third example of the tracking list LST. In FIG. 18A, (TP11, TP12, TP13 and TP14) represent tracking points designated during movement of a person that is a first monitoring target, for example, as shown in the tracking list LST shown in FIG. 18B. Further, in FIG. 18A, similarly, (TP21, TP22 and TP23) represent tracking points designated during movement of a person that is a second monitoring target, for example. The person that is the second monitoring target may be the same person as the first monitoring target, or may be a different person.

In FIG. 18B, for each of TP11, TP12, TP13, TP14, TP21, TP22 and TP23, the coordinates (x, y, z) indicating the tracking position and the tracking time are stored in association. The tracking points TP11 and TP21 are start points, and the tracking points TP14 and TP23 are end points. For ease of description, it is assumed that the z coordinate value z0 of the z coordinate indicating the tracking position is constant.

If the designated positions P0 and P0' are designated according to the input operation based on the cursor CSR using the mouse operation of the user or the finger FG of the user at any position on the respective movement routes between the tracking points shown in FIG. 18A, the tracking processing unit 34c extracts two tracking points (TP11, TP12) and two tracking points (TP21, TP22) before and after the designated positions P0 and P0', and calculates the reproduction start times PT and PT' at the designated positions P0 and P0' according to expressions (4) and (5) using the data on the coordinates indicating the tracking positions of the (TP11, TP12) and (TP21, TP22) and the tracking times, respectively. In expressions (4) and (5), the coordinates of the designated position P0 is (x0, y0, z0), and the coordinates of the designated position P0' is (x0', y0', z0).

[Expression 4]

$$PT = T11 + \left\{ (T12 - T11) \times \frac{\sqrt{(x0 - x11)^2 + (y0 - y11)^2}}{\sqrt{(x12 - x11)^2 + (y12 - y11)^2}} \right\} \quad (4)$$

[Expression 5]

$$PT' = T21 + \left\{ (T22 - T21) \times \frac{\sqrt{(x0' - x21)^2 + (y0' - y21)^2}}{\sqrt{(x22 - x21)^2 + (y22 - y21)^2}} \right\} \quad (5)$$

In FIG. 18A, the number of tracking points and the tracking times designated during movement of the first person and the number of tracking points and the tracking times designated during movement of the second person may not be identical to each other. (See FIGS. 18A and 18B, The number of tracking points and tracking times between the first and the second may not be identical to each other.) Further, when the sound is output (reproduced) to the speaker 36, the output control unit 34b forms the directivity in the directivity direction corresponding to the tracking position in the order of the tracking times including the designated position P0 or the designated position P0' designated by the input operation based on the cursor CSR using the mouse operation or the finger FG of the user, and then, outputs (reproduces) the sound to which the directivity is formed. (See FIGS. 18A and 18B, In sound output (reproduction), data is sorted according to the time, and the directivity is formed in the position direction at specific time to output sound.)

Next, an overall flow of the movement route display reproduction process in the directivity control apparatuses 3 and 3A where the recording and reduction mode is mainly turned on will be described with reference to FIG. 19A. FIG. 19A is a flowchart illustrating an example of the overall flow of the movement route display reproduction process using the tracking list LST in the directivity control systems 100 and 100A according to the first embodiment.

In FIG. 19A, first, the movement route display process is performed (S11). Details of the movement route display process will be described later with reference to FIG. 20. After step S11, if the designated position P0 is designated according to the input operation based on the cursor CSR using the mouse operation of the user or the finger FG of the user on the movement route between the tracking points displayed in step S11 (S12), the reproduction start time calculation process is performed (S13). Details of the reproduction start time calculation process will be described later with reference to FIG. 19B.

The tracking processing unit 34c reads the coordinates of all the tracking positions (or one tracking position) corresponding to the tracking times that are closest to the reproduction start time PT of the designated position P0 calculated in the reproduction start time calculation process shown in step S13, with reference to the tracking list LST stored in the memory 33 (S14). Further, the output control unit 34b forms the directivity of the collected sound in a direction from the omni-directional microphone array apparatus M1 toward the all the tracking positions (or one tracking position) using the data on the coordinates of the tracking positions read by the tracking processing unit 34c (S14). Thus, the output control unit 34b is able to form in advance, according to a position (arbitrarily designated position) that is arbitrarily designated by the user on the movement route indicating the track of the movement of the person HM1, the directivity of the sound in a direction toward the tracking position designated next time with reference to the arbitrarily designated position.

After step s14, the output control unit 34b starts the reproduction of the sound data that is collected stored in the recorder 4 or the memory 33 from the reproduction start time PT calculated in step S13 (S15).

After step S15, if the next tracking time is present in a predetermined time from the reproduction start time PT (S16, YES), the output control unit 34b forms the directivity of the collected sound in a direction from the omni-directional microphone array apparatus M1 toward all the tracking positions (or one tracking position), using the data on the coordinates of all the tracking positions (or one tracking position) corresponding to the next tracking time (S17).

After step S17, or if the next tracking time is not present in the predetermined time from the reproduction start time PT (S16, NO), the sound output process is performed (S7). Details of the sound output process will be described later with reference to FIG. 21A. After step S7, if the sound output process at the tracking time corresponding to the end point of the tracking points is terminated (S18, YES), the movement route display reproduction process shown in FIG. 19A is terminated. Thus, the output control unit 34b can clearly output the collected sound emitted by the monitoring target at the reproduction start time calculated according to the position arbitrarily designated by the user, and can form in advance the directivity of the sound at the next designated position when the next designated position is present in the predetermined time from the reproduction start time.

On the other hand, after step S7, if the sound output process at the tracking time corresponding to the end point of the tracking points is not terminated (S18, NO), the operations from step S16 to step S18 are repeated until the sound output process at the tracking time corresponding to the end point of the tracking points is terminated.

Next, details of the reproduction start time calculation process in the directivity control apparatuses 3 and 3A will be described with reference to FIG. 19B. FIG. 19B is a flowchart illustrating an example of the reproduction start time calculation process shown in FIG. 19A.

In FIG. 19B, the tracking processing unit 34c reads the tracking list LST (for example, see FIG. 16B) stored in the memory 33 (S13-1). The tracking processing unit 34c extracts two tracking points TP1 and TP2 before and after the designated position P0 designated in step S12, from the data on the tracking list LST read in step S13-1 (S13-2). The tracking processing unit 34c calculates the reproduction start time PT at the designated position P0 using the data on the coordinates indicating the tracking positions of the tracking points TP1 and TP2 and the tracking times (S13-3, for example, see expression (2)). After step S13-3, the reproduction start time calculation process shown in FIG. 19B is terminated, and then, the procedure proceeds to step S14 shown in FIG. 19A.

Figure 20:
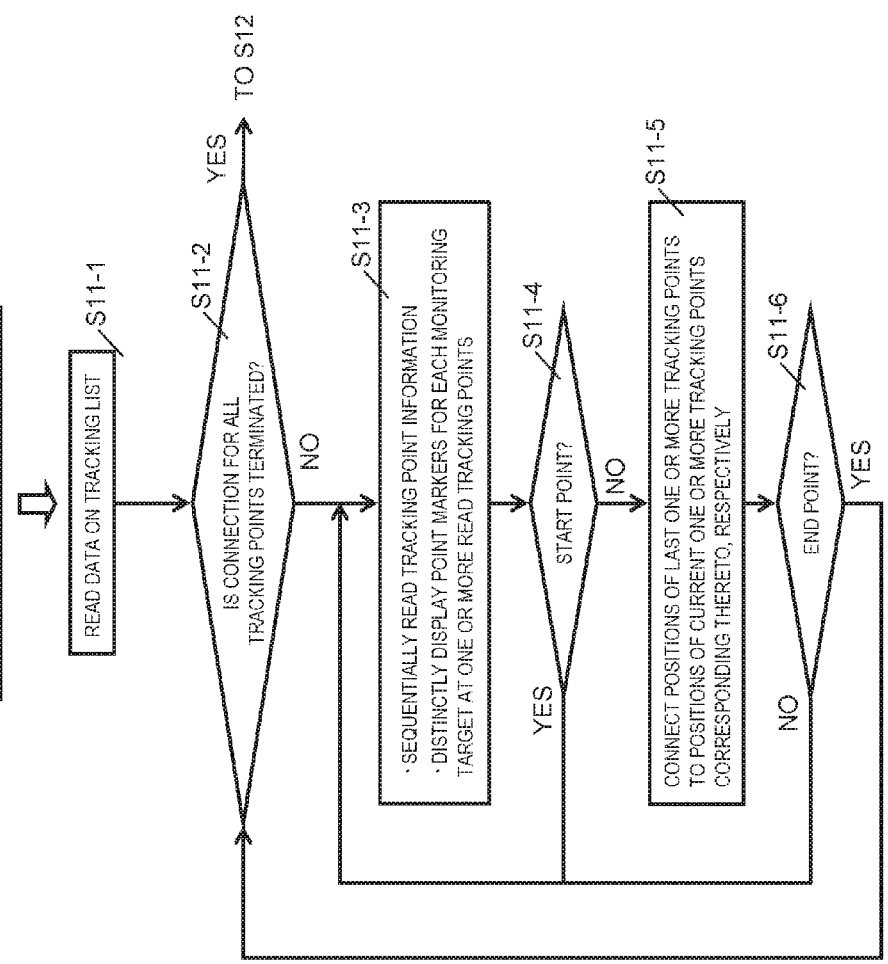
FIG. 20 is a flowchart illustrating an example of a movement route display process shown in FIG. 19A.

Next, details of the movement route display process in the directivity control apparatuses 3 and 3A will be described with reference to FIG. 20. FIG. 20 is a flowchart illustrating an example of a movement route display process shown in FIG. 19A.

In FIG. 20, the tracking processing unit 34c sequentially reads the data on the tracking list LST (for example, see FIG. 16B) stored in the memory 33 (S11-1). If the connection of the point markers for all the tracking points read in step S11-1 is terminated (S11-2, YES), the movement route display process shown in FIG. 20 is terminated, and then, the procedure proceeds to step S12 shown in FIG. 19A.

On the other hand, if the connection of the point markers for all the tracking points read in step S11-1 is not terminated (S11-2, NO), the tracking processing unit 34c sequentially reads the data on the tracking list LST (for example, see FIG. 16B). The output control unit 34b distinctly displays the point markers for each monitoring target at one or more tracking points read by the tracking processing unit 34c (S11-3).

In step S11-3, although not particularly shown, for example, according to the input operation (for example, a right click operation and a left click operation of the mouse, simultaneous depression of plural keys of a keyboard, click operation and simultaneous depression of numeric keys of the keyboard, simultaneous designation for touch panel or the like) based on the cursor CSR using the mouse operation of the user or the finger FG of the user, the output control unit 34b distinctly displays the point markers for each monitoring target in a manner capable of identifying the same monitoring target (for example, the same sign, an identification number, a combination of a sign and an identification number, a frame of a predetermined shape, or the like). Here, the frame of the predetermined shape represents a rectangle, a circle or a triangle, for example. For identification, instead of the frame shape, a frame line type (for example, a solid line or a dotted line), a frame color, a number written on a frame or the like may be used.

After step S11-3, if it is determined that the data on the tracking point read in step S11-3 is the start point of the tracking points (S11-4, YES), the tracking processing unit 34c reads the data on the tracking list LST again (for example, see FIG. 16B) (S11-3).

On the other hand, if it is determined that the data on the tracking point read in step S11-3 is not the start point of the tracking points (S11-4, NO), the output control unit 34b connects the respective point markers of one or more tracking points that are designated immediately before with the latest one or more tracking points using the data on the read tracking list, for display (S11-5).

After step S11-5, if the connection is performed up to the end point of the tracking points on the tracking list LST read in step S11-1 (S11-6, YES), the procedure proceeds to the operation of step S11-2.

On the other hand, after step S11-5, if the connection is not performed up to the end point of the tracking points on the tracking list LST read in step S11-1 (S11-6, NO), the operations from step S11-3 to step S11-6 are repeated until the connection is performed up to the end point of the tracking points on the tracking list LST read in step S11-1.

Next, the sound output process and the image privacy protection process in the directivity control apparatuses 3 and 3A will be described with reference to FIGS. 21A and 21B and FIGS. 22A to 22C, respectively. FIG. 21A is a flowchart illustrating an example of the sound output process shown in FIG. 9A. FIG. 21B is a flowchart illustrating an example of the image privacy protection process shown in FIG. 13A. FIG. 22A is a diagram illustrating an example of a waveform of a sound signal corresponding to a pitch before a voice change process. FIG. 22B is a diagram illustrating an example of a waveform of a sound signal corresponding to a pitch after the voice change process. FIG. 22C is a diagram illustrating a shading-off process of an outline of the face of a detected person.

In FIG. 21A, the output control unit 34b determines whether the sound privacy protection mode is turned on (S7-1). If it is determined that the sound privacy protection mode is turned on (S7-1, YES), the output control unit 34b performs voice change process for the sound data that is collected output in the speaker 36 (S7-2).

After step S7-2, or if it is determined that the sound privacy protection mode is turned off (S7-1, NO), the output control unit 34b outputs the collected sound as it is through the speaker 36 (S7-3). After step S7-3, the sound output process shown in FIG. 21A is terminated, and then, the procedure returns to step S1 shown in FIGS. 9A and 9B or FIG. 10A.

As an example of the voice change process, for example, the output control unit 34b increases or decreases a pitch of a waveform of the sound data on the sound collected by the omni-directional microphone array apparatus M1 or the sound data to which the output control unit 34b forms the directivity (for example, see FIGS. 22A and 22B). Thus, since the output control unit 34b performs the voice change process for the sound collected in real time by the omni-directional microphone array apparatus M1 by the simple input operation of the user to output the sound, for example, it is difficult to recognize the target output of the sound emitted by the person HM1, and thus, it is possible to effectively protect the sound privacy of the person HM1 that is currently imaged. Further, when the sound collected by the omni-directional microphone array apparatus M1 for a predetermined period of time is output according to the user's simple input operation, for example, since the output control unit 34b performs the voice change process for the sound to output the sound, it is difficult to recognize the target output of the sound emitted by the person HM1, and thus, it is possible to effectively protect the sound privacy of the person HM1.

In FIG. 21B, the tracking processing unit 34c determines whether the image privacy protection mode is turned on (S2-2-1). If it is determined that the image privacy protection mode is turned on (S2-2-1, YES), the image processing unit 37 detects (extracts) the outline DTL of the face of the person HM1 displayed on the tracking screen TRW of the display apparatus 35 (S2-2-2), and performs a masking process for the outline DTL of the face (S2-2-3). Specifically, the image processing unit 37 calculates the rectangular region including the detected outline DTL of the face, and performs the predetermined shading-off process in the rectangular region (see FIG. 22C). The image processing unit 37 outputs the image data generated by the shading-off process to the output control unit 34b.

After step S2-2-3, or if it is determined that the image privacy protection mode is turned off (S2-2-1, NO), the output control unit 34b allows the display apparatus 35 to display the image data obtained from the image processing unit 37 (S2-2-4).

Thus, since the image processing unit 37 performs the masking process for a part (for example, the face) of the person HM1 that is the monitoring target projected onto the tracking screen TRW of the display apparatus 35 according to the user's simple input operation, for example, it is difficult to recognize the person HM1 that is the monitoring target, and thus, it is possible to effectively protect the privacy.

As long as the image privacy protection mode of the directivity control apparatuses 3 and 3A is turned on at the time when the monitoring target (for example, the person HM1) appears on the camera screen, the image privacy protection process shown in FIG. 21B may be performed even when the enlarge display mode is not turned on.

As described above, in the directivity control system 100 and 100A according to the present embodiment, the directivity control apparatuses 3 and 3A form the directivity of the sound in the direction from the omni-directional microphone array apparatus M1 including the plural microphones toward the monitoring target (for example, the person HM1) corresponding to the designated position with respect to the image data on the tracking screen TRW of the display apparatus 35, and obtains the information (for example, the tracking position and the tracking time corresponding to the tracking point) relating to the designated position where the moving monitoring target (for example, the person HM1) is designated. Further, the directivity control apparatuses 3 and 3A switch, in a tracking manner, the sound directivity in the direction toward the monitoring target (for example, the person HM1) corresponding to the designated position, using the information on the designated position with respect to the image data on the tracking screen TRW of the display apparatus 35.

Thus, even when the monitoring target (for example, the person HM1) projected to the image data on the tracking screen TRW of the display apparatus 35 is moving, since the directivity control apparatuses 3 and 3A form the directivity of the sound formed in the direction toward the position before the movement of the monitoring target (for example, the person HM1) toward the position after the movement of the monitoring target (for example, the person HM1), it is possible to appropriately form the directivity of the sound in a tracking manner according to the movement of the monitoring target (for example, the person HM1), and thus, it is possible to prevent deterioration of monitoring work efficiency of the monitor.

Further, the directivity control apparatuses 3 and 3A can easily obtain correct information on the position after the movement of the monitoring target (for example, the person HM1) according to the simple manual operation of designating the monitoring target (for example, the person HM1) that is moving in the image data projected onto the tracking screen TRW of the display apparatus 35.

Further, the directivity control apparatus 3A can simply detect the sound source of the sound emitted by the monitoring target (for example, the person HM1), and the monitoring target (for example, the person HM1), from the image data projected onto the tracking screen TRW of the display apparatus 35, and thus, can easily obtain the information on the position of the sound source and the information on the position of the monitoring target as the information on the position of the monitoring target (for example, the person HM1) after movement.

Second Embodiment

In the second embodiment, when the monitoring target (for example, a person) is out of the imaging area of the camera apparatus or the sound collecting area of the omni-directional microphone array apparatus according to its movement state, a directivity control apparatus 3B switches the camera apparatus used for imaging the monitoring target to a different camera apparatus, or switches the omni-directional microphone array apparatus used for the sound collection emitted by the monitoring target to a different omni-directional microphone array apparatus.

In the present embodiment, it is assumed that the camera apparatus used for capturing the image of the monitoring target (for example, the person HM1) that is the target of the sound tracking process and the omni-directional microphone array apparatus used for collection of the sound emitted from the person HM1 are associated with each other in advance and information about the association is stored in the memory 33 of the directivity control apparatus 3B in advance.

Figure 23:
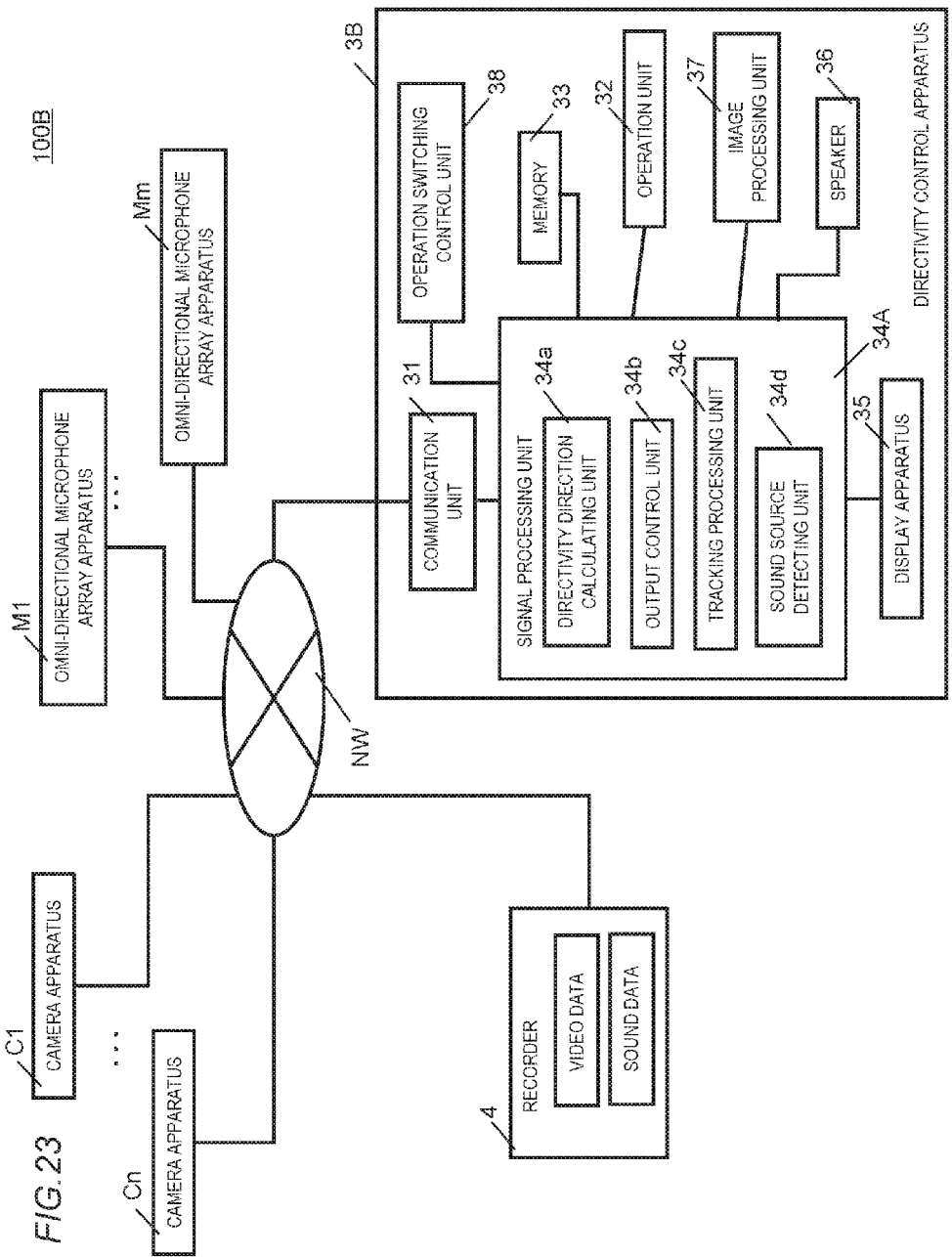
FIG. 23 is a block diagram illustrating a system configuration example of a directivity control system according to a second embodiment.

FIG. 23 is a block diagram illustrating a system configuration example of a directivity control system 100B according to a second embodiment. The directivity control system 100B shown in FIG. 23 includes one or more camera apparatuses C1, . . . , Cn, one or more omni-directional microphone array apparatuses M1, . . . , Mm, the directivity control apparatus 3B, and the recorder 4. In the description of respective units shown in FIG. 23, the same reference numerals are given to the same components and operations as in the respective units of the directivity control systems 100 and 100A shown in FIGS. 2 and 3, and the description thereof will be simplified or not repeated and only the contents that are different will be described.

The directivity control apparatus 3B may be a stationary PC provided in a monitoring control chamber (not shown), or may be a data communication terminal that can be carried by a user, such as a mobile phone, a personal digital assistant (PDA), a tablet terminal or a smart phone.

The directivity control apparatus 3B includes at least the following, a communication unit 31, an operation unit 32, a memory 33, a signal processing unit 34, a display apparatus 35, a speaker 36, an image processing unit 37 and an operation switching control unit 38. The signal processing unit 34 includes at least the following, a directivity direction calculating unit 34a, an output control unit 34b, a tracking processing unit 34c, and a sound source detecting unit 34d.

The operation switching control unit 38 performs various operations for switching a camera apparatus used for capturing an image of a monitoring target of the directivity control system 100B or an omni-directional microphone array apparatus used for collection of a sound emitted by the monitoring target among the plural camera apparatuses C1 to Cn or the plural omni-directional microphone array apparatuses M1 to Mm, based on a variety of information or data relating to a movement situation of the monitoring target (for example, a person) obtained by the tracking processing unit 34c.

Figure 24:
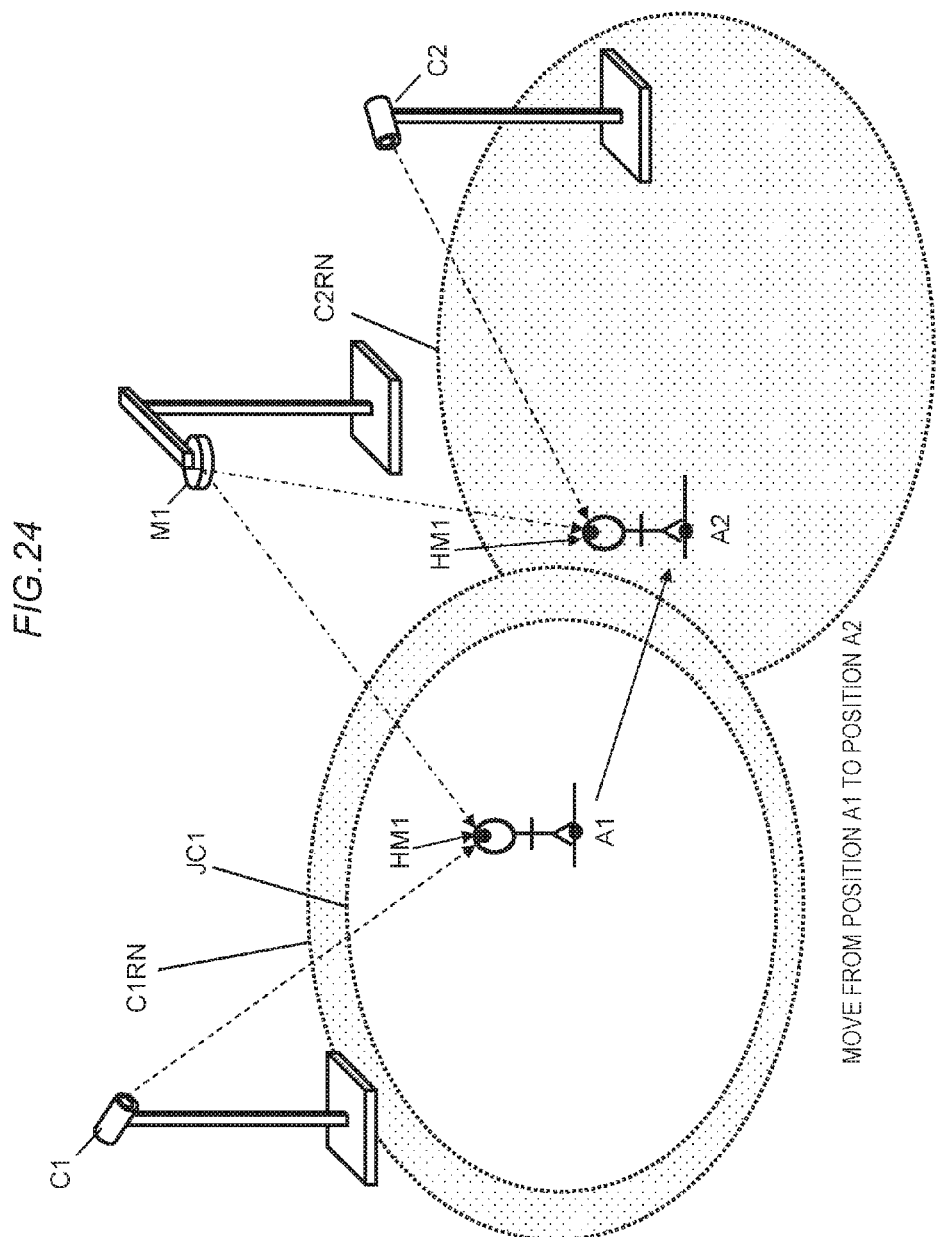
FIG. 24 is a diagram illustrating an automatic switching process of a camera apparatus used for capturing an image displayed in a display apparatus.

Next, an automatic switching process of a camera apparatus in the directivity control apparatus 3B will be described with reference to FIG. 24. FIG. 24 is a diagram illustrating an automatic switching process of a camera apparatus used for capturing an image displayed in the display apparatus 35. In FIG. 24, for ease of description, an example in which as a person HM1 that is a monitoring target is moving from a tracking position A1 to a tracking position A2, the camera apparatus used for capturing the image of the person HM1 is switched from a camera apparatus C1 to a camera apparatus C2 will be described.

The tracking position A1 is within the range of an imaging area C1RN of the camera apparatus C1, which is within the range of a predetermined switching determination line JC1 of the camera apparatus C1. The tracking position A2 is within the range of an imaging area C2RN of the camera apparatus C2, which is out of the range of the switching determination line JC1 of the camera apparatus C1. Although not shown, the tracking positions A1 and A2 are within the sound collecting area of the omni-directional microphone array apparatus M1.

When the person HM1 is out of the imaging area C1RN of the camera apparatus C1, the operation switching control unit 38 notifies the camera apparatus C2 of information indicating that the camera apparatus used for capturing the image of the person HM1 is to be switched from the camera apparatus C1 to the camera apparatus C2 through the communication unit 31 and the network NW. In other words, the operation switching control unit 38 instructs the camera apparatus C2 to prepare for the capturing of the image in a field angle range of the camera apparatus C2. At this time, image data on video obtained by the imaging of the camera apparatus C1 is displayed on the tracking screen TRW of the display apparatus 35.

For example, when the person HM1 is out of the switching determination line JC1 of the camera apparatus C1, the operation switching control unit 38 notifies the camera apparatus C2 of the information indicating that the camera apparatus used for capturing the image of the person HM1 is to be switched from the camera apparatus C1 to the camera apparatus C2, through the communication unit 31 and the network NW.

The operation switching control unit 38 determines whether the person HM1 is out of the switching determination line JC1 using information on the distance between the camera apparatus C1 and the person HM1 measured by the camera apparatus C1. Specifically, when the person HM1 is present in the field angle of the camera apparatus C1 and the distance from the camera apparatus C1 to the person HM1 becomes larger than the (known) distance from the camera apparatus C1 to the switching determination line JC1, the operation switching control unit 38 determines that the person HM1 is out of the switching determination line JC1.

It is assumed that the operation switching control unit 38 recognizes in advance a camera apparatus (for example, the camera apparatus C2) capable of being switched from the camera apparatus C1 and also recognizes in advance a camera apparatus capable of being switched from a different camera apparatus.

If it is determined that the person HM1 who is out of the switching determination line JC1 is out of the imaging area C1RN of the camera apparatus C1, the operation switching control unit 38 switches the camera apparatus used for capturing the image of the person HM1 from the camera apparatus C1 to the camera apparatus C2. Then, on the tracking screen TRW of the display apparatus 35, image data (for example, image data on the moving person HM1) on the video obtained by the imaging of the camera apparatus C2 is displayed.

Thus, the operation switching control unit 38 can adaptively switch the camera apparatus to a camera apparatus capable of correctly projecting the image of the moving monitoring target (for example, the person HM1), and can easily designate the image of the monitoring target (for example, the person HM1) of the user.

Figure 25:
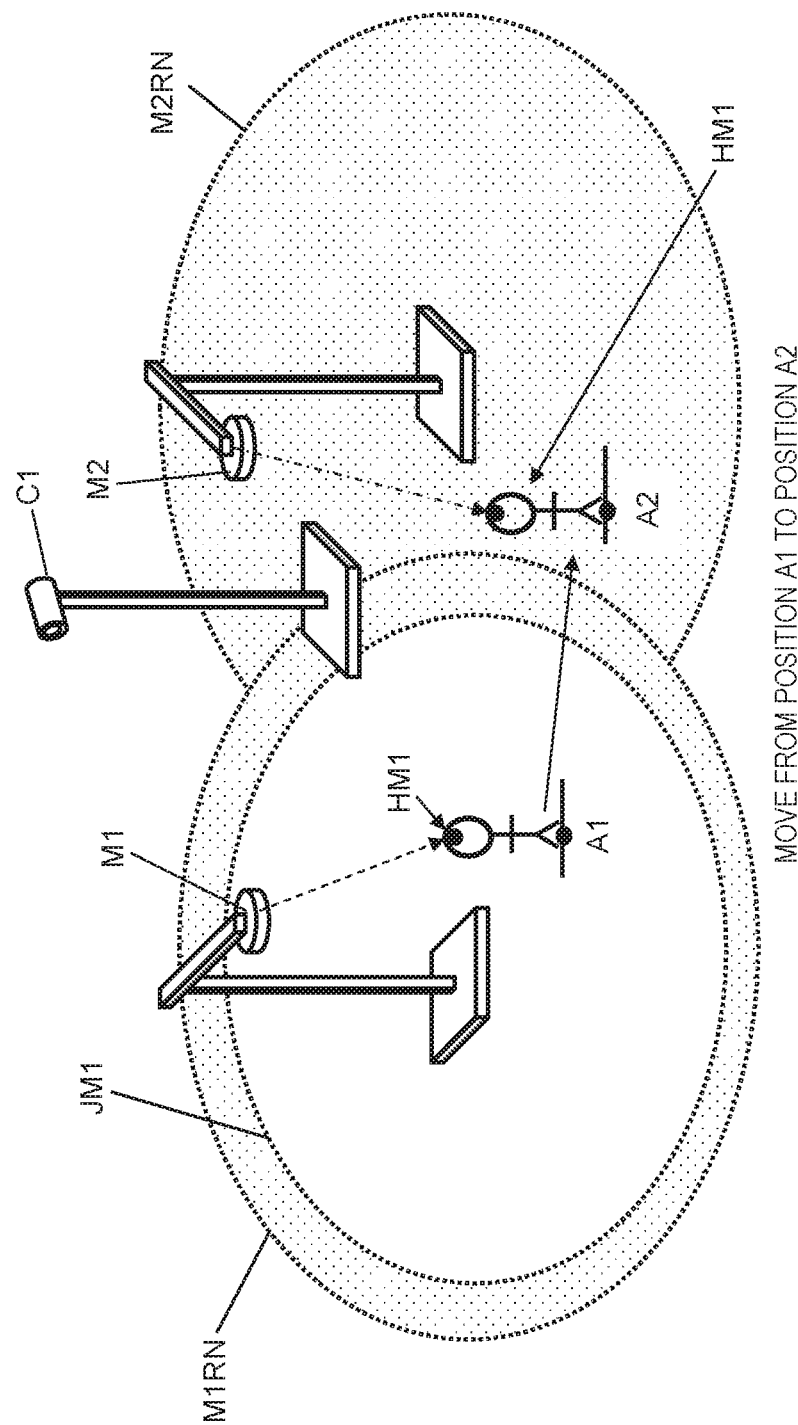
FIG. 25 is a diagram illustrating an automatic switching process of an omni-directional microphone array apparatus used for collection of a sound of a monitoring target.

Next, the automatic switching process of the omni-directional microphone array apparatus in the directivity control apparatus 3B will be described with reference to FIG. 25. FIG. 25 is a diagram illustrating an automatic switching process of an omni-directional microphone array apparatus used for collection of a sound of a monitoring target (for example, the person HM1). In FIG. 25, for ease of description, an example in which as the person HM1 that is the monitoring target is moving from the tracking position A1 to the tracking position A2, the omni-directional microphone array apparatus used for the sound collection emitted by the person HM1 is switched from an omni-directional microphone array apparatus M1 to an omni-directional microphone array apparatus M2 will be described.

The tracking position A1 is within the range of a sound collecting area M1RN of the omni-directional microphone array apparatus M1, which is within the range of a switching determination line JM1 of the predetermined omni-directional microphone array apparatus M1. The tracking position A2 is within the range of a sound collecting area M2RN of the omni-directional microphone array apparatus M2, which is out of the range of the switching determination line JM1 of the omni-directional microphone array apparatus M1. Although not shown, the tracking positions A1 and A2 are within the imaging area of the camera apparatus C1.

When the person HM1 is out of the sound collecting area M1RN of the omni-directional microphone array apparatus M1, the operation switching control unit 38 notifies the omni-directional microphone array apparatus M2 of information indicating that the omni-directional microphone array apparatus used for the sound collection emitted by the person HM1 is to be switched from the omni-directional microphone array apparatus M1 to the omni-directional microphone array apparatus M2 through the communication unit 31 and the network NW. In other words, the operation switching control unit 38 instructs the omni-directional microphone array apparatus M2 to prepare for the sound collection in the sound collecting area of the omni-directional microphone array apparatus M2.

For example, when the person HM1 is out of the switching determination line JM1 of the omni-directional microphone array apparatus M1, the operation switching control unit 38 notifies the omni-directional microphone array apparatus M2 of the information indicating that the omni-directional microphone array apparatus used for the sound collection emitted by the person HM1 is to be switched from the omni-directional microphone array apparatus M1 to the omni-directional microphone array apparatus M2, through the communication unit 31 and the network NW.

The operation switching control unit 38 determines whether the person HM1 is out of the switching determination line JM1 using information on the distance between the omni-directional microphone array apparatus M1 and the person HM1. Specifically, when the distance from the omni-directional microphone array apparatus M1 to the person HM1 becomes larger than the (known) distance from the omni-directional microphone array apparatus M1 to the switching determination line JM1, the operation switching control unit 38 determines that the person HM1 is out of the switching determination line JM1. It is assumed that the operation switching control unit 38 recognizes an omni-directional microphone array apparatus (for example, the omni-directional microphone array apparatus M2) capable of being switched from the omni-directional microphone array apparatus M1 in advance and also recognizes an omni-directional microphone array apparatus capable of being switched from a different omni-directional microphone array apparatus in advance.

If it is determined that the person HM1 who is out of the switching determination line JM1 is out of the sound collecting area M1RN of the omni-directional microphone array apparatus M1, the operation switching control unit 38 switches the omni-directional microphone array apparatus M used for the sound collection emitted by the person HM1 from the omni-directional microphone array apparatus M1 to the omni-directional microphone array apparatus M2.

Thus, the operation switching control unit 38 can adaptively switch the omni-directional microphone array apparatus to an omni-directional microphone array apparatus capable of correctly collecting the sound emitted by the moving monitoring target (for example, the person HM1), and can collect the sound emitted by the monitoring target (for example, the person HM1) with high accuracy.

Figure 26:
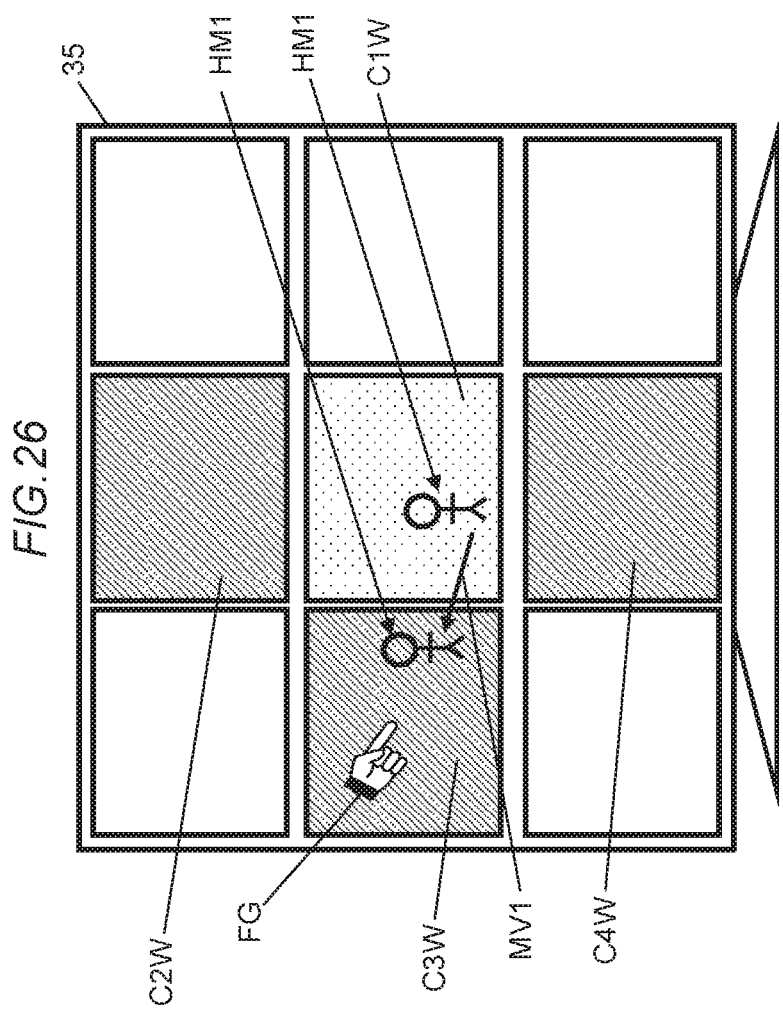
FIG. 26 is a diagram illustrating a manual switching process of the camera apparatus used for capturing the image displayed in the display apparatus.

Next, a manual switching process of the camera apparatus in the directivity control apparatus 3B will be described with reference to FIG. 26. FIG. 26 is a diagram illustrating the manual switching process of the camera apparatus used for capturing the image displayed in the display apparatus 35. In FIG. 26, in the display apparatus 35, according to an input operation based on the cursor CSR using the mouse operation of the user or the finger FG of the user, the tracking screen TRW of the image obtained by the imaging of the camera apparatus C1 that is currently used for capturing the image of the person HM1 is switched to a multi-camera screen that includes a camera screen C1W of the camera apparatus C1 and camera screens of camera apparatuses (for example, eight camera apparatuses) around the camera apparatus C1. (See FIG. 26, Tracking screen is switched to multi-camera screen including respective camera screens of currently used camera apparatus and selectable adjacent camera apparatuses.)

Similarly to FIG. 24, switchable camera apparatuses are determined in advance for the currently used camera apparatus C1, which are camera apparatuses C2, C3 and C4, for example. On the multi-camera screen shown in FIG. 26, camera screens C2W, C3W and C4W obtained by the imaging of the camera apparatuses C2, C3 and C4 are displayed (see hatched portions shown in FIG. 26) in the display apparatus 35. It is assumed that the person HM1 moves in a movement direction MV1.

It is assumed that a user touches any camera screen (for example, the camera screen C3W) among three camera screens C2W, C3W and C4W by the finger FG with respect to the multi-camera screen shown in FIG. 26, in consideration of the movement direction MV1 of the person HM1 that is the monitoring target.

The operation switching control unit 38 switches the camera apparatus used for capturing the image of the person HM1 from the currently used camera apparatus C1 to the camera apparatus C3 corresponding to the camera screen C3W that is a target of the touch operation, according to the touch operation of the finger FG of the user. (See FIG. 26, If camera screen is selected by the user operation according to movement direction of person, the camera apparatus is switched to camera apparatus corresponding to selected camera screen.)

Thus, the operation switching control unit 38 can adaptively switch the camera apparatus to a camera apparatus capable of correctly projecting the image of the moving monitoring target (for example, the person HM1), and can simply designate the image of the monitoring target (for example, the person HM1) of the user by the user's simple operation.

Figure 27:
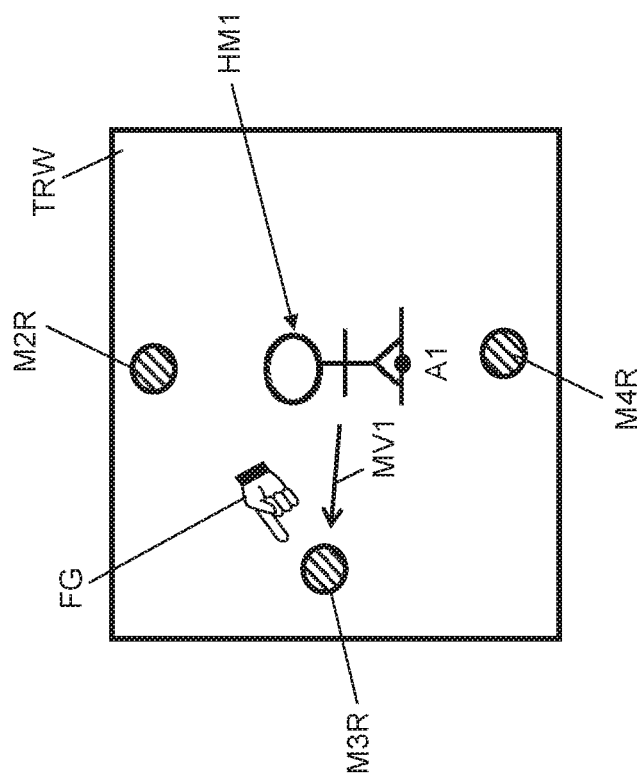
FIG. 27 is a diagram illustrating a manual switching process of the omni-directional microphone array apparatus used for the sound collection of the monitoring target.

Next, a manual switching process of the omni-directional microphone array apparatus in the directivity control apparatus 3B will be described with reference to FIG. 27. FIG. 27 is a diagram illustrating the manual switching process of the omni-directional microphone array apparatus used for the sound collection of the monitoring target (for example, the person HM1). In FIG. 27, the person HM1 that is the monitoring target is displayed at the center on the tracking screen TRW. Further, it is assumed that omni-directional microphone array apparatuses capable of being switched from the currently used omni-directional microphone array apparatus M1 are three omni-directional microphone array apparatuses M2, M3 and M4 provided around the omni-directional microphone array apparatus M1.

In FIG. 27, according to an input operation based on the cursor CSR using the mouse operation of the user or the finger FG of the user, markers M2R, M3R and M4R indicating rough positions of the omni-directional microphone array apparatuses M2, M3 and M4 capable of being switched from the currently used microphone array apparatus M1 are displayed on the tracking screen TRW (see FIG. 27, (1) Markers indicating outline positions of switchable adjacent omnidirectional microphone array apparatuses are displayed on the tracking screen).

The user selects any marker (for example, the marker M3R) among three markers by the touch operation of the finger FG of the user, in consideration of the movement direction MV1 of the person HM1 that is the monitoring target from the tracking position A1 corresponding to the tracking point on the person HM1 (see FIG. 27, (2) Any one marker is selected by a user operation). The operation switching control unit 38 instructs the omni-directional microphone array apparatus M3 corresponding to the marker M3R selected by the touch operation of the finger FG of the user, instead of the currently used omni-directional microphone array apparatus M1, to start the sound collection through the communication unit 31 and the network NW (see FIG. 27, (3) Sound collection is started in omni-directional microphone array apparatus corresponding to selected marker).

The output control unit 34b switches a directivity in a direction from the omni-directional microphone array apparatus M3 corresponding to the selected marker M3R toward the tracking position of the person HM1 at the current time (see FIG. 27, (4) Directivity is switched in a direction from omni-directional microphone array apparatus corresponding to the selected marker toward tracking position at the current point). Then, the markers M2R, M3R and M4R indicating the rough positions of the omni-directional microphone array apparatuses M2, M3 and M4 displayed on the tracking screen TRW are deleted by the output control unit 34b (see FIG. 27, (5) Markers indicating outline positions of adjacent omni-directional microphone array apparatuses displayed on tracking screen are deleted).

Thus, the operation switching control unit 38 can adaptively switch the omni-directional microphone array apparatus to the omni-directional microphone array apparatus M3 capable of correctly collecting the sound emitted by the moving monitoring target (for example, the person HM1), and can collect the sound emitted by the person HM1 according to the movement direction MV1 of the person HM1 with high accuracy by the user's simple operation on the markers M2R, M3R and M4R displayed on the tracking screen TRW.

Next, a selection process of an optimal omni-directional microphone array apparatus in the directivity control apparatus 3B will be described with reference to FIG. 28. FIG. 28 is a diagram illustrating the selection process of the omni-directional microphone array apparatus optimal for the sound collection of the monitoring target. In the display apparatus 35 on an upper left side in FIG. 28, camera screens of all the camera apparatuses (for example, nine camera apparatuses) controlled by the directivity control system 100B are displayed in list according to an input operation based on the cursor CSR using the mouse operation of the user or the finger FG of the user.

Among the respective camera screens that are displayed in list in the display apparatus 35 on an upper left side in FIG. 28, camera screens on which the monitoring target (for example, the person HM1) that is the target of the sound tracking process is projected are the camera screens C1W, C2W and C3W (Upper left side in FIG. 28: Camera screens of all camera apparatuses are display in the list). It is assumed that the camera screen C1W where the projection of the person HM1 is the most excellent is selected from among the camera screens C1W, C2W and C3W, according to an input operation based on the cursor CSR using the mouse operation of the user or the finger FG of the user (Upper left side in FIG. 28: Camera screen having the most excellent projection of the person is selected).

The operation switching control unit 38 selects the camera apparatus C5 corresponding to the camera screen C1W as the camera apparatus used for capturing the image of the person HM1 according to the selection of the camera screen C1W of the user, for switching. Thus, the output control unit 34b enlarges the image data obtained by the imaging of the camera apparatus corresponding to the camera screen C1W and displays the result on the tracking screen TRW1 of the display apparatus 35 (see a lower left side in FIG. 28: Selected camera screen C1W is enlarged and displayed on tracking screen TRW1→Camera apparatus C1 is selected).

Further, the output control unit 34b displays the markers M1R, M2R, M3R and M4R roughly indicating positions of all the omni-directional microphone array apparatuses associated with the camera apparatus C1 selected by the operation switching control unit 38 at four corners of the tracking screen TRW1. The display positions of the markers M1R, M2R, M3R and M4R are not limited to the four corners on the tracking screen TRW1. (See upper right side in FIG. 28: Markers indicating outline positions of all omni-directional microphone array apparatuses M1, M2, M3 and M4 associated with selected camera apparatus C1 are displayed.)

Further, if the markers M1R, M2R, M3R and M4R are sequentially designated according to the input operation based on the cursor CSR using the mouse operation of the user or the finger FG of the user, the output control unit 34b forms the directivity in a direction from the omni-directional microphone array apparatus corresponding to each marker toward the position of the person HM1, for each marker, while highlighting (for example, by a blink Br) the markers one by one, and outputs the sound collected for a predetermined time. (See upper right side in FIG. 28: If Markers are sequentially designated, each collected sound to which directivity is formed is output for predetermined time while highlighting (for example, by blink) marker.)

If the marker (for example, the marker M3R) indicating the rough position of the omni-directional microphone array apparatus that is determined as optimal by the user in the sound output for a predetermined time is selected, the operation switching control unit 38 selects the omni-directional microphone array apparatus M3 corresponding to the selected marker M3R as the omni-directional microphone array apparatus used for the sound collection emitted by the person HM1, for switching. (See lower right side in FIG. 28: Marker determined as optimal by user in sound collected for the predetermined time is selected→Omni-directional microphone array apparatus M3 corresponding to selected marker M3R is selected.)

Thus, the operation switching control unit 38 can output the collected sound to which different directivities are formed in the plural omni-directional microphone array apparatuses M1, M2, M3 and M4 associated with the selected camera apparatus C5 for the predetermined time. Thus, by performing a simple operation for selecting the collected sound that is determined as optimal by the user, the operation switching control unit 38 can select the optimal omni-directional microphone array apparatus M3 capable of correctly collecting the sound emitted by the moving monitoring target (for example, the person HM1), and can collect the sound emitted by the monitoring target (for example, the person HM1) with high accuracy.

Figure 29B:
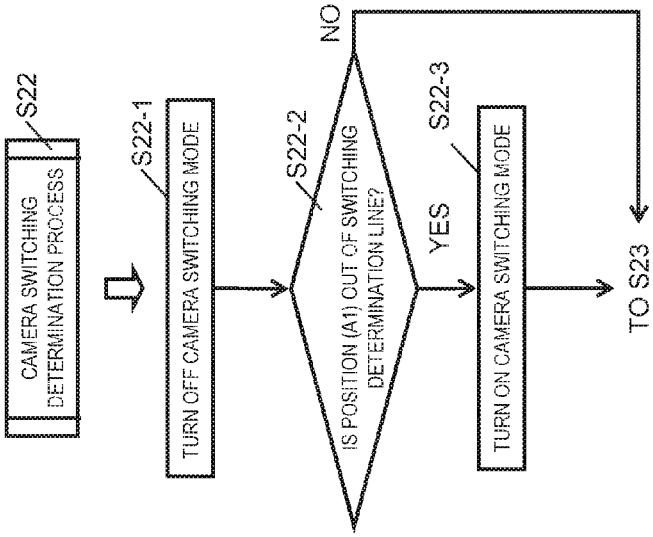
FIG. 29B is a flowchart illustrating an example of a camera switching determination process shown in FIG. 29A.
Figure 29A:
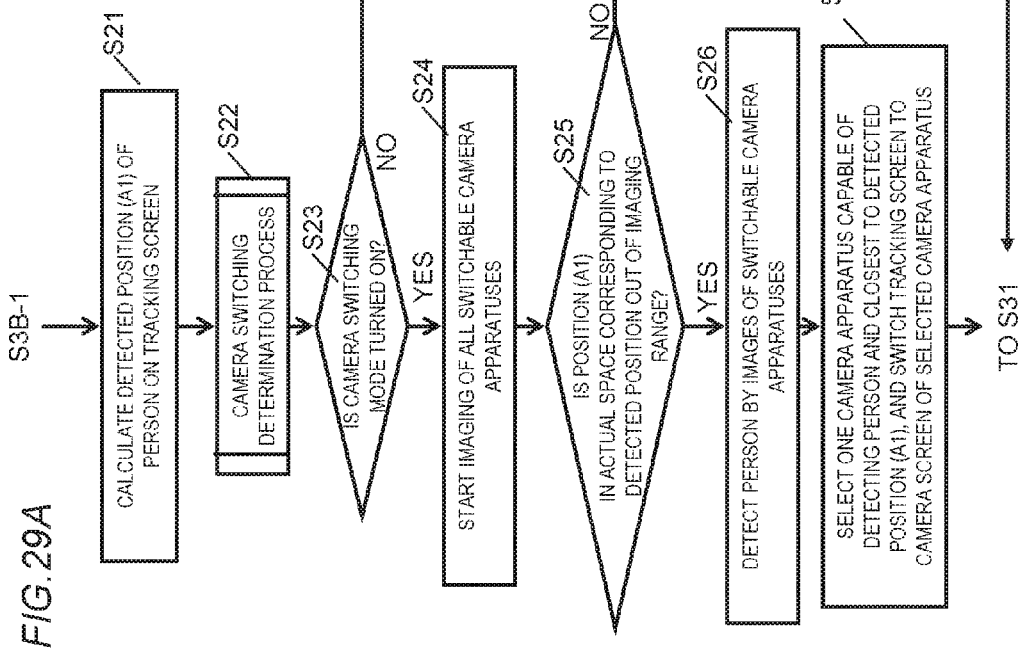
FIG. 29A is a flowchart illustrating an example of the automatic switching process of the camera apparatus in the directivity control system according to the second embodiment.

Next, an automatic switching process of a camera apparatus in the directivity control system 100B according to the present embodiment will be described with reference to FIG. 29A. FIG. 29A is a flowchart illustrating an example of the automatic switching process of the camera apparatus in the directivity control system 100B according to the second embodiment. The automatic switching process of the camera apparatus in FIG. 29A describes contents of the automatic switching process of the camera apparatus shown in FIG. 24 in detail, and is continuously performed after step S3B-1 shown in FIG. 10B, for example.

In FIG. 29A, the image processing unit 37 performs a predetermined image processing for image data projected onto the tracking screen TRW of the display apparatus 35 to detect the position (i.e., the tracking position A1) of the monitoring target (for example, the person HM1) (S21). After step S21, a camera switching determination process is performed (S22). Details of the camera switching determination process will be described later with reference to FIG. 29B.

After step S22, if the camera switching mode is turned on in the operation switching control unit 38 (S23, YES), the operation switching control unit 38 instructs all the switchable camera apparatuses associated with the currently used camera apparatus (for example, the camera apparatus C1) to capture an image through the communication unit 31 and the network NW (S24). All the camera apparatuses that receive the image capturing instruction start the image capturing.

The camera switching mode indicates a flag used for control of process whether or not to switch the camera apparatus when the plural-camera switching method is set as an automatic operation.

The operation switching control unit 38 determines whether the person HM1 existing on the tracking position A1 in the actual space detected in the step S21 is out of the imaging area C1RN of the camera apparatus C1 using the information on the distance between the camera apparatus C1 and the person HM1 measured by the currently used camera apparatus C1 (S25). If it is determined that the person HM1 is out of the imaging area C1RN of the camera apparatus C1 (S25, YES), the operation switching control unit 38 outputs the image data obtained by the imaging of all the switchable camera apparatuses associated with the currently used camera apparatus C1 according to the instruction in step S24 to the image processing unit 37. The image processing unit 37 performs a predetermined image processing for the entire image data output from the operation switching control unit 38 to determine whether the person HM1 that is the monitoring target is detected (S26). The image processing unit 37 outputs the image processing result to the operation switching control unit 38.

The operation switching control unit 38 can detect the person HM1 that is the monitoring target using the image processing result of the image processing unit 37. Further, the operation switching control unit 38 selects one camera apparatus (for example, the camera apparatus C2) closest to the tracking position A1 in the actual space detected in the step S21, and switches the camera apparatus used for capturing the image of the person HM1 from the camera apparatus C1 to the camera apparatus C2 (S27). Thus, the output control unit 34b switches the tracking screen TRW displayed in the display apparatus 35 to the camera screen of the camera apparatus C2 selected by the operation switching control unit 38 for display (S27).

Figure 30B:
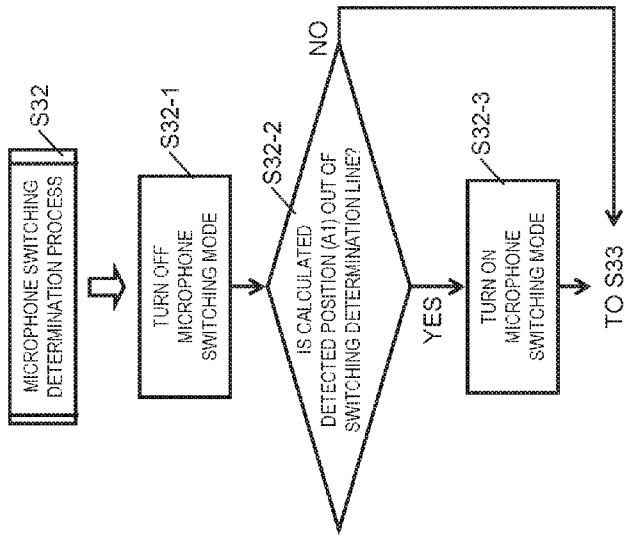
FIG. 30B is a flowchart illustrating an example of a microphone switching determination process shown in FIG. 30A.
Figure 30A:
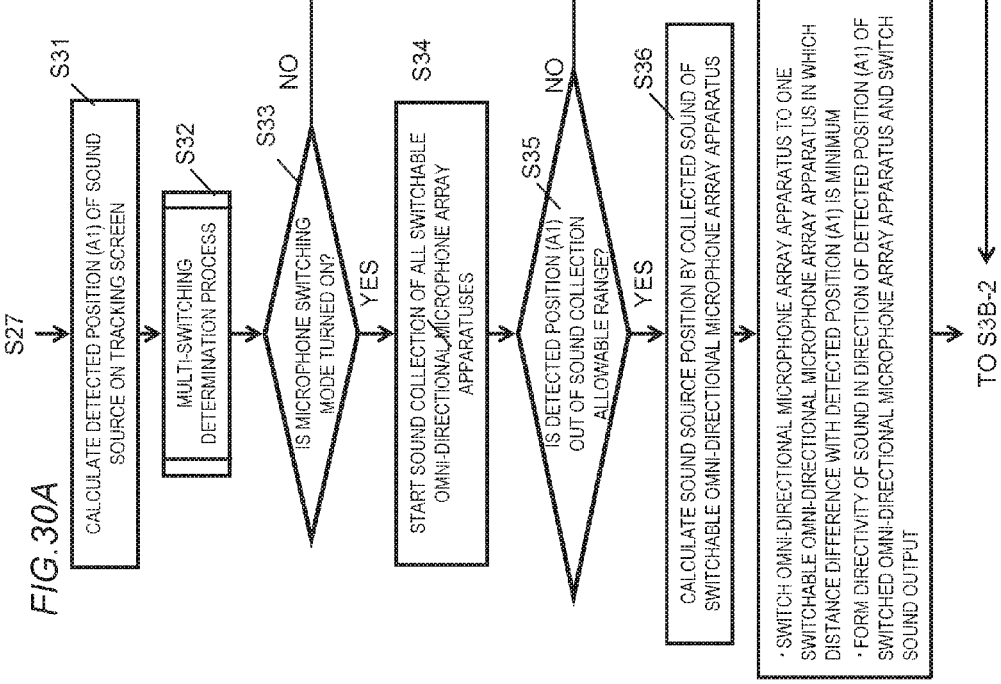
FIG. 30A is a flowchart illustrating an example of the automatic switching process of the omni-directional microphone array apparatus in the directivity control system according to the second embodiment.

On the other hand, if the camera switching mode is turned off by the operation switching control unit 38 (S23, NO), or if it is determined that the person HM1 is out of the imaging area C1RN of the camera apparatus C1 (S25, NO), the automatic switching process of the camera apparatus shown in FIG. 29A is terminated, and then, the procedure proceeds to an automatic switching process of the omni-directional microphone array apparatus shown in FIG. 30A.

Next, the camera switching determination process in the directivity control apparatus 3B will be described with reference to FIG. 29B. FIG. 29B is a flowchart illustrating an example of the camera switching determination process shown in FIG. 29A.

In FIG. 29B, the operation switching control unit 38 turns off the camera switching mode in the directivity control apparatus 3B (S22-1). The operation switching control unit 38 determines whether the tracking position A1 in the actual space corresponding to the tracking point detected in step S21 is out of the predetermined switching determination line JC1 of the camera apparatus C1 that is currently used, using the information on the distance between the camera apparatus C1 and the person HM1 measured by the currently used camera apparatus C1 (S22-2).

If it is determined that the tracking position A1 in the actual space corresponding to the tracking point detected in the step S21 is out of the predetermined switching determination line JC1 of the currently used camera apparatus C1 (S22-2, YES), the operation switching control unit 38 turns on (as an automatic mode) the camera switching mode (S22-3).

After step S22-3, or if it is determined that the tracking position A1 is not out of the predetermined switching determination line JC1 of the currently used camera apparatus C1 (S22-2, NO), the camera switching determination process shown in FIG. 29B is terminated, and then, the procedure proceeds to step S23 shown in FIG. 29A.

Next, the automatic switching process in the omni-directional microphone array apparatus in the directivity control system 100B according to the present embodiment will be described with reference to FIG. 30A. FIG. 30A is a flowchart illustrating an example of the automatic switching process of the omni-directional microphone array apparatus in the directivity control system 100B according to the second embodiment. The automatic switching process of the omni-directional microphone array apparatus shown in FIG. 30A describes the content of the automatic switching process of the omni-directional microphone array apparatus shown in FIG. 25 in detail, and may be continuously performed after step S27 shown in FIG. 29A, or reversely, the automatic switching process of the camera apparatus shown in FIG. 29A may be performed after the automatic switching process of the omni-directional microphone array apparatus shown in FIG. 30A.

In FIG. 30A, the sound source detecting unit 34d performs a predetermined sound source detection process to calculate the position (position of the sound source) of the monitoring target (for example, the person HM1) in the actual space, or to calculate coordinates (that is, coordinates of the tracking position A1 corresponding to the tracking point) indicating a position on image data corresponding to the calculated position of the sound source (S31). After step S31, a microphone switching determination process is performed (S32). Details of the microphone switching determination process will be described later with reference to FIG. 30B.

After step S32, if the microphone switching mode is turned on by the operation switching control unit 38 (S33, YES), the operation switching control unit 38 instructs all the switchable omni-directional microphone array apparatuses associated with the currently used omni-directional microphone array apparatus (for example, the omni-directional microphone array apparatus M1) to collect the sound emitted by the person HM1 through the communication unit 31 and the network NW (S34). All the omni-directional microphone array apparatuses that receive the sound collection instruction start the sound collection. The camera switching mode indicates a flag used for control of process whether or not to switch the camera apparatus when the plural-camera switching method is set as an automatic operation.

The operation switching control unit 38 determines whether the person HM1 is out of the sound collecting area M1RN of the omni-directional microphone array apparatus M1 using the information on the distance between the currently used omni-directional microphone array apparatus M1 and the person HM1 calculated by the sound source detecting unit 34d (S35). If it is determined that the person HM1 is out of the sound collecting area M1RN of the omni-directional microphone array apparatus M1 (S35, YES), the sound source detecting unit 34d calculates the position (position of the sound source) of the person HM1 that is the monitoring target based on the strength or the sound volume level of the sound collected by all the switchable omni-directional microphone array apparatuses M1 associated with the currently used omni-directional microphone array apparatus according to the instruction in step S34 (S36).

The operation switching control unit 38 selects one omni-directional microphone array apparatus (for example, the omni-directional microphone array apparatus M2) in which the distance difference between the position (position of the sound source) of the person HM1 that is the monitoring target and the omni-directional microphone array apparatus is the minimum, among all the omni-directional microphone array apparatuses associated with the currently used omni-directional microphone array apparatus M1 using the sound source detection result of the sound source detecting unit 34d, and switches the omni-directional microphone array apparatus used for the sound collection emitted by the person HM1 from the omni-directional microphone array apparatus M1 to the omni-directional microphone array apparatus M2 (S37). Thus, the output control unit 34b switches the directivity of the sound in a direction from the switched omni-directional microphone array apparatus M2 toward the position of the sound source calculated in step S36 (S37).

On the other hand, if the microphone switching mode is turned off by the operation switching control unit 38 (S33, NO), or if it is determined that the person HM1 is not out of the sound collecting area M1RN of the omni-directional microphone array apparatus M1 (S35, NO), the automatic switching process of the omni-directional microphone array apparatus shown in FIG. 30A is terminated, and then, the procedure proceeds to step S3B-2 shown in FIG. 10B. The automatic switching process of the camera apparatus shown in FIG. 29A may be started after the automatic switching process of the omni-directional microphone array apparatus shown in FIG. 30A is terminated.

Next, the microphone switching determination process in the directivity control apparatus 3B will be described with reference to FIG. 30B. FIG. 30B is a flowchart illustrating an example of the microphone switching determination process shown in FIG. 30A.

In FIG. 30B, the operation switching control unit 38 turns off the microphone switching mode (S32-1). The operation switching control unit 38 determines whether the tracking position A1 calculated in step S31 is out of the predetermined switching determination line JM1 of the omni-directional microphone array apparatus M1 that is currently used, using the information on the distance between the currently used omni-directional microphone array apparatus M1 and the person HM1 (S32-2).

If it is determined that the tracking position A1 is out of the predetermined switching determination line JM1 of the currently used omni-directional microphone array apparatus M1 (S32-2, YES), the operation switching control unit 38 turns on the microphone switching mode (S32-3).

After step S32-3, or if it is determined that the tracking position A1 is not out of the predetermined switching determination line JM1 of the currently used omni-directional microphone array apparatus M1 (S32-2, NO), the microphone switching determination process shown in FIG. 30B is terminated, and then, the procedure proceeds to step S33 shown in FIG. 30A.

Figure 31B:
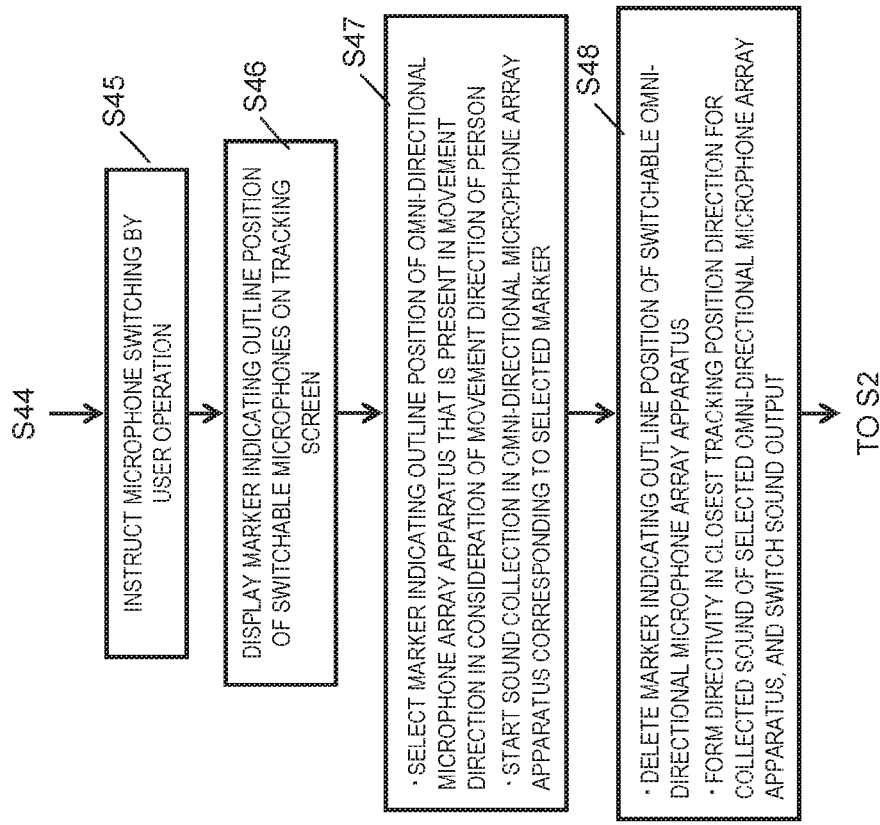
FIG. 31B is a flowchart illustrating an example of the manual switching process of the omni-directional microphone array apparatus in the directivity control system according to the second embodiment.
Figure 31A:
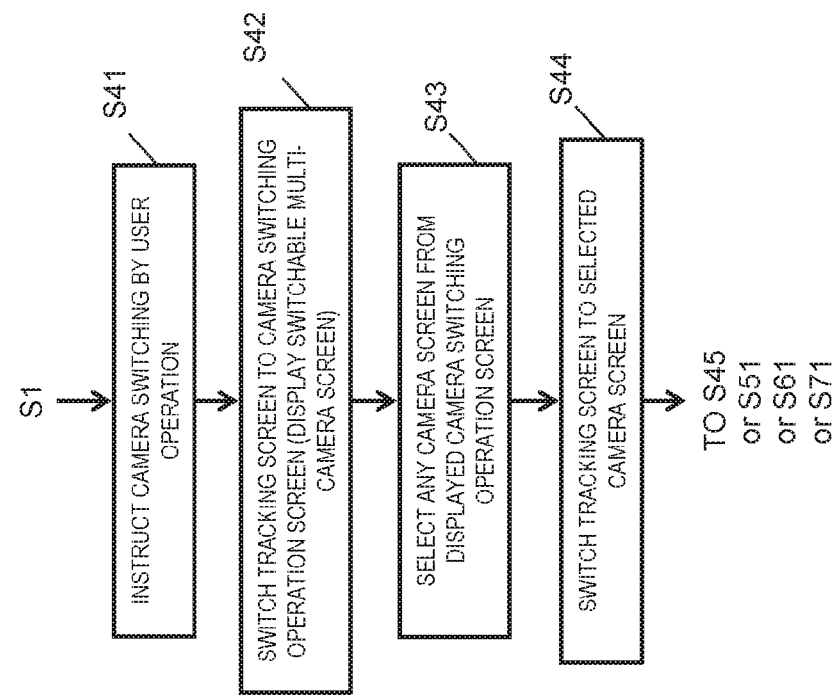
FIG. 31A is a flowchart illustrating an example of the manual switching process of the camera apparatus in the directivity control system according to the second embodiment.

Next, a manual switching process of the camera apparatus in the directivity control system 100B according to the present embodiment will be described with reference to FIG. 31A. FIG. 31A is a flowchart illustrating an example of the manual switching process of the camera apparatus in the directivity control system 100B according to the second embodiment. The manual switching process of the camera apparatus in the directivity control system 100B shown in FIG. 31A is performed subsequently to the step S1 shown in FIG. 9A, FIG. 9B or FIG. 10A.

In FIG. 31A, if an instruction for switching the camera apparatus is input to the display apparatus 35 according to an input operation using the cursor CSR using the mouse operation of the user or the finger FG of the user (S41), the output control unit 34b switches the tracking screen TRW of the image obtained by the imaging of the camera apparatus C1 currently used for capturing the image of the person HM1 to the multi-camera screen that includes the camera screen C1W of the camera apparatus C1 and the camera screens of the camera apparatuses (for example, eight camera apparatuses) around the camera apparatus C1 (S42).

It is assumed that the user selects any camera screen by the touch operation of the finger FG, for example, with respect to the multi-camera screen displayed in the display apparatus 35 in step S42, in consideration of the movement direction MV1 of the person HM1 that is the monitoring target (see FIG. 26) (S43).

The operation switching control unit 38 switches the camera apparatus used for capturing the image of the person HM1 from the currently used camera apparatus C1 to the camera apparatus C3 corresponding to the camera screen C3W that is the target of the touch operation in step S43, according to the touch operation of the finger FG of the user (S44). Thus, the manual switching process of the camera apparatus shown in FIG. 31A is terminated, and then, the procedure proceeds to either one of steps S45, S51, S61 and step S71 shown in FIG. 31B, FIG. 32A or FIG. 32B.

Next, the manual switching process of the omni-directional microphone array apparatus in the directivity control system 100B according to the present embodiment will be described with reference to FIG. 31B. FIG. 31B is a flowchart illustrating an example of the manual switching process of the omni-directional microphone array apparatus in the directivity control system 100B according to the second embodiment.

In FIG. 31B, if an instruction for switching the omni-directional microphone array apparatus according to an input operation using the cursor CSR using the mouse operation of the user or the finger FG of the user (S45), the output control unit 34b displays markers (for example, markers M2R, M3R and M4R) indicating rough positions of the omni-directional microphone array apparatuses (for example, the omni-directional microphone array apparatuses M2, M3 and M4) capable of being switched from the currently used omni-directional microphone array apparatus M1 on the tracking screen TRW (S46).

The user selects any one marker (for example, the marker M3R) from the three markers by the touch operation of the finger FG of the user in consideration of the movement direction MV1 from the tracking position A1 of the person HM1 that is the monitoring target (S47, see FIG. 27). The operation switching control unit 38 instructs the omni-directional microphone array apparatus M3 corresponding to the marker M3R selected by the touch operation of the finger FG of the user, instead of the currently used omni-directional microphone array apparatus M1, to start the sound collection through the communication unit 31 and the network NW (S47).

The output control unit 34b switches the directivity in a direction from the omni-directional microphone array apparatus M3 corresponding to the marker M3R selected in step S47 toward the tracking position of the person HM1 at the current time (S48). Further, the output control unit 34b deletes the markers M2R, M3R and M4R indicating the rough positions of the omni-directional microphone array apparatuses M2, M3 and M4 displayed on the tracking screen TRW (S48).

After step S48, the manual switching process of the omni-directional microphone array apparatus shown in FIG. 31B is terminated, and then, the procedure proceeds to step S2 shown in FIG. 9A, FIG. 9B or FIG. 10A. Here, after the manual switching process of the omni-directional microphone array apparatus shown in FIG. 31B, the manual switching process of the camera apparatus shown in FIG. 31A may be performed.

Figure 32B:
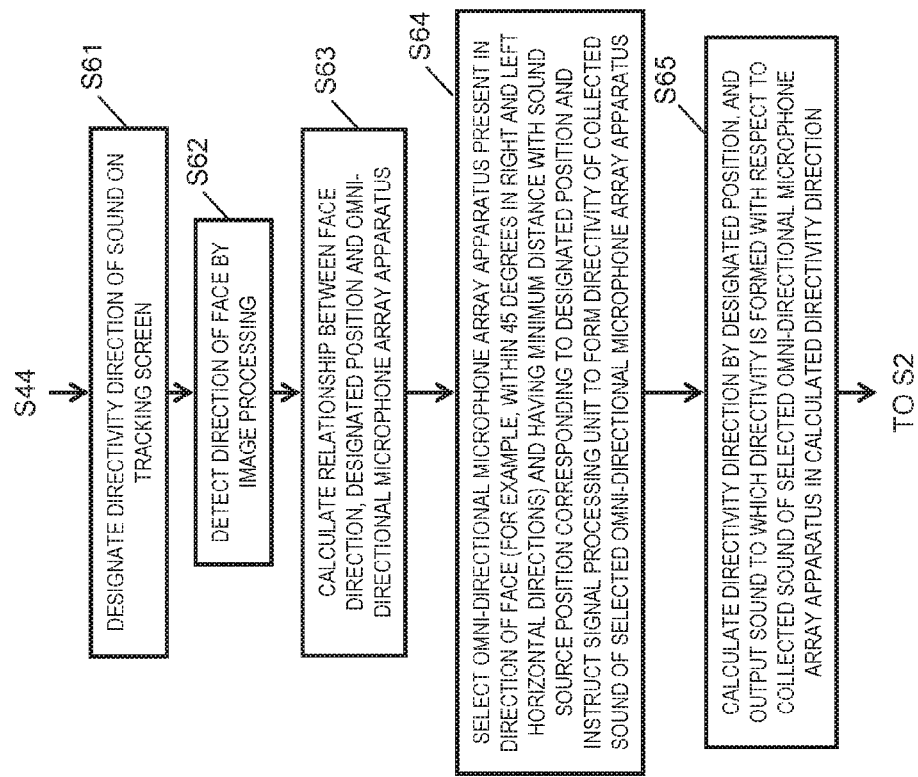
FIG. 32B is a flowchart illustrating a second example of the selection process of the omni-directional microphone array apparatus optimal in the directivity control system according to the second embodiment.
Figure 32A:
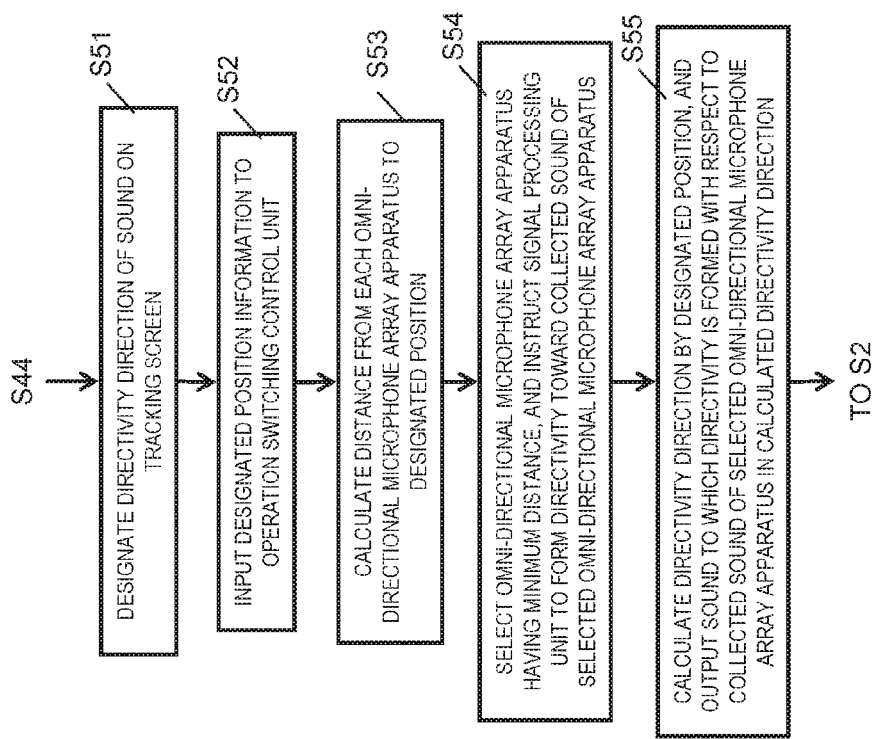
FIG. 32A is a flowchart illustrating a first example of the selection process of the omni-directional microphone array apparatus optimal in the directivity control system according to the second embodiment.

Next, a selection process of the omni-directional microphone array apparatus optimal in the directivity control system 100B according to the present embodiment will be described with reference to FIGS. 32A and 32B and FIG. 33. FIG. 32A is a flowchart illustrating a first example of the selection process of the omni-directional microphone array apparatus optimal in the directivity control system 100B according to the second embodiment. FIG. 32B is a flowchart illustrating a second example of the selection process of the omni-directional microphone array apparatus optimal in the directivity control system 100B according to the second embodiment. FIG. 33 is a flowchart illustrating a third example of the selection process of the omni-directional microphone array apparatus optimal in the directivity control system 100B according to the second embodiment.

In FIG. 32A, if the position (the tracking position corresponding to the tracking point) of the person HM1 that is the monitoring target in the movement direction is designated on the tracking screen TRW displayed in the display apparatus 35 according to the input operation based on the cursor CSR using the mouse operation of the user or the finger FG of the user (S51), information on the designated position (for example, coordinates) is input to the operation switching control unit 38 (S52).

The operation switching control unit 38 calculates individual distance from each omni-directional microphone array apparatus to the position in the actual space corresponding to the designated position designated in step S51, that is, individual distance from each omni-directional microphone array apparatus to the person HM1 that is the monitoring target (S53).

The operation switching control unit 38 selects the omni-directional microphone array apparatus having the minimum distance among the respective distances calculated in step S53, and instructs the signal processing unit 34 to form the directivity with respect to sound data of the sound collected by the selected omni-directional microphone array apparatus (S54).

The output control unit 34b of the signal processing unit 34 forms the directivity of the sound in a direction from the omni-directional microphone array apparatus selected by the operation switching control unit 38 in step S54 toward the position of the person HM1 that is the monitoring target according to the instruction in step S54, and outputs the sound to which the directivity is formed through the speaker 36 (S55).

Thus, as the user easily designates the position indicating the movement direction of the monitoring target (for example, the person HM1), the operation switching control unit 38 can select the optimal omni-directional microphone array apparatus capable of correctly collecting the sound emitted by the monitoring target (for example, the person HM1) during movement, and can collect the sound emitted by the monitoring target (for example, the person Hm1) with high accuracy.

After step S55, the selection process of the optimal omni-directional microphone array apparatus shown in FIG. 32A is terminated, and then, the procedure proceeds to step S2 shown in FIG. 9A, FIG. 9B or FIG. 10A. Here, after the optimal omni-directional microphone array apparatus selection process shown in FIG. 32A, the manual switching process shown in FIG. 31A may be performed.

In FIG. 32B, if the position (the tracking position corresponding to the tracking point) of the person HM1 that is the monitoring target in the movement direction is designated on the tracking screen TRW displayed in the display apparatus 35 according to the input operation based on the cursor CSR using the mouse operation of the user or the finger FG of the user (S61), information on the designated position (for example, coordinates) is input to the operation switching control unit 38.

Thus, by performing a predetermined image processing for the image data captured by the currently used camera apparatus (for example, the camera apparatus C1), the image processing unit 37 detects the direction of the face of the person HM1 that is the monitoring target (S62). The image processing unit 37 outputs the detection result of the direction of the face of the person HM1 that is the monitoring target to the operation switching control unit 38.

The operation switching control unit 38 calculates the relationship between the face of the person HM1, the designated position and each omni-directional microphone array apparatus using the information on the designated position designated in step S61 (for example, coordinates indicating the position on the image data) and the detection result of the direction of the face of the person HM1 obtained by the image processing unit 37 in step S62 (S63). For example, the operation switching control unit 38 calculates the distance between the position of the monitoring target (for example, the person HM1) corresponding to the designated position on the image data designated in step S61 and each omni-directional microphone array apparatus.

The operation switching control unit 38 selects the omni-directional microphone array apparatus having the minimum distance between the position of the monitoring target (for example, the person HM1) corresponding to the designated position on the image data designated in step S61 and each omni-directional microphone array apparatus, in a direction (for example, within 45 degrees in the horizontal direction) along the direction of the face of the monitoring target (for example, the person HM1) (S64). Further, the operation switching control unit 38 instructs the signal processing unit 34 to form the directivity with respect to the sound data on the sound collected by the omni-directional microphone array apparatus selected in step S64 (S64).

The output control unit 34b of the signal processing unit 34 forms the directivity of the sound in a direction from the omni-directional microphone array apparatus selected in step S64 toward the position of the person HM1 that is the monitoring target according to the instruction in step S64, and outputs the sound to which the directivity is formed from the speaker 36 (S65).

Thus, the operation switching control unit 38 can select the optimal omni-directional microphone array apparatus capable of correctly collecting the sound emitted by the monitoring target (for example, the person HM1) during movement according to the direction of the face on the image data of the monitoring target (for example, the person HM1) and the distance between the monitoring target (for example, the person HM1) and each omni-directional microphone array apparatus, and can collect the sound emitted by the monitoring target (for example, the person HM1) with high accuracy.

After step S65, the selection process of the optimal omni-directional microphone array apparatus shown in FIG. 32B is terminated, and then, the procedure proceeds to step S2 shown in FIG. 9A, FIG. 9B or FIG. 10A. Here, after the optimal omni-directional microphone array apparatus selection process shown in FIG. 32B, the manual switching process of the camera apparatuses shown in FIG. 31A may be performed.

In FIG. 33, the output control unit 34b displays in list the camera screens of all the camera apparatuses controlled by the directivity control system 100B in the display apparatus 35 according to an input operation based on the cursor CSR using the mouse operation of the user or the finger FG of the user (S71). It is assumed that on the camera screen on which the monitoring target (for example, the person HM1) that is the sound tracking process target is projected among the respective camera screens that are displayed in list in the display apparatus 35, the camera screen C1W where the projection of the person HM1 is the most excellent is selected according to an input operation based on the cursor CSR using the mouse operation of the user or the finger FG of the user (S72).

The operation switching control unit 38 selects the camera apparatus corresponding to the camera screen as the camera apparatus used for capturing the image of the person HM1 according to the selection of the camera screen of the user in step S72, for switching. Thus, the output control unit 34b enlarges the image data obtained by the imaging of the camera apparatus corresponding to the camera screen, and displays the result on the tracking screen TRW1 of the display apparatus 35 (S73, see a lower left side in FIG. 28).

Further, the output control unit 34b displays the markers (for example, the markers M1R, M2R, M3R and M4R shown in FIG. 28) indicating rough positions of all the omni-directional microphone array apparatuses associated with the camera apparatus selected by the operation switching control unit 38 at four corners of the tracking screen TRW1 (S74).

The markers M1R, M2R, M3R and M4R are sequentially designated according to an input operation based on the cursor CSR using the mouse operation of the user or the finger FG of the user (S75), the output control unit 34b forms the directivity in a direction from the omni-directional microphone array apparatus corresponding to each marker to the position of the person HM1 while highlighting (for example, by a blink Br) the markers one by one, and outputs the sound collected for a predetermined time (S76).

If the marker (for example, the marker M3R) indicating the rough position of the omni-directional microphone array apparatus that is determined as optimal by the user in the sound output for a predetermined time is selected, the operation switching control unit 38 selects the omni-directional microphone array apparatus M3 corresponding to the selected marker M3R as the omni-directional microphone array apparatus used for collection of the sound emitted by the person HM1, for switching (S77).

After step S77, the optimal omni-directional microphone array apparatus selection process shown in FIG. 33 is terminated, and then, the procedure proceeds to step S2 shown in FIG. 9A, FIG. 9B or FIG. 10A. Here, after the optimal omni-directional microphone array apparatus selection process shown in FIG. 33, the manual switching process of the camera apparatus shown in FIG. 31A may be performed.

Modification Example of the First Embodiment

In the above-described respective embodiments, when a single monitoring target (for example, the person HM1) is mainly projected onto the image data, the sound tracking process based on the movement of the person HM1 that is the single monitoring target is performed.

In a modification example (hereinafter, referred to as "the present modification example") of the first embodiment, when plural monitoring targets (for example, plural persons) appear on the tracking screen TRW in the first embodiment or the second embodiment, an operation example of the directivity control system 100 when the plural persons are designated at the same timing or different timings will be described. Since a system configuration example of the directivity control system of the present modification example is the same as in the directivity control system 100, 100A or 100B according to the first embodiment or the second embodiment, the description of the system configuration example will be simplified or not be repeated, and only the contents that are different will be described. Hereinafter, description will be provided with reference to the system configuration example of the directivity control system 100 for ease of description.

Figure 35:
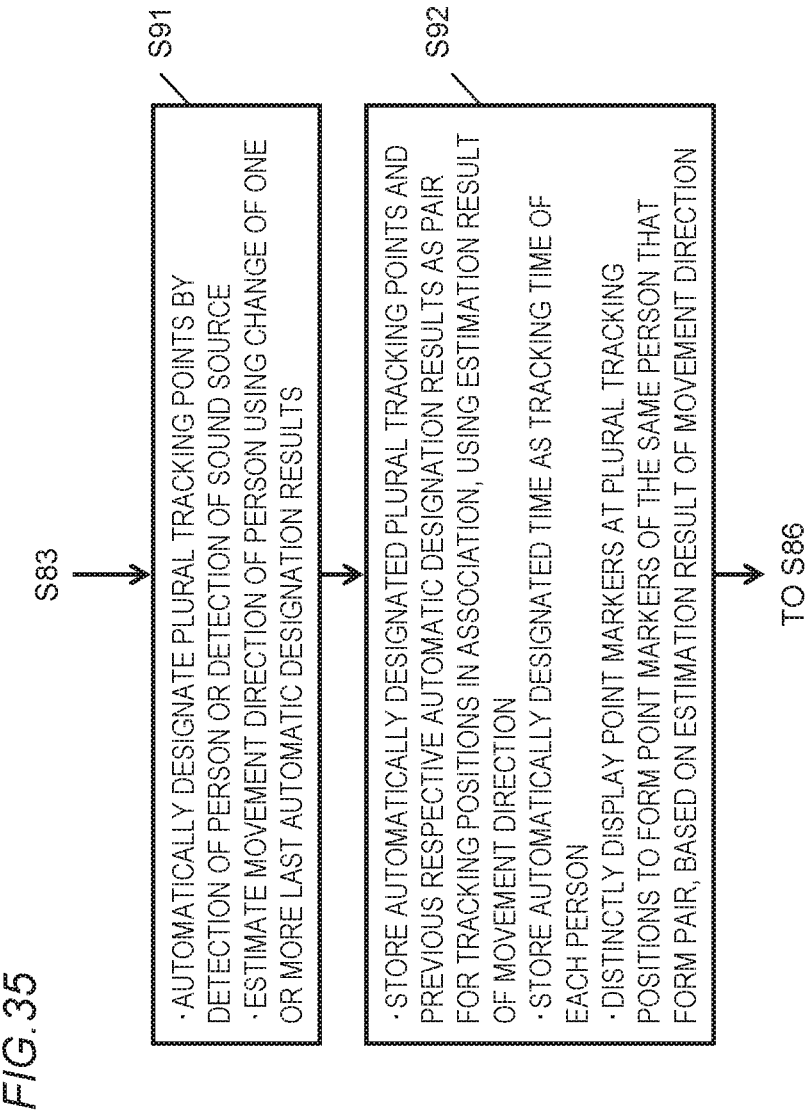
FIG. 35 is a flowchart illustrating an example of an automatic tracking process of plural monitoring targets in the directivity control system according to the modification example of the first embodiment.

The operation example of the directivity control system 100 according to the present modification example will be described with reference to FIGS. 34 and 35. FIG. 34 is a flowchart illustrating an example of an overall flow of a manual tracking process based on plural simultaneous designations in the directivity control system 100 according to the modification example of the first embodiment. FIG. 35 is a flowchart illustrating an example of an automatic tracking process of plural monitoring targets in the directivity control system 100 according to the modification example of the first embodiment. In FIG. 35, the directivity control apparatuses 3A and 3B are used.

In FIG. 34, since the determination process of a tracking mode in step S1, the tracking auxiliary process in step S2, the tracking connection process in step S5 and the sound output process in step S7 respectively correspond to the determination process of a tracking mode in step S1, the tracking auxiliary process in step S2 shown in FIG. 9A, the tracking connection process in step S6 shown in FIG. 9A and the sound output process in step S7 shown in FIG. 9A, for example, description thereof will not be repeated.

In FIG. 34, if the tracking mode is turned off (S1, NO), the manual tracking process based on the plural simultaneous designations shown in FIG. 34 is terminated, but if the tracking mode is turned on (S1, YES), on the tracking screen TRW of the display apparatus 35, the sound that is currently output (reproduced) from the speaker 36 is temporarily stopped according to a click operation of the cursor CSR using the mouse operation of the user or a touch operation using the finger FG of the user (S81). After step S81, the tracking auxiliary process is performed (S2).

After step S2, the tracking positions of the movement courses (movement paths) of the plural persons that are the monitoring targets, that is, the plural tracking points are simultaneously designated according to an input operation based on the cursor CSR using the mouse operation of the user or the finger FG of the user (S82).

The tracking processing unit 34c distinguishes the positions in the actual space corresponding to the plural designated positions on the tracking screen TRW and the designation times for each person that is the monitoring target designated in step S82 and stores the designated position and the designation time in the memory 33 in association as the tracking position and the tracking time of each tracking point (S83). Further, the tracking processing unit 34c distinctly displays the point marker on the tracking point on the tracking screen TRW for each person that is the monitoring target through the output control unit 34b (S85).

The output control unit 34b forms the directivity of the collection sound in a direction from the currently used omni-directional microphone array apparatus (for example, omni-directional microphone array apparatus) M1 toward the actual position (sound position or sound source position) of each person corresponding to the tracking position for each of the persons that are the plural monitoring targets that are simultaneously designated in step S82 (S84). After step S84, the tracking connection process is performed (S6).

After step S6, the output control unit 34b restarts the output (reproduction) of the sound that is temporarily stopped in step S81 through the speaker 36 (S85). Further, after step S85, the sound output process is performed (S7). After step S7, the operations from step S81 through step S7 (i.e., the operations of steps S81, S2, S82, S83, S84, S6, S85 and S7) are repeated until the tracking mode of the directivity control apparatus 3B is turned off.

In FIG. 35, after step S83, the image processing unit 37 of the directivity control apparatuses 3A and 3B determines whether the person that is the monitoring target is detected on the tracking screen TRW of the display apparatus 35 by performing a known image processing. If it is determined that plural persons are detected, the image processing unit 37 outputs the determination result (including data on the detected position (for example, a known representative point) of each person and the detection time) to the tracking processing unit 34c of the signal processing unit 34 (S91) as an automatic designation result. Further, the sound source detecting unit 34d determines whether the position of the sound (sound source) emitted by the person that is the monitoring target is detected on the tracking screen TRW of the display apparatus 35 by performing a known sound source detection process. If it is determined that positions of plural sound sources are detected, the sound source detecting unit 34d outputs the determination result (including data on the detected position and the detection time of the sound) to the tracking processing unit 34c as an automatic designation result (S91).

The tracking processing unit 34c calculates a motion vector of each of the persons that are the plural monitoring targets using the change of one or more last automatic designation results in step S91, and estimates a movement direction of each person (S91).

The tracking processing unit 34c stores the tracking position and each previous automatic designation result corresponding to the plural tracking points automatically designated in the memory 33 in association as a pair for the tracking position using the estimation result of the movement directions of the persons that are the plural monitoring targets in step S91 (S92). The tracking processing unit 34c distinguishes the plural designated positions of the respective persons on the tracking screen TRW and the designation times for each person that is the monitoring target, and stores the designated position and the designation time in the memory 33 in association as the tracking position and the tracking time of each tracking point (S92). Further, the tracking processing unit 34c distinctly displays the point marker on the tracking position on the tracking screen TRW for each person that is the monitoring target through the output control unit 34b (S92).

Thus, even though the plural monitoring targets (for example, persons) projected onto the image data on the tracking screen TRW of the display apparatus 35 move in what way, the directivity control apparatuses 3, 3A and 3B of the present modification example form the directivity of the sound formed in a direction toward the position of each person before movement in a direction toward the position of each person after movement, and thus, can appropriately form the directivity of the sound in a tracking manner according to the movement of each person, and can suppress deterioration of monitoring work efficiency of an observer.

Hereinafter, a description is made of examples of configurations, actions and advantages of a directivity control apparatus, a directivity control method, a storage medium and a directivity control system according to aspects of the present invention.

A first aspect of the present invention provides a directivity control apparatus for controlling a directivity of a sound collected by a first sound collecting unit including a plurality of microphones, the directivity control apparatus including: a directivity forming unit, configured to form a directivity of the sound in a direction toward a monitoring target corresponding to a first designated position in an image displayed on a display unit; and an information obtaining unit, configured to obtain information on a second designated position in the image displayed on the display unit, designated in accordance with a movement of the monitoring target, wherein the directivity forming unit is configured to change the directivity of the sound toward the monitoring target corresponding to the second designated position by referring to the information on the second designated position obtained by the information obtaining unit.

The directivity control apparatus may be configured so that the information obtaining unit is configured to obtain the information on the second designated position in accordance with a designating operation to the monitoring target which moves in the image displayed on the display unit.

The directivity control apparatus may be configured by further including a sound source detecting unit, configured to detect a position of a sound source corresponding to the monitoring target from the image displayed on the display unit; and an image processing unit, configured to detect the monitoring target from the image displayed on the display unit, wherein the information obtaining unit is configured to obtain, as the information on the second designated position, information on the position of the sound source detected by the sound source detecting unit or information on a position of the monitoring target detected by the image processing unit.

The directivity control apparatus may be configured so that the sound source detecting unit is configured to start a detection processing of the position of the sound source corresponding to the monitoring target while placing an initial position designated in the image displayed on the display unit at a center of the detection processing, and the image processing unit is configured to start a detection processing of the monitoring target while placing the initial position at a center of the detection processing.

The directivity control apparatus may be configured so that the information obtaining unit is configured to obtain, as the information on the second designated position, information on a position designated by a changing operation in the image displayed on the display unit in accordance with the changing operation, wherein the changing operation indicates an operation for changing the information on the position of the sound source detected by the sound source detecting unit or the information on the position of the monitoring target detected by the image processing unit.

The directivity control apparatus may be configured so that the information obtaining unit is configured to obtain, as the information on the second designated position, information on a position designated by a changing operation in the image displayed on the display unit in accordance with the changing operation, in a case where a distance between the position of the sound source detected by the sound source detecting unit and the position of the monitoring target detected by the image processing unit is equal to or larger than a predetermined distance value, wherein the changing operation indicates an operation for changing the information on the position of the sound source or the information on the position of the monitoring target.

The directivity control apparatus may be configured by further including: an image storage unit that stores images captured for a given period of time; and an image reproduction unit, configured to reproduce the images stored in the image storage unit on the display unit, wherein the image reproduction unit is configured to reproduce the images at a speed value which is smaller than an initial value of a reproduction speed in accordance with a predetermined input operation.

The directivity control apparatus may be configured by further including: a display control unit, configured to display a captured image on the display unit, wherein the display control unit is configured to enlarge and display the image on a same screen at a predetermined magnification in accordance with a designation of a designated position in the image displayed on the display unit while placing the designated position at a center of enlargement.

The directivity control apparatus may be configured by further including: a display control unit, configured to display a captured image on the display unit, wherein the display control unit is configured to enlarge and display the image on a different screen at a predetermined magnification in accordance with a designation of a designated position in the image displayed on the display unit while placing the designated position at a center of enlargement.

The directivity control apparatus may be configured by further including: a display control unit, configured to display a captured image on the display unit, wherein the display control unit is configured to enlarge and display the image at a predetermined magnification with respect to a center of the display unit.

The directivity control apparatus may be configured so that the display control unit is configured to scroll by a predetermined amount an enlarged screen in which the image is enlarged and displayed in a direction out of a scroll determination line in a case where the designated position is out of the scroll determination line in the enlarged screen in accordance with a movement of the monitoring target.

The directivity control apparatus may be configured so that the display control unit is configured to scroll an enlarged screen in which the image is enlarged and displayed while centering the second designated position in a case where the designated position is out of a scroll determination line in the enlarged screen in accordance with a movement of the monitoring target.

The directivity control apparatus may be configured so that the display control unit is configured to scroll an enlarged screen in which the image is enlarged and displayed while placing the designated position at a center of the enlarged screen.

The directivity control apparatus may be configured so that the image processing unit is configured to perform a masking process of partly masking on the monitoring target in the image displayed on the display unit.

The directivity control apparatus may be configured by further including: a sound output control unit, configured to cause a sound output unit to output the sound collected by the first sound collecting unit, wherein the sound output control unit is configured to cause the sound output unit to perform a voice change process on the sound collected by the first sound collecting unit and cause the sound output unit to output the processed sound.

The directivity control apparatus may be configured by further including: a sound storage unit that stores a sound collected by the first sound collecting unit for a given period of time; and a sound output control unit, configured to cause a sound output unit to output the sound stored in the sound storage unit, wherein the sound output control unit is configured to cause the sound output unit to perform a voice change process on the sound stored in the sound storage unit and cause the sound output unit to output the processed sound.

The directivity control apparatus may be configured by further including: a display control unit, configured to display a predetermined marker on each of one or more designated positions designated in accordance with a movement of the monitoring target in the image displayed on the display unit.

The directivity control apparatus may be configured by further including: a display control unit, configured to display a connecting line at least between a current designated position and a last designated position among two or more designated positions designated in accordance with a movement of the monitoring target in the image displayed on the display unit.

The directivity control apparatus may be configured by further including: a display control unit, configured to display a movement route connecting between each designated position and one or two adjacent designated positions for all designated positions designated in accordance with a movement of the monitoring target in the image displayed on the display unit.

The directivity control apparatus may be configured by further including: a designation list storage unit that stores a designation list that includes data on the all designated positions in the image displayed on the display unit and designated times; and a reproduction time calculating unit, configured to calculate a reproduction starting time of the sound in an arbitrary designated position on a movement route connecting between the all designated positions displayed by the display control unit in accordance with a designation of the arbitrary designated position on the movement route by referring to the designation list stored in the designation list storage unit, wherein the directivity forming unit is configured to form the directivity of the sound by using the data on the designated position corresponding to the designated time closest to the reproduction starting time of the sound calculated by the reproduction time calculating unit.

The directivity control apparatus may be configured by further including: a sound storage unit that stores a sound collected by the first sound collecting unit for a given period of time; and a sound output control unit, configured to cause a sound output unit to output the sound stored in the sound storage unit, wherein the sound output control unit is configured to cause the sound output unit to output the sound at the reproduction starting time of the sound calculated by the reproduction time calculating unit, and the directivity forming unit is configured to form the directivity of the sound by using the data on the designated position corresponding to a subsequent designated time when the subsequent designated time exists in a predetermined time of period from the reproduction starting time of the sound.

The directivity control apparatus may be configured by further including: an operation switching control unit, configured to switch imaging for display of the image on the display unit from a first imaging unit to a second imaging unit in a case where the monitoring target is out of a predetermined switching area corresponding to the first imaging unit.

The directivity control apparatus may be configured by further including: an operation switching control unit, configured to switch collecting of the sound from the monitoring target from the first sound collecting unit to a second sound collecting unit in a case where the monitoring target is out of a predetermined switching area corresponding to the first sound collecting unit.

The directivity control apparatus may be configured by further including: a display control unit, configured to display in a list images captured by a plurality of imaging units in different screens on the display unit in accordance with a predetermined input operation; and an operation switching control unit, configured to select an imaging unit for displaying an image of the monitoring target on the display unit in accordance with an operation of selecting any one of selectable screens among the screens displayed in the list on the display unit by the display control unit.

The directivity control apparatus may be configured by further including: a display control unit, configured to display markers roughly indicating positions of a plurality of sound collecting units disposed around the first sound collecting unit and switchable from the first sound collecting unit in accordance with a predetermined input operation; and an operation switching control unit, configured to switch collecting of the sound from the monitoring target from the first sound collecting unit to another sound collecting unit corresponding to a selected marker in accordance with an operation of selecting the marker from the markers displayed on the display unit by the display control unit.

The directivity control apparatus may be configured so that the operation switching control unit is configured to select one sound collecting unit for collecting the sound from the monitoring target, which is closest to the monitoring target from a designated position of the monitoring target in the image captured by the imaging unit selected by the operation switching control unit, among a plurality of sound collecting units including the first sound collecting unit in accordance with a designation of the position.

The directivity control apparatus may be configured by further including: an image processing unit, configured to detect a direction of a face of the monitoring target from the image on the display unit, wherein the operation switching control unit is configured to select a sound collecting unit for collecting the sound from the monitoring target, which is closest to the monitoring target from a designated position of the monitoring target in the image captured by the imaging unit selected by the operation switching control unit in a direction corresponding to the direction of the face of the monitoring target detected by the image processing unit, among a plurality of sound collecting units including the first sound collecting unit in accordance with a designation of the position.

The directivity control apparatus may be configured by further including: a sound output control unit, configured to cause a sound output unit to output the sound collected by the first sound collecting unit, wherein the display control unit is configured to display on the display unit markers roughly indicating positions of a plurality of sound collecting units including the first sound collecting unit corresponding to the imaging unit selected by the operation switching control unit, the sound output control unit is configured to sequentially output for a predetermined time of period a sound including a directivity formed in a direction of the monitoring target from each of the plurality of sound collecting units corresponding to respective of the markers displayed on the display unit in accordance with a designation of a position of the monitoring target in the image captured by the imaging unit selected by the operation switching control unit, and the operation switching control unit is configured to select a sound collecting unit for collecting the sound from the monitoring target, which corresponds to a selected marker in accordance with an operation of selecting the marker based on the sound output by the sound output control unit.

A second aspect of the present invention provides a directivity control method in a directivity control apparatus for controlling a directivity of a sound collected by a first sound collecting unit including a plurality of microphones, the directivity control method including: forming a directivity of the sound in a direction toward a monitoring target corresponding to a first designated position in an image displayed on a display unit; obtaining information on a second designated position in the image displayed on the display unit, designated in accordance with a movement of the monitoring target; and changing the directivity of the sound toward the monitoring target corresponding to the second designated position by referring to the information on the second designated position.

A third aspect of the present invention provides a storage medium in which a program is stored, the program causing a computer in a directivity control apparatus for controlling a directivity of a sound collected by a first sound collecting unit including a plurality of microphones, to execute: forming a directivity of the sound in a direction toward a monitoring target corresponding to a first designated position in an image displayed on a display unit; obtaining information on a second designated position in the image displayed on the display unit, designated in accordance with a movement of the monitoring target; and changing the directivity of the sound toward the monitoring target corresponding to the second designated position by referring to the information on the second designated position.

A fourth aspect of the present invention provides a directivity control system including: an imaging unit, configured to capture an image in a sound collecting area; a first sound collecting unit including a plurality of microphones, configured to collect a sound in the sound collecting area; and a directivity control apparatus, configured to control a directivity of the sound collected by the first sound collecting unit, wherein the directivity control apparatus includes: a directivity forming unit, configured to form a directivity of the sound in a direction toward a monitoring target corresponding to a first designated position in an image displayed on a display unit; and an information obtaining unit, configured to obtain information on a second designated position in the image displayed on the display unit, designated in accordance with a movement of the monitoring target, wherein the directivity forming unit changes the directivity of the sound toward the monitoring target corresponding to the second designated position by referring to the information on the second designated position obtained by the information obtaining unit.

Hereinbefore, various embodiments have been described with reference to the accompanying drawings, but the present invention is not limited to the embodiments as described. It is obvious that various modifications or corrections can be made by those skilled in the art within the scope of the present invention and understood that those modifications and corrections belong to the technical range of the present invention.

The present invention is useful for a directivity control apparatus, a directivity control method, a storage medium and a directivity control system that appropriately form directivity of a sound with respect to a monitoring target in a tracking manner and prevent deterioration of monitoring efficiency of an observer even when the monitoring target on an image moves.

What is claimed is:

1. A directivity control method for controlling a directivity of a sound collected by a first sound collector including a plurality of microphones, the directivity control method comprising:
   forming a directivity of the sound in a direction toward a monitoring target corresponding to a first designated position in an image displayed on a display;
   obtaining information on a second designated position in the image displayed on the display, designated in accordance with a movement of the monitoring target, and
   changing the directivity of the sound toward the monitoring target corresponding to the second designated position by referring to the information on the second designated position.

2. The directivity control method according to claim 1, wherein
   in the obtaining, the information on the second designated position is obtained in accordance with a designating operation to the monitoring target which moves in the image displayed on the display.

3. The directivity control method according to claim 1, further comprising:
   detecting a position of a sound source corresponding to the monitoring target from the image displayed on the display; and
   detecting the monitoring target from the image displayed on the display, wherein
   in the obtaining, information on the detected position of the sound source or information on a position of the detected monitoring target is obtained as the information on the second designated position.

4. The directivity control method according to claim 3, wherein
   in the source position detecting, detection processing of the position of the sound source corresponding to the monitoring target is started while placing an initial position designated in the image displayed on the display at a center of an area on which the detection processing of the position of the source is performed, and
   in the monitoring target detection, detection processing of the monitoring target is started while placing the initial position at a center of an area on which the detection processing of the monitoring target is performed.

5. The directivity control method according to claim 3, wherein
   the obtaining obtains, as the information on the second designated position, information on a position designated by a changing operation in the image displayed on the display in accordance with the changing operation, wherein the changing operation indicates an operation for changing the information on the detected position of the sound source or the information on the position of the detected monitoring target.

6. The directivity control method according to claim 3, wherein
   the obtaining obtains, as the information on the second designated position, information on a position designated by a changing operation in the image displayed on the display in accordance with the changing operation, when a distance between the detected position of the sound source and the position of the detected monitoring target is equal to or larger than a predetermined distance value, wherein the changing operation indicates an operation of changing the information on the detected position of the sound source or the information on the position of the detected monitoring target.

7. The directivity control method according to claim 3, wherein
in the detecting of the monitoring target, a masking process of partly masking on the monitoring target in the image displayed on the display, is performed.

8. The directivity control method according to claim 1, further comprising:
storing, in an image storage, images captured for a given period of time; and
reproducing the images stored in the image storage on the display, wherein
in the reproducing, the images are reproduced at a speed which is smaller than an initial value of a reproduction speed, in accordance with a predetermined input operation.

9. The directivity control method according to claim 1, further comprising:
enlarging and displaying a captured image on a same screen at a predetermined magnification in accordance with a designation of a designated position in the image displayed on the display while placing the designated position at a center of enlargement.

10. The directivity control method according to claim 9, further comprising:
scrolling by a predetermined amount an enlarged screen in which the image is enlarged and displayed, in a direction out of a scroll determination line when the designated position is out of the scroll determination line in the enlarged screen, in accordance with a movement of the monitoring target.

11. The directivity control method according to claim 9, further comprising:
scrolling an enlarged screen in which the image is enlarged and displayed while placing the second designated position at a center of the enlargement, when the designated position is out of a scroll determination line in the enlarged screen in accordance with a movement of the monitoring target.

12. The directivity control method according to claim 9, wherein
scrolling an enlarged the screen, in which the image is enlarged and displayed, while placing the second designated position at a center of the enlarged screen.

13. The directivity control method according to claim 1, further comprising:
enlarging and displaying a captured image on a different screen at a predetermined magnification in accordance with a designation of a designated position in the image displayed on the display while placing the designated position at a center of enlargement.

14. The directivity control method according to claim 1, further comprising:
enlarging and displaying a captured image at a predetermined magnification with respect to a center of the display.

15. The directivity control method according to claim 1, further comprising:
causing a sound output device to perform a voice change process on the sound collected by the first sound collector; and
causing the sound output device to output the processed sound.

16. The directivity control method according to claim 1, further comprising:
storing, in a sound storage, a sound collected by the first sound collector for a given period of time;
causing a sound output device to perform a voice change process on the sound stored in the sound storage; and
causing the sound output device to output the processed sound.

17. The directivity control method according to claim 1, further comprising:
displaying a predetermined marker on each of at least one designated position that is designated in accordance with a movement of the monitoring target in the image displayed on the display.

18. The directivity control method according to claim 1, further comprising:
displaying a connecting line at least between a current designated position and a last designated position of two or more designated positions designated in accordance with a movement of the monitoring target in the image displayed on the display.

19. The directivity control method according to claim 1, further comprising:
displaying a movement route connecting between each designated position and one or two adjacent designated positions for all designated positions designated in accordance with a movement of the monitoring target in the image displayed on the display.

20. The directivity control method according to claim 19, further comprising:
storing, in a designation list storage, a designation list that includes data on the all designated positions in the image displayed on the display and designated times;
calculating a reproduction starting time of the sound in an arbitrary designated position on a movement route connecting between the all designated positions displayed on the display in accordance with a designation of the arbitrary designated position on the movement route by referring to the designation list stored in the designation list storage; and
forming the directivity of the sound by using the data on the designated position corresponding to the designated time closest to the reproduction starting time of the sound.

21. The directivity control method according to claim 20, further comprising:
storing, in a sound storage, a sound collected by the first sound collector for a given period of time;
causing a sound output device to output the sound stored in the sound storage;
causing the sound output device to output the sound at the reproduction starting time of the sound; and
forming the directivity of the sound by using the data on the designated position corresponding to a subsequent designated time when the subsequent designated time exists in a predetermined time of period from the reproduction starting time of the sound.

* * * * *